United States Patent
Shibazaki et al.

(10) Patent No.: US 9,838,665 B2
(45) Date of Patent: Dec. 5, 2017

(54) IMAGE PROCESSING DEVICE, IMAGING DEVICE, AND IMAGE PROCESSING PROGRAM

(71) Applicant: NIKON CORPORATION, Tokyo (JP)

(72) Inventors: Kiyoshige Shibazaki, Higashimurayama (JP); Muneki Hamashima, Fukaya (JP); Susumu Mori, Tokyo (JP); Kenichi Ishiga, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 331 days.

(21) Appl. No.: 14/513,729

(22) Filed: Oct. 14, 2014

(65) Prior Publication Data

US 2015/0103144 A1    Apr. 16, 2015

Related U.S. Application Data

(63) Continuation of application No. PCT/JP2013/002831, filed on Apr. 25, 2013.

(30) Foreign Application Priority Data

Apr. 25, 2012 (JP) .................................. 2012-100467
Apr. 25, 2012 (JP) .................................. 2012-100472
(Continued)

(51) Int. Cl.
H04N 5/213     (2006.01)
H04N 9/68      (2006.01)
(Continued)

(52) U.S. Cl.
CPC ......... *H04N 13/0037* (2013.01); *H04N 9/045* (2013.01); *H04N 13/0203* (2013.01);
(Continued)

(58) Field of Classification Search
CPC .......... H04N 5/228; G09G 5/00; G06K 9/00; G06K 9/40
See application file for complete search history.

(56) References Cited

U.S. PATENT DOCUMENTS 4,642,678 A    2/1987 Cok
5,541,653 A    7/1996 Peters et al.
(Continued)

FOREIGN PATENT DOCUMENTS

JP    H0847001 A       2/1996
JP    2003007994 A     1/2003
(Continued)

OTHER PUBLICATIONS

Jul. 9, 2013 Written Opinion issued in International Application No. PCT/JP2013/002831.
(Continued)

*Primary Examiner* — Sath V Perungavoor
*Assistant Examiner* — Patricia I Young
(74) *Attorney, Agent, or Firm* — Oliff PLC

(57) ABSTRACT

An image processing apparatus is provided, that is configured to: extract a first pixel value corresponding to a first viewpoint that is one of a plurality of viewpoints to capture a subject image, at a target pixel position from image data having the first pixel value; extract second and third luminance values corresponding to second and third viewpoints that are different from the first viewpoint, at the target pixel position from luminance image data having the second and third luminance values; and calculate at least any of second and third pixel values of the second and third viewpoints such that a relational expression between the second or third pixel value and the first pixel value extracted by the pixel (Continued)

| <1> WHEN n = 2 | | PRESENCE OF PARALLAX PIXELS | | | | | |
|---|---|---|---|---|---|---|---|
| CLASSIFICATION OF REPETITIVE PATTERNS | | Gr | Gb | R, B | PARALLAX PIXELS | PARALLAX ARRANGEMENT | FEATURES |
| CLASSIFICATION A | A-1 | PRESENT | PRESENT | ABSENT | Gr, Gb alternating | Gr row Gr, Gb row Gb | Image quality of a 2D image is maintained to some extent, and a 3D image is obtained. |
| | A-2 | | | | | Gr column Gr, Gb column Gb | |
| CLASSIFICATION B | B-1 | PRESENT (ABSENT) | ABSENT (PRESENT) | ABSENT | Only one pixel of Gr (or Gb) | Gr row Gr | While high resolution as a 2D image is maintained, 3D information is also obtained. |
| | B-2 | | | | | Gb column Gb (or Gr column Gr) | |
| CLASSIFICATION C | C-1 | PRESENT | PRESENT | ABSENT | Two pixels of Gr, Gb | Gr row Gr, Gb row Gb | A relatively high resolution color 3D image and a relatively low resolution 2D image. |
| | C-2 | | | | | Gr column Gr, Gb column Gb | |
| CLASSIFICATION D | D-1 | PRESENT | ABSENT | PRESENT | Three pixels of Gr, R, B | Gr row Gr, R, Gb row B | A color 3D image with sufficient image quality and information of 2D image are obtained. |
| | D-2 | | | | | Gr column Rr, Gr column Gb, B | |
| CLASSIFICATION E | E-1 | PRESENT | PRESENT | PRESENT | Four pixels of Gr, Gb, R, B | Gr row Gr, R, Gb row B, Gb | Although resolution is lowered, a color 3D image with highest quality is obtained. |
| | E-2 | | | | | Gr column R, GR, Gb column Gb, B | | value extracting unit remains correlated with a relational expression defined by the second and third luminance values.

14 Claims, 35 Drawing Sheets

(30) Foreign Application Priority Data

Apr. 25, 2012 (JP) ................................ 2012-100474
Apr. 25, 2012 (JP) ................................ 2012-100476

(51) Int. Cl.
*G06K 9/00* (2006.01)
*H04N 13/00* (2006.01)
*H04N 9/04* (2006.01)
*H04N 13/02* (2006.01)

(52) U.S. Cl.
CPC ..... *H04N 13/0217* (2013.01); *H04N 13/0257* (2013.01); *H04N 2013/0077* (2013.01)

(56) References Cited

U.S. PATENT DOCUMENTS

| | | |
|---|---|---|
| 7,236,628 B2 | 6/2007 | Chen et al. |
| 7,957,588 B2 | 6/2011 | Ishiga |
| 2009/0153693 A1* | 6/2009 | Onuki ................ H04N 5/23212 348/222.1 |
| 2009/0179824 A1* | 7/2009 | Tsujimoto .......... G02B 27/0025 345/7 |
| 2012/0140100 A1 | 6/2012 | Shibazaki et al. |
| 2012/0193515 A1 | 8/2012 | Agranov et al. |

FOREIGN PATENT DOCUMENTS

| | | |
|---|---|---|
| JP | 2013165482 A | 8/2013 |
| WO | 2012073491 A1 | 6/2012 |

OTHER PUBLICATIONS

Jul. 9, 2013 Search Report issued in International Application No. PCT/JP2013/002831.

* cited by examiner (a)
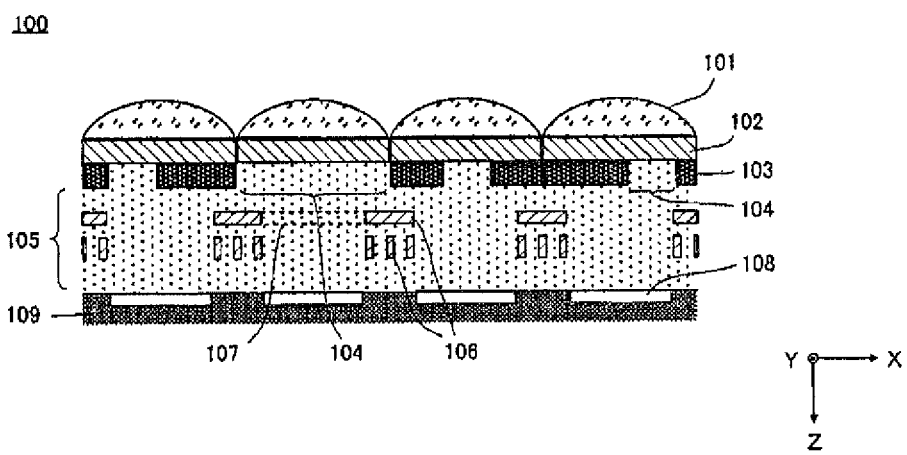
(b)
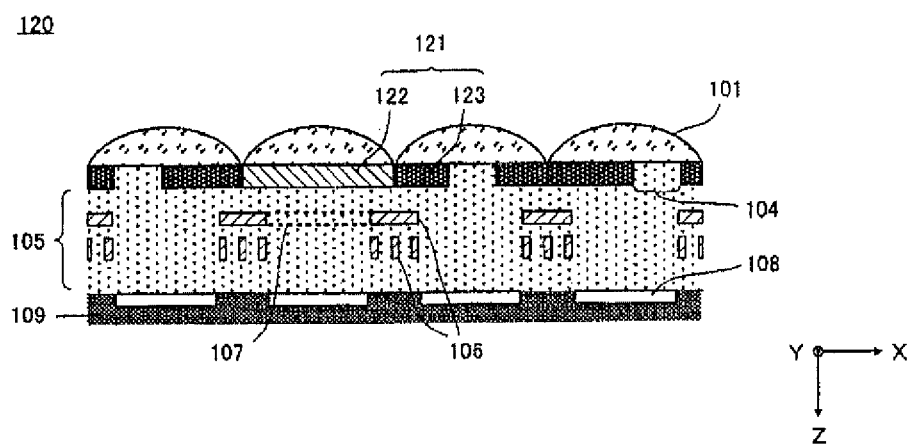
FIG. 2

FIG. 7

⟨1⟩ WHEN n = 2

| CLASSIFICATION OF REPETITIVE PATTERNS | | PRESENCE OF PARALLAX PIXELS | | | PARALLAX PIXELS | PARALLAX ARRANGEMENT | FEATURES |
|---|---|---|---|---|---|---|---|
| | | Gr | Gb | R, B | | | |
| CLASSIFICATION A | A-1 | PRESENT | PRESENT | ABSENT | Gr, Gb alternating | Gr row Gr, Gb row Gb | Image quality of a 2D image is maintained to some extent, and a 3D image is obtained. |
| | A-2 | | | | | Gr column Gr, Gb column Gb | |
| CLASSIFICATION B | B-1 | PRESENT | ABSENT | ABSENT | Only one pixel of Gr (or Gb) | Gr row Gr | While high resolution as a 2D image is maintained, 3D information is also obtained. |
| | B-2 | (ABSENT) | (PRESENT) | | | Gb column Gb (or Gr column Gr) | |
| CLASSIFICATION C | C-1 | PRESENT | PRESENT | ABSENT | Two pixels of Gr, Gb | Gr row Gr, Gb row Gb | A relatively high resolution color 3D image and a relatively low resolution 2D image. |
| | C-2 | | | | | Gr column Gr, Gb column Gb | |
| CLASSIFICATION D | D-1 | PRESENT | ABSENT | PRESENT | Three pixels of Gr, R, B | Gr row Gr, R, Gb row B | A color 3D image with sufficient image quality and information of 2D image are obtained. |
| | D-2 | | | | | Gr column Rr, Gr column Gb, B | |
| CLASSIFICATION E | E-1 | PRESENT | PRESENT | PRESENT | Four pixels of Gr, Gb, R, B | Gr row Gr, R, Gb row B, Gb | Although resolution is lowered, a color 3D image with highest quality is obtained. |
| | E-2 | | | | | Gr column R, GR, Gb column Gb, B | |

$R_0$ PLANE DATA $R_n$ PLANE DATA

US 9,838,665 B2

IMAGE PROCESSING DEVICE, IMAGING DEVICE, AND IMAGE PROCESSING PROGRAM

The contents of the following Japanese patent applications are incorporated herein by reference:
2012-100467 filed in JP on Apr. 25, 2012;
2012-100472 filed in JP on Apr. 25, 2012;
2012-100474 filed in JP on Apr. 25, 2012;
2012-100476 filed in JP on Apr. 25, 2012; and
PCT/JP2013/002831 filed on Apr. 25, 2013.

BACKGROUND

1. Technical Field

The present invention relates to an image processing apparatus, an image-capturing apparatus, and a computer-readable medium having stored thereon an image processing program.

2. Related Art

A stereo image-capturing apparatus that obtains a stereo image consisting of a right eye image and a left eye image by using two imaging optical systems is known. By arranging two imaging optical systems at a certain interval, such a stereo image-capturing apparatus generates disparity between two images that are obtained by capturing an image of a single subject.

Patent Document 1: Japanese Patent Application Publication No. 8-47001

SUMMARY

In order to obtain a right eye image and a left eye image as images, respectively, it has been necessary to obtain, as images, output images corresponding to respective imaging optical systems of a stereo image-capturing apparatus.

A first aspect of the present invention may include an image processing apparatus comprising: a pixel value extracting unit that extracts a first pixel value at a target pixel position from image data having the first pixel value, the first pixel value corresponding to a first viewpoint that is one of a plurality of viewpoints to capture a subject image; a luminance value extracting unit that extracts a second luminance value and a third luminance value at the target pixel position from luminance image data having the second luminance value and the third luminance value, the second luminance value and the third luminance value corresponding to a second viewpoint and a third viewpoint that are different from the first viewpoint; and a calculating unit that calculates at least any of a second pixel value of the second viewpoint and a third pixel value of the third viewpoint such that a relational expression between the second pixel value or the third pixel value and the first pixel value extracted by the pixel value extracting unit remains correlated with a relational expression defined by the second luminance value and the third luminance value.

A second aspect of the present invention may include an image processing apparatus comprising: a pixel value extracting unit that extracts a first pixel value at a target pixel position from image data having the first pixel value, the first pixel value corresponding to a first viewpoint that is one of a plurality of viewpoints to capture a subject image; a luminance value extracting unit that extracts a second luminance value and a third luminance value at the target pixel position from luminance image data having the second luminance value and the third luminance value, the second luminance value and the third luminance value corresponding to a second viewpoint and a third viewpoint that are different from the first viewpoint; and a calculating unit that calculates at least any of a second pixel value of the second viewpoint and a third pixel value of the third viewpoint such that a ratio between the second pixel value or the third pixel value and the first pixel value extracted by the pixel value extracting unit remains correlated with a ratio defined by the second luminance value and the third luminance value.

A third aspect of the present invention may include an image processing apparatus comprising: a pixel value extracting unit that extracts a first pixel value at a target pixel position from image data having the first pixel value, the first pixel value corresponding to a first viewpoint that is one of a plurality of viewpoints to capture a subject image; a luminance value extracting unit that extracts a second luminance value and a third luminance value at the target pixel position from luminance image data having the second luminance value and the third luminance value, the second luminance value and the third luminance value corresponding to a second viewpoint and a third viewpoint that are different from the first viewpoint; and a calculating unit that calculates at least any of a second pixel value of the second viewpoint and a third pixel value of the third viewpoint such that a difference between the second pixel value or the third pixel value and the first pixel value extracted by the pixel value extracting unit remains correlated with a difference between the second luminance value and the third luminance value.

A fourth aspect of the present invention may include an image-capturing apparatus comprising: an image sensor that captures the subject image; and the above-described image processing apparatus, wherein the pixel value extracting unit extracts the first pixel value from the image data output by the image sensor; and the luminance value extracting unit extracts the second luminance value and the third luminance value from the luminance image data output by the image sensor.

A fifth aspect of the present invention may include an image processing program stored on a computer-readable medium, the image processing program causing a computer to: extract a first pixel value at a target pixel position from image data having the first pixel value, the first pixel value corresponding to a first viewpoint that is one of a plurality of viewpoints to capture a subject image; extract a second luminance value and a third luminance value at the target pixel position from luminance image data having the second luminance value and the third luminance value, the second luminance value and the third luminance value corresponding to a second viewpoint and a third viewpoint that are different from the first viewpoint; and calculate at least any of a second pixel value of the second viewpoint and a third pixel value of the third viewpoint such that a relational expression between the second pixel value or the third pixel value and the first pixel value extracted in the extracting of the first pixel value remains correlated with a relational expression defined by the second luminance value and the third luminance value.

A sixth aspect of the present invention may include an image processing program stored on a computer-readable medium, the image processing program causing a computer to: extract a first pixel value at a target pixel position from image data having the first pixel value, the first pixel value corresponding to a first viewpoint that is one of a plurality of viewpoints to capture a subject image; extract a second luminance value and a third luminance value at the target pixel position from luminance image data having the second luminance value and the third luminance value, the second luminance value and the third luminance value corresponding to a second viewpoint and a third viewpoint that are different from the first viewpoint; and calculate at least any of a second pixel value of the second viewpoint and a third pixel value of the third viewpoint such that a ratio between the second pixel value or the third pixel value and the first pixel value extracted in the extracting of the first pixel value remains correlated with a ratio defined by the second luminance value and the third luminance value.

A seventh aspect of the present invention may include an image processing program stored on a computer-readable medium, the image processing program causing a computer to: extract a first pixel value at a target pixel position from image data having the first pixel value, the first pixel value corresponding to a first viewpoint that is one of a plurality of viewpoints to capture a subject image; extract a second luminance value and a third luminance value at the target pixel position from luminance image data having the second luminance value and the third luminance value, the second luminance value and the third luminance value corresponding to a second viewpoint and a third viewpoint that are different from the first viewpoint; and calculate at least any of a second pixel value of the second viewpoint and a third pixel value of the third viewpoint such that a difference between the second pixel value or the third pixel value and the first pixel value extracted in the extracting of the first pixel value remains correlated with a difference between the second luminance value and the third luminance value.

An eighth aspect of the present invention may include an image processing apparatus comprising: an image data obtaining unit that obtains reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; a calculating unit that calculates a third parallax pixel value having a third parallax that is different from both the first parallax and the second parallax relative to the subject image, according to a calculation formula: $P_3 = 2P_0 \times (C \cdot P_1 + (1-C)P_2)/(P_1 + P_2)$ ($P_0$: reference pixel value, $P_1$: first parallax luminance value, $P_2$: second parallax luminance value, $P_3$: third parallax pixel value, C: real number ($C \neq 0, 0.5, 1$)) by extracting a reference pixel value at a target pixel position of the reference image data; a first parallax luminance value at the target pixel position of the first parallax image data; and a second parallax luminance value at the target pixel position of the second parallax image data; and an image data generating unit that generates third parallax image data by using a plurality of the third parallax pixel values that are calculated by the calculating unit while moving the target pixel position sequentially relative to an image region in the reference image data.

A ninth aspect of the present invention may include an image processing apparatus comprising: an image data obtaining unit that obtains reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; a calculating unit that calculates a third parallax pixel value having a third parallax that is different from both the first parallax and the second parallax relative to the subject image, according to a calculation formula: $P_3 = P_0 \times (P_2/P_1)^{(1/2-C)}$ ($P_0$: reference pixel value, $P_1$: first parallax luminance value, $P_2$: second parallax luminance value, $P_3$: third parallax pixel value, C: real number ($C \neq 0, 0.5, 1$)) by extracting a reference pixel value at a target pixel position of the reference image data; a first parallax luminance value at the target pixel position of the first parallax image data; and a second parallax luminance value at the target pixel position of the second parallax image data; and an image data generating unit that generates third parallax image data by using a plurality of the third parallax pixel values that are calculated by the calculating unit while moving the target pixel position sequentially relative to an image region in the reference image data.

A tenth aspect of the present invention may include an image processing apparatus comprising: an image data obtaining unit that obtains reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; a calculating unit that calculates a third parallax pixel value having a third parallax that is different from both the first parallax and the second parallax relative to the subject image, according to a calculation formula: $P_3 - P_0 = (1/2 - C)(P_2 - P_1)$ ($P_0$: reference pixel value, $P_1$: first parallax luminance value, $P_2$: second parallax luminance value, $P_3$: third parallax pixel value, C: real number ($C \neq 0, 0.5, 1$)) by extracting a reference pixel value at a target pixel position of the reference image data; a first parallax luminance value at the target pixel position of the first parallax image data; and a second parallax luminance value at the target pixel position of the second parallax image data; and an image data generating unit that generates third parallax image data by using a plurality of the third parallax pixel values that are calculated by the calculating unit while moving the target pixel position sequentially relative to an image region in the reference image data.

An eleventh aspect of the present invention may include an image-capturing apparatus comprising: an image sensor that captures an image of the single scene; and the above-described image processing apparatus, wherein the image data obtaining unit obtains the reference image data, the first parallax image data, and the second parallax image data output by the image sensor.

A twelfth aspect of the present invention may include an image processing program stored on a computer-readable medium, the image processing program causing a computer to: obtain reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; while moving a target pixel position sequentially relative to an image region in the reference image data, sequentially calculate a third parallax pixel value having a third parallax that is different from both the first parallax and the second parallax relative to the subject image, according to a calculation formula: $P_3 = 2P_0 \times (C \cdot P_1 + (1-C)P_2)/(P_1 + P_2)$ ($P_0$: reference pixel value, $P_1$: first parallax luminance value, $P_2$: second parallax luminance value, $P_3$: third parallax pixel value, C: real number ($C \neq 0, 0.5, 1$)) by extracting a reference pixel value at the target pixel position of the reference image data; a first parallax luminance value at the target pixel position of the first parallax image data; and a second parallax luminance value at the target pixel position of the second parallax image data; and generate third parallax image data by using a plurality of the third parallax pixel values that are calculated in the calculating.

A thirteenth aspect of the present invention may include an image processing program stored on a computer-readable medium, the image processing program causing a computer to: obtain reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; while moving a target pixel position sequentially relative to an image region in the reference image data, sequentially calculate a third parallax pixel value having a third parallax that is different from both the first parallax and the second parallax relative to the subject image, according to a calculation formula: $P_3 = P_0 \times (P_2/P_1)^{(1/2-C)}$ ($P_0$: reference pixel value, $P_1$: first parallax luminance value, $P_2$: second parallax luminance value, $P_3$: third parallax pixel value, C: real number (C≠0, 0.5, 1)) by extracting a reference pixel value at the target pixel position of the reference image data; a first parallax luminance value at the target pixel position of the first parallax image data; and a second parallax luminance value at the target pixel position of the second parallax image data; and generate third parallax image data by using a plurality of the third parallax pixel values that are calculated in the calculating.

A fourteenth aspect of the present invention may include an image processing program stored on a computer-readable medium, the image processing program causing a computer to: obtain reference image data; first parallax image data having a first parallax in one direction relative to a subject image of the reference image data; and second parallax image data having a second parallax in another direction opposite to the one direction, the reference image data, the first parallax image data, and the second parallax image data being generated by capturing an image of a single scene; while moving a target pixel position sequentially relative to an image region in the reference image data, sequentially calculate a third parallax pixel value having a third parallax that is different from both the first parallax and the second parallax relative to the subject image, according to a calculation formula: $P_3 - P_0 = (1/2 - C)(P_2 - P_1)$ ($P_0$: reference pixel value, $P_1$: first parallax luminance value, $P_2$: second parallax luminance value, $P_3$: third parallax pixel value, C: real number (C≠0, 0.5, 1)) by extracting a reference pixel value at the target pixel position of the reference image data; a first parallax luminance value at the target pixel position of the first parallax image data; and a second parallax luminance value at the target pixel position of the second parallax image data; and generate third parallax image data by using a plurality of the third parallax pixel values that are calculated in the calculating.

The summary clause does not necessarily describe all necessary features of the embodiments of the present invention. The present invention may also be a sub-combination of the features described above.

BRIEF DESCRIPTION OF THE DRAWINGS

FIG. 2 schematically illustrates cross-sections of image sensors relating to an embodiment of the present invention.

FIG. 7 illustrates various cases in which two types of parallax pixels are allocated to the Bayer arrangement.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

In the following description, a first embodiment is described first, and then a second embodiment is described. In the respective descriptions, "the present embodiment" refers to a corresponding one of the embodiments. However, because both the embodiments have a lot in common as described later, descriptions about common structures are to be read as applying to both the embodiments as appropriate. Note that, three examples that belong to each embodiment are described as Examples 1 to 3.

The first embodiment is described. A digital camera relating to the present embodiment, which is a form of an image processing apparatus and an image-capturing apparatus, is configured to be capable of generating, for a single scene, images from multiple viewpoints with a single imaging operation. Here, the images from different viewpoints are referred to as parallax images.

Figure 1:
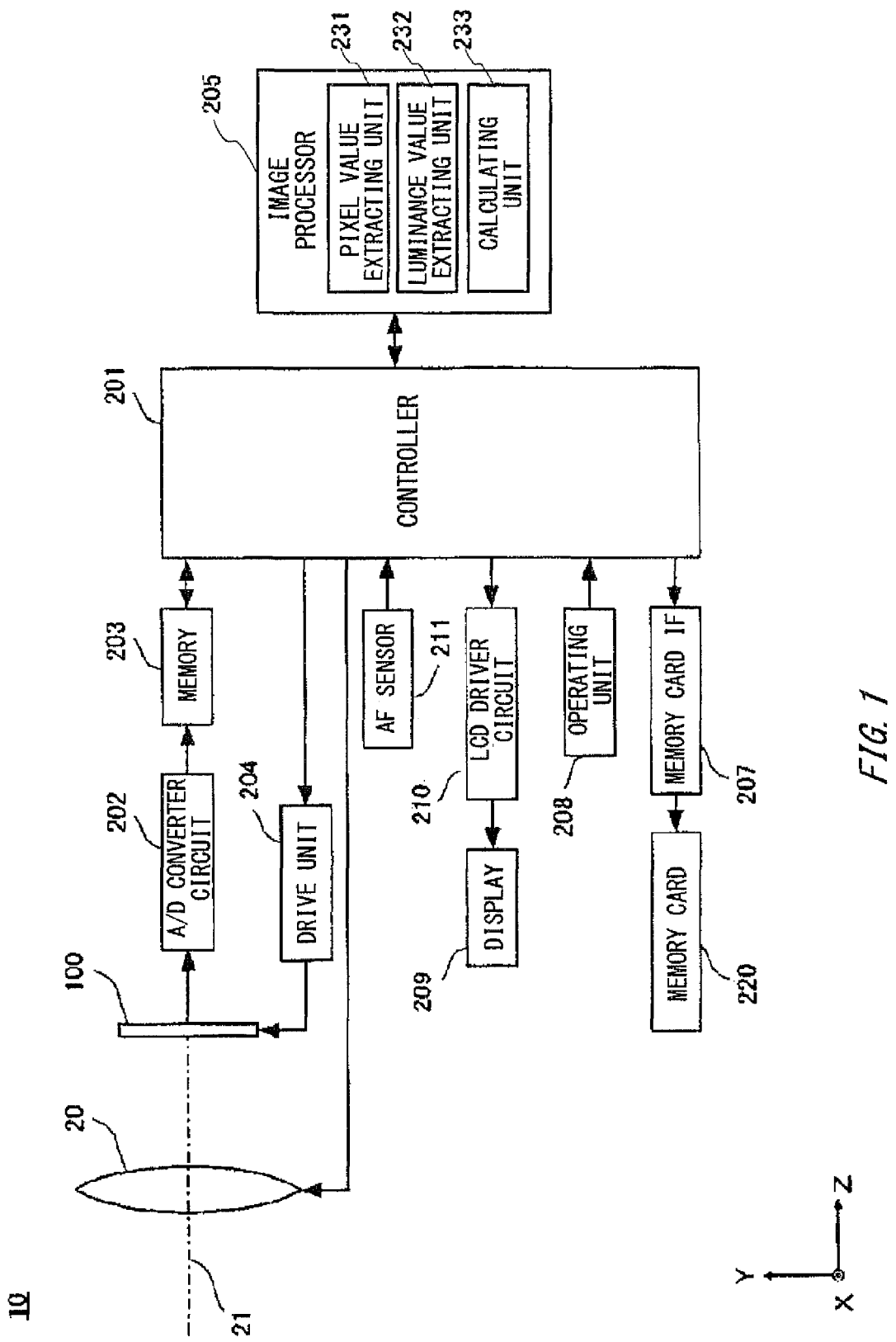
FIG. 1 illustrates the structure of a digital camera relating to an embodiment of the present invention.

FIG. 1 illustrates the structure of a digital camera 10 relating to an embodiment of the present invention. The digital camera 10 includes an image-capturing lens 20, which is an imaging optical system, and guides incoming subject luminous flux along an optical axis 21 to an image sensor 100. The image-capturing lens 20 may be a replaceable lens that is attachable and detachable to/from the digital camera 10. The digital camera 10 includes the image sensor 100, a controller 201, an A/D converter circuit 202, a memory 203, a drive unit 204, an image processor 205, a memory card IF 207, an operating unit 208, a display 209, an LCD driver circuit 210, and an AF sensor 211.

As shown in FIG. 1, a +Z-axis direction is defined as the direction parallel to the optical axis 21 toward the image sensor 100, a +X-axis direction is defined as the direction approaching the viewer of the sheet of FIG. 1 in the plane orthogonal to the Z axis, and a +Y-axis direction is defined as the upward direction in the sheet of FIG. 1. In some of the following drawings, their coordinate axes are shown so as to show how the respective drawings are arranged relative to the coordinate axes of FIG. 1.

The image-capturing lens 20 is constituted by a group of optical lenses and configured to form an image from the subject luminous flux from a scene in the vicinity of its focal plane. For the convenience of description, the image-capturing lens 20 is hypothetically represented by a single lens positioned in the vicinity of the pupil in FIG. 1. The image sensor 100 is positioned in the vicinity of the focal plane of the image-capturing lens 20. The image sensor 100 is an image sensor having two-dimensionally arranged photoelectric converter elements, for example, a CCD or CMOS sensor. The timing of the image sensor 100 is controlled by the drive unit 204 so that the image sensor 100 can convert a subject image formed on the light receiving surface into an image signal to output the image signal to the A/D converter circuit 202.

The A/D converter circuit 202 converts the image signal output from the image sensor 100 into a digital image signal and outputs the digital image signal to the memory 203. The image processor 205 uses the memory 203 as its workspace to perform various image processing operations and thus generates image data. In particular, the image processor 205 has: a pixel value extracting unit 231 that extracts a pixel value from a target pixel position of color image data; a luminance value extracting unit 232 that extracts a luminance value from the target pixel position of parallax image data; and a calculating unit 233 that calculates a pixel value as color image data at the target pixel position by using the extracted pixel value and luminance value.

The respective processing is described later in detail.

The image processor 205 additionally performs general image processing such as adjustment of image data according to a selected image format.

The generated image data is converted by the LCD driver circuit 210 into a display signal and displayed on the display 209. In addition, the generated image data is stored in a memory card 220 attached to the memory card IF 207.

The AF sensor 211 is a phase difference sensor in which a plurality of distance measurement points is set relative to a subject space, and detects defocus amounts of a subject image at the respective distance measurement points. A series of image-capturing sequences is initiated when the operating unit 208 receives a user operation and outputs an operating signal to the controller 201. The various operations such as AF and AE associated with the image-capturing sequences are performed under the control of the controller 201. For example, the controller 201 analyzes the detection signals of the AF sensor 211 to perform focus control to move a focus lens that constitutes a part of the image-capturing lens 20.

The following describes the structure of the image sensor 100 in detail. FIG. 2 schematically illustrates cross-sections of image sensors relating to an embodiment of the present invention. FIG. 2 (a) schematically illustrates a cross-section of the image sensor 100 constituted with color filters 102 and aperture masks 103 as separate bodies. Also, FIG. 2 (b) schematically illustrates a cross-section of an image sensor 120, as a variation of the image sensor 100, having a screen filter 121 constituted with a color filter portion 122 and an aperture mask portion 123 that are formed integrally.

As shown in FIG. 2 (a), the image sensor 100 is structured in such a manner that microlenses 101, the color filters 102, the aperture masks 103, an interconnection layer 105 and photoelectric converter elements 108 are arranged in the stated order when seen from the side facing a subject. The photoelectric converter elements 108 are formed by photodiodes that may convert incoming light into an electrical signal. The photoelectric converter elements 108 are arranged two-dimensionally on the surface of a substrate 109.

The image signals generated by the conversion performed by the photoelectric converter elements 108, control signals to control the photoelectric converter elements 108 and the like are transmitted and received via interconnections 106 provided in the interconnection layer 105. The aperture masks 103 having openings 104, which are provided in a one-to-one correspondence with the photoelectric converter elements 108, are provided in contact with the interconnection layer. Each of the openings 104 is shifted in accordance with a corresponding one of the photoelectric converter elements 108 and strictly positioned relative to the corresponding photoelectric converter element 108 as described later. As described later in more details, the aperture masks 103 having the openings 104 effectively cause parallax in the subject luminous flux received by the photoelectric converter elements 108.

On the other hand, no aperture masks 103 are provided on some of the photoelectric converter elements 108 that do not cause parallax. In other words, such photoelectric converter elements 108 are provided with the aperture masks 103 having such openings 104 that do not limit the subject luminous flux incident on the corresponding photoelectric converter elements 108 or allow the entire effective luminous flux to transmit through the aperture masks 103.

Although these photoelectric converter elements 108 do not cause parallax, the incoming subject luminous flux is substantially defined by an opening 107 formed by the interconnections 106. Therefore, the interconnections 106 can be viewed as an aperture mask that does not cause parallax and allows the entire effective luminous flux to pass. The aperture masks 103 may be arranged independently and separately from the photoelectric converter elements 108 and in correspondence with the photoelectric converter elements 108, or may be formed jointly with the photoelectric converter elements 108, like the way how the color filters 102 are manufactured.

The color filters 102 are provided on the aperture masks 103. Each of the color filters 102 is colored so as to transmit a particular wavelength range to a corresponding one of the photoelectric converter elements 108, and the color filters 102 are arranged in a one-to-one correspondence with the photoelectric converter elements 108. To output a color image, at least two different types of color filters that are different from each other need to be arranged. However, three or more different types of color filters may need to be arranged to produce a color image with higher quality. These color filters may be regarded as primary color filters for generating a color image. A combination of the primary color filters is, for example, red filters (R filters) to transmit the red wavelength range, green filters (G filters) to transmit the green wavelength range, and blue filters (B filters) to transmit the blue wavelength range. These color filters are arranged in a lattice pattern corresponding to the photoelectric converter elements 108 as described later.

The microlenses 101 are provided on the color filters 102. The microlenses 101 are each a light gathering lens to guide more of the incident subject luminous flux to the corresponding photoelectric converter element 108. The microlenses 101 are provided in a one-to-one correspondence with the photoelectric converter elements 108. The optical axis of each microlens 101 is preferably shifted so that more of the subject luminous flux is guided to the corresponding photoelectric converter element 108 taking into consideration the relative positions between the pupil center of the image-capturing lens 20 and the corresponding photoelectric converter element 108. Furthermore, the position of each of the microlenses 101 as well as the position of the opening 104 of the corresponding aperture mask 103 may be adjusted to allow more of the particular subject luminous flux to be incident, which will be described later.

Here, a pixel is defined as a single set constituted by one of the aperture masks 103, one of the color filters 102, and one of the microlenses 101, which are provided in a one-to-one correspondence with the photoelectric converter elements 108 as described above. To be more specific, a pixel with an aperture mask 103 that causes parallax is referred to as a parallax pixel, and a pixel without an aperture mask 103 that causes parallax is referred to as a no-parallax pixel. For example, when the image sensor 100 has an effective pixel region of approximately 24 mm×16 mm, the number of pixels reaches as many as approximately 12 million. Also, a unit that may have an output value corresponding to a pixel of the image sensor 100 in image data generated from an output of the image sensor 100 may be simply referred to as a pixel.

When image sensors have high light collection efficiency and photoelectric conversion efficiency, the microlenses 101 may be omitted. Furthermore, in the case of back side illumination image sensors, the interconnection layer 105 is provided on the opposite side of the photoelectric converter elements 108.

There are various combinations of the color filters 102 and the aperture masks 103. In FIG. 2 (a), the color filters 102 and the aperture masks 103 can be integrally formed by allowing the openings 104 of the aperture masks 103 to have color components. Also, when a particular pixel is set as a pixel that obtains luminance information of a subject, the pixel may not be provided with a corresponding color filter 102. Alternatively, an uncolored transparent filter may be arranged so as to transmit the almost entire wavelength range of visible light.

In the present embodiment, the aperture masks 103 are separately formed from the interconnections 106, but the function of the aperture masks 103 in the parallax pixels may be alternatively performed by the interconnections 106. In other words, defined opening shapes are formed by the interconnections 106 and limit the subject luminous flux to allow only particular partial luminous flux to pass to reach the photoelectric converter elements 108. In this case, the interconnections 106 forming the opening shapes are preferably positioned closest to the photoelectric converter elements 108 in the interconnection layer 105.

The aperture masks 103 may be formed by a transmission preventing film that is overlaid on the photoelectric converter elements 108. In this case, the aperture masks 103 are formed in such a manner that, for example, a SiN film and a $SiO_2$ film are sequentially stacked to form a transmission preventing film and regions corresponding to the openings 104 are removed by etching.

When a pixel that obtains luminance information is set as a parallax pixel, the structure of the image sensor 120 illustrated in FIG. 2 (b) may be employed. That is, the screen filter 121 in which the color filter portion 122 to function as a color filter and the aperture mask portion 123 having the opening 104 are integrally formed can be provided in a prescribed manner between the microlens 101 and the interconnection layer 105.

In the screen filter 121, the color filter portion 122 is colored for example with blue, green or red, and the aperture mask portion 123 is colored with black at mask portions other than the opening 104. The image sensor 120 that employs the screen filter 121 has a shorter distance between the microlens 101 and the photoelectric converter element 108 as compared with the image sensor 100, and thus has a higher subject luminous flux light collection efficiency.

Figure 3:
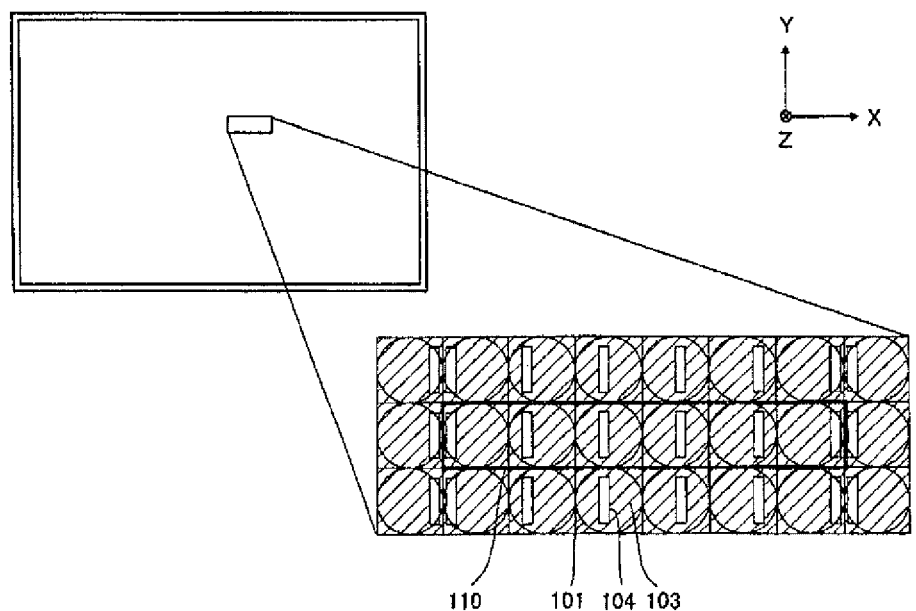
FIG. 3 schematically illustrates a partially enlarged appearance of an image sensor.

Next, the relation between the opening 104 of the aperture mask 103 and parallax to be generated is described. FIG. 3 schematically illustrates a partially enlarged appearance of the image sensor 100. Here, for the simplicity of description, the color arrangement of the color filters 102 is not taken into consideration until it is mentioned again later. In the following description that does not mention about the color arrangement of the color filters 102, an image sensor can be regarded as being constituted only with parallax pixels having the color filters 102 of a single color (the color filters 102 may be transparent). Accordingly, a repetitive pattern described below may be considered as adjacent pixels in the color filters 102 of a single color.

As illustrated in FIG. 3, the openings 104 of the aperture masks 103 are shifted relative to respective pixels. Additionally, the openings 104 of adjacent pixels are displaced relative to one another.

In the example illustrated in FIG. 3, six types of the aperture masks 103 are provided, and the positions of the openings 104 of the aperture masks 103 relative to respective pixels are shifted in left and right directions relative to one another. Additionally, a group of photoelectric conversion elements consists of the six parallax pixels each having the aperture mask 103 whose openings are shifted from left to right on the sheet, and the groups of photoelectric conversion elements are arranged over the entire image sensor 100 two-dimensionally and periodically. In other words, the image sensor 100 is constituted with repetitive patterns 110 each including a group of photoelectric conversion elements, the repetitive patterns 110 being spread over the image sensor 100 periodically.

Figure 4:
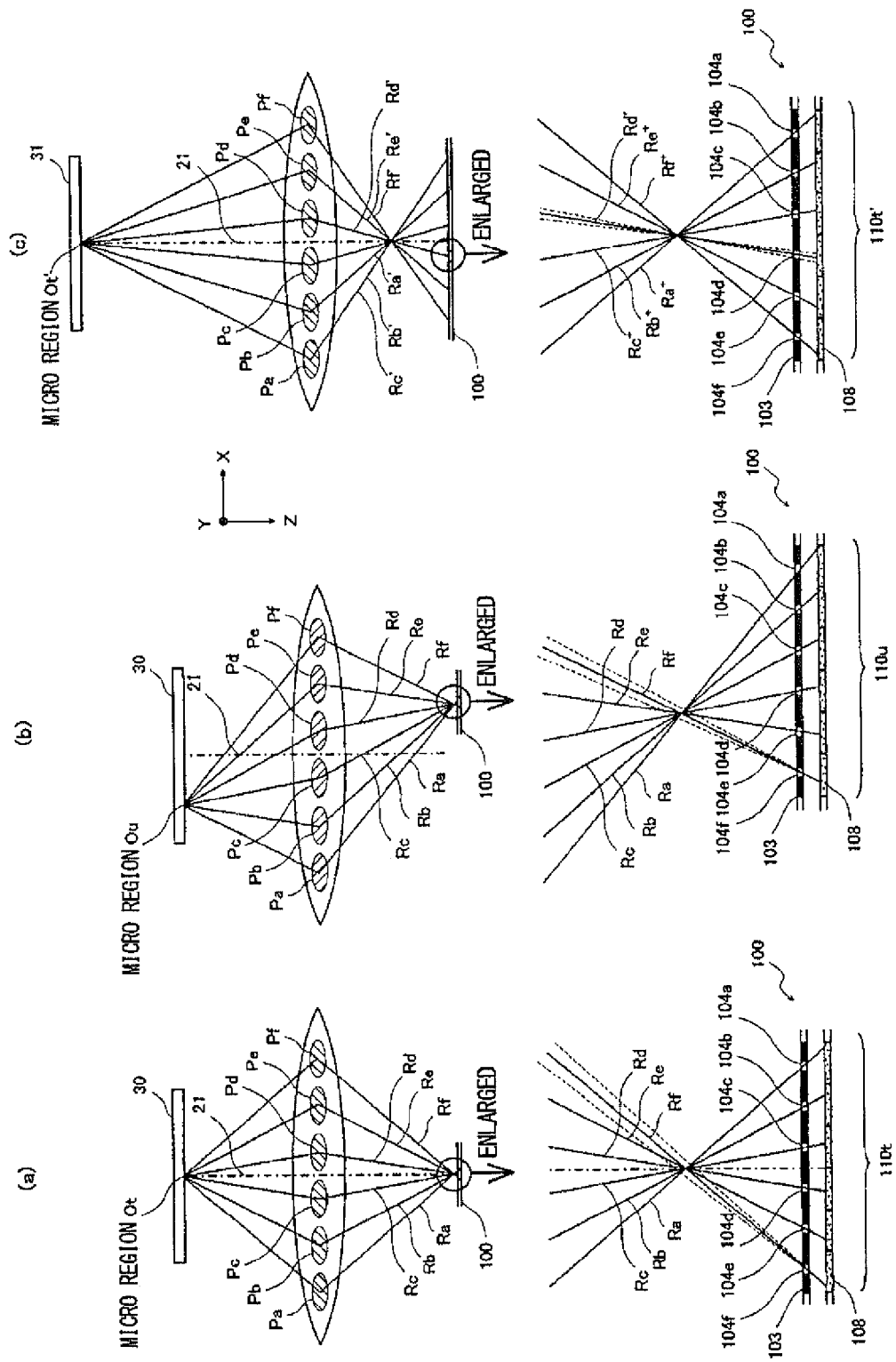
FIG. 4 shows conceptual diagrams that illustrate relations between parallax pixels and a subject.

FIG. 4 shows conceptual diagrams that illustrate relations between parallax pixels and a subject. In particular, FIG. 4 (a) illustrates a group of photoelectric conversion elements of a repetitive pattern 110t that are arranged at the center that is orthogonal to the image-capturing optical axis 21 of the image sensor 100, and FIG. 4 (b) schematically illustrates a group of photoelectric conversion elements of a repetitive pattern 110u that are arranged at a peripheral portion. A subject 30 in FIGS. 4 (a) and (b) is present at a focus position of the image-capturing lens 20. FIG. 4 (c) corresponds to FIG. 4 (a), and schematically illustrates the relation when a subject 31 that is present at a non-focus position of the image-capturing lens 20 is captured.

First, the relation between parallax pixels and a subject when the image-capturing lens 20 is capturing the subject 30 that is present in a focused state. A subject luminous flux passes the pupil of the image-capturing lens 20 and is guided to the image sensor 100, but six partial regions Pa to Pf are defined in the entire cross-sectional region that the subject luminous flux passes through. Additionally, for example, for the leftmost pixels, on the sheet, of the groups of photoelectric conversion elements that constitute the repetitive patterns 110t, 110u, the position of an opening 104f of the aperture mask 103 is defined such that only a subject luminous flux that has exited the partial region Pf reaches the photoelectric converter element 108, as can be seen in the enlarged view. Similarly, toward the rightmost pixels, the positions of an opening 104e, an opening 104d, an opening 104c, an opening 104b, and an opening 104a are defined corresponding to the partial region Pe, the partial region Pd, the partial region Pc, the partial region Pb, and the partial region Pa, respectively.

In other words, it may be possible to say that, for example, the position of the opening 104f is defined by the inclination of a primary ray Rf of a subject luminous flux (partial luminous flux) that exits from the partial region Pf, the inclination being defined by the relative positional relation between the partial region Pf and the leftmost pixel. Additionally, when the photoelectric converter element 108 receives, via the opening 104f, a subject luminous flux from the subject 30 that is present at the focus position, an image of the subject luminous flux is formed on the photoelectric converter element 108 as illustrated with dotted lines. Similarly, it can be said that, toward the rightmost pixel, the positions of the opening 104e, the opening 104d, the opening 104c, the opening 104b, and the opening 104a are defined by the inclinations of the primary ray Re, the primary ray Rd, the primary ray Re, the primary ray Rb, and the primary ray Ra, respectively.

As illustrated in FIG. 4 (a), a luminous flux radiated from a micro region Ot that intersects the optical axis 21 and is on the subject 30 that is present at the focus position passes through the pupil of the image-capturing lens 20, and reaches each pixel of the group of photoelectric conversion elements that constitute the repetitive pattern 110t. That is, each pixel of the group of photoelectric conversion elements that constitute the repetitive pattern 110t is receiving, via a corresponding one of the six partial regions Pa to Pf, a luminous flux radiated from the single micro region Ot. The micro region Ot has an area that corresponds to positional shifts of the respective pixels of the group of photoelectric conversion elements that constitute the repetitive pattern 110t, but can be substantially seen as an almost single object point. Similarly, as illustrated in FIG. 4 (b), a luminous flux radiated from a micro region Ou that is spaced away from the optical axis 21 and is on the subject 30 that is present at the focus position passes through the pupil of the image-capturing lens 20, and reaches each pixel of the group of photoelectric conversion elements that constitute the repetitive pattern 110u. That is, each pixel of the group of photoelectric conversion elements that constitute the repetitive pattern 110u is receiving, via a corresponding one of the six partial regions Pa to Pf, a luminous flux radiated from the single micro region Ou. Similar to the micro region Ot, the micro region Ou has an area that corresponds to positional shifts of the respective pixels of the group of photoelectric conversion elements that constitute the repetitive pattern 110u, but can be substantially seen as an almost single object point.

That is, as far as a subject 30 is present at the focus position, a micro region that the group of photoelectric conversion elements captures varies according to the position of the repetitive pattern 110 on the image sensors 100, and each pixel that constitutes the group of photoelectric conversion elements is capturing a single micro region via a mutually different partial region. Additionally, corresponding pixels in the respective repetitive pattern 110 are receiving subject luminous fluxes from the same partial region. That is, in the figures, for example the leftmost pixels of the repetitive patterns 110t, 110u are receiving subject luminous fluxes from the same partial region Pf.

The position of the opening 104f through which the leftmost pixel in the repetitive pattern 110t that is arranged at the center which is orthogonal to the image-capturing optical axis 21 receives a subject luminous flux from the partial region Pf is strictly different from the position of the opening 104f through which the leftmost pixel in the repetitive pattern 110u that is arranged at a peripheral portion receives a subject luminous flux from the partial region Pf. However, in terms of functionality, because these aperture masks are configured to receive subject luminous fluxes from the partial region Pf, they can be treated as the same type of aperture masks. Accordingly, in the examples of FIG. 4, each of the parallax pixels arranged on the image sensor 100 can be said to have one of the six types of aperture masks.

Next, the relation between parallax pixels and a subject when the image-capturing lens 20 is capturing the subject 31 that is present in a non-focus state is described. In this case also, a subject luminous flux from the subject 31 that is present at a non-focus position passes through the six partial regions Pa to Pf of the image-capturing lens 20, and reaches the image sensor 100. Note that an image of a subject luminous flux from the subject 31 present at the non-focus position is formed not on the photoelectric converter element 108, but at another position. For example, as illustrated in FIG. 4 (c), when the subject 31 is present at a position that is farther from the image sensor 100 than the subject 30 is, an image of a subject luminous flux is formed on a side of the photoelectric converter element 108 which is closer to the subject 31. On the contrary, when the subject 31 is present at a position closer to the image sensor 100 than the subject 30 is, an image of a subject luminous flux is formed on the other side of the photoelectric converter element 108, which is opposite to the subject 31.

Accordingly, a luminous flux radiated from a micro region Ot' which is on the subject 31 that is present at the non-focus position reaches a pixel in a different set of the repetitive pattern 110 depending on which of the six partial regions Pa to Pf it passes through. For example, as illustrated in the enlarged view of FIG. 4 (c), a subject luminous flux that has passed through the partial region Pd is, as a primary ray Rd', to be incident on the photoelectric converter element 108 that is included in the repetitive pattern 110t' and has the opening 104d. Additionally, a subject luminous flux that has been radiated from the micro region Ot', but has passed through another partial region is not to be incident on the photoelectric converter element 108 included in the repetitive pattern 110t', but is to be incident on the photoelectric converter element 108 that is included in another repetitive pattern and has a corresponding opening. In other words, a subject luminous flux that reaches each photoelectric converter element 108 that constitutes the repetitive pattern 110t' is a subject luminous flux radiated from a mutually different micro region of the subject 31. That is, a subject luminous flux whose primary ray is Rd' is incident on the photoelectric converter element 108 corresponding to the opening 104d, and subject luminous fluxes whose primary rays are $Ra^+$, $Rb^+$, $Rc^+$, $Re^+$, $Rf^+$ are incident on the photoelectric converter elements 108 corresponding to other openings. But these subject luminous fluxes are ones radiated from mutually different micro regions of the subject 31. Such a relation applies similarly to the repetitive pattern 110u in FIG. 4 (b) that is arranged at a peripheral portion.

When the image sensor 100 is seen as a whole, for example, a subject image A captured by the photoelectric converter element 108 corresponding to the opening 104a, and a subject image D captured by the photoelectric converter element 108 corresponding to the opening 104d do not exhibit a discrepancy when they are images of a subject that is present at a focus position, but do exhibit a discrepancy when they are images of a subject that is present at a non-focus position. Additionally, the direction and amount of the discrepancy are determined by in which direction and how much the subject that is present at the non-focus position is shifted from the focus position, and also by the distance between the partial region Pa and the partial region Pd. That is, the subject image A and the subject image D become parallax images of one another. This relation applies similarly to other openings, and thus six parallax images are formed corresponding to the openings 104a to 104f.

Accordingly, by gathering outputs of mutually corresponding pixels in the thus constituted respective repetitive patterns 110, a parallax image is obtained. That is, outputs of pixels that have received subject luminous fluxes having exited particular partial regions of the six partial regions Pa to Pf form a parallax image.

Figure 5:
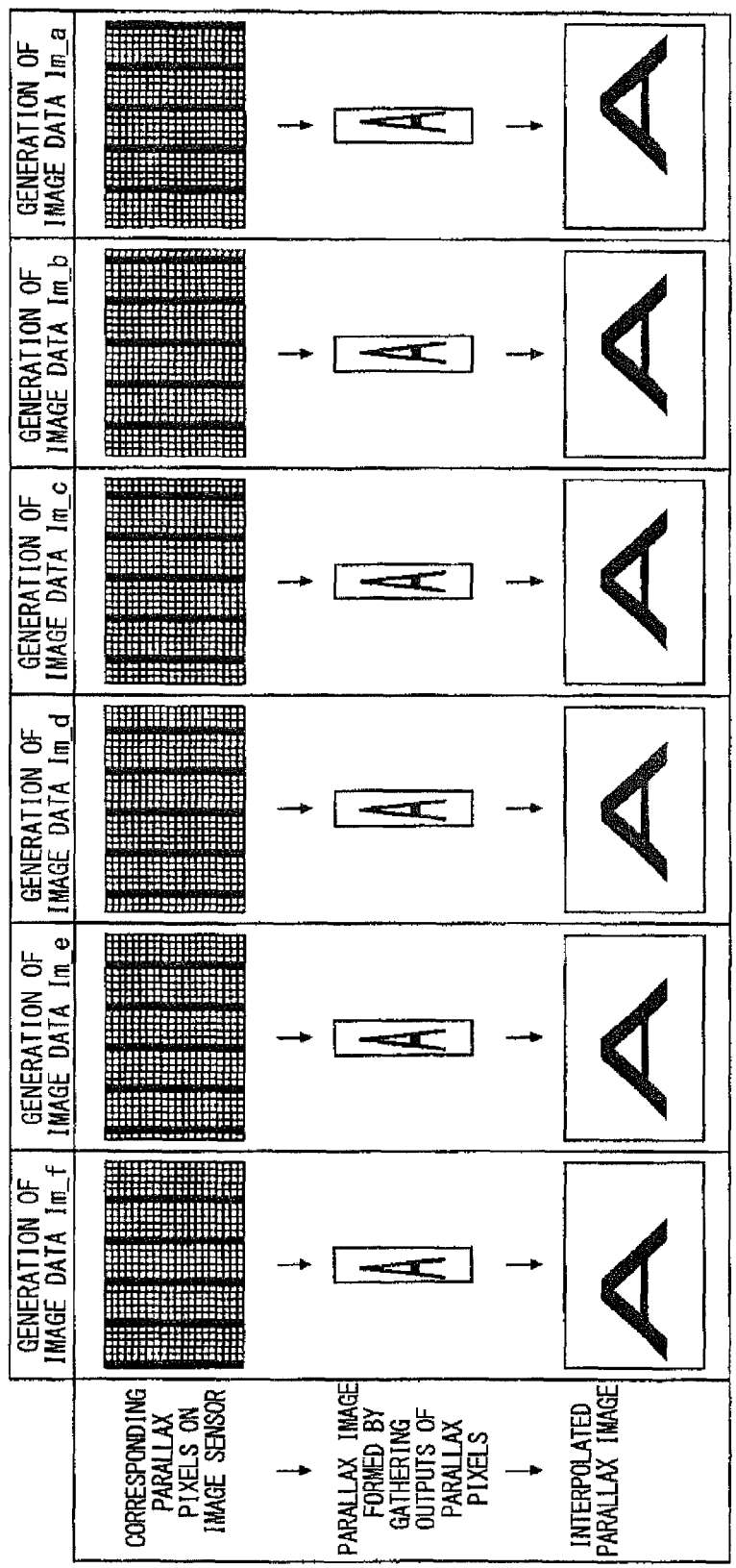
FIG. 5 is a conceptual diagram that illustrates processing of generating a parallax image.

FIG. 5 is a conceptual diagram that illustrates processing of generating a parallax image. FIG. 5 illustrates, from the leftmost column to the rightmost column: generation of parallax image data Im_f generated by gathering outputs of parallax pixels corresponding to the opening 104f; generation of parallax image data Im_e generated by gathering outputs of the opening 104e; generation of parallax image data Im_d generated by gathering outputs of the opening 104d; generation of parallax image data Im_c generated by gathering outputs of the opening 104c; generation of parallax image data Im_b generated by gathering outputs of the opening 104b; and generation of parallax image data Im_a generated by gathering outputs of the opening 104a. First, generation of the parallax image data Im_f generated by gathering outputs of the opening 104f is described.

The repetitive patterns 110 each consisting of a group of photoelectric conversion elements that is formed with a set of six parallax pixels are arranged horizontally in a line. Accordingly, parallax pixels having the openings 104f are present every other six pixels in the horizontal directions, and sequentially in the vertical directions, on the hypothetical image sensor 100 excluding no-parallax pixels. Each of these pixels is receiving a subject luminous flux from a mutually different micro region as described above. Accordingly, by gathering and arranging outputs of these parallax pixels, a parallax image is obtained.

However, because each pixel of the image sensor 100 in the present embodiment is a square pixel, simply gathering their outputs results in the number of pixels being evenly reduced to one sixth in the horizontal direction, and vertically long image data is generated.

To cope with this, by performing an interpolation process to sextuple the number of pixels in the horizontal direction, the parallax image data Im_f is generated as an image having an original aspect ratio. Note that because the parallax image data before an interpolation process is in the first place an image that is evenly reduced to one sixth in the horizontal direction, the resolution in the horizontal direction is lowered as compared with the resolution in the vertical direction. That is, the number of generated parallax image data and improvement of the resolution can be said to be contradictory. Note that a specific interpolation process to be applied to the present embodiment is described later.

Similarly, the parallax image data Im_e to Im_a is obtained. That is, the digital camera 10 can generate a parallax image with six viewpoints having parallax in the horizontal direction.

Figure 6:
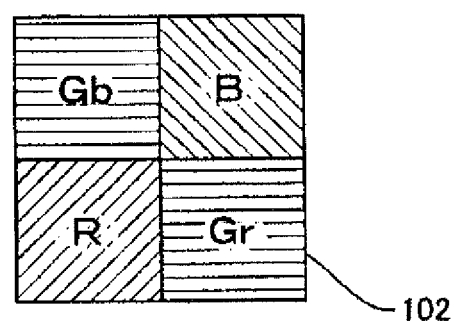
FIG. 6 illustrates the Bayer arrangement.

Next, the color filter 102 and a parallax image are described. FIG. 6 illustrates the Bayer arrangement. As illustrated, green filters are allocated to two upper left and lower right pixels, a red filter is allocated to one lower left pixel, and a blue filter is allocated to one upper right pixel in the Bayer arrangement. Here, the upper left pixel to which the green filter is allocated is referred to as a Gb pixel, and a lower right pixel to which the green filter is allocated similarly is referred to as a Gr pixel. Also, the pixel to which the red filter is allocated is referred to as an R pixel, and a pixel to which the blue filter is allocated is referred to as a B pixel. Additionally, a horizontal row in which the Gb pixel and the B pixel are arranged is referred to as a Gb row, and a horizontal row in which the R pixel and the Gr pixel are arranged is referred to as a Gr row. Also, a vertical column in which the Gb pixel and the R pixel are arranged is referred to as a Gb column, and a vertical column in which the B pixel and the Gr pixel are arranged is referred to as a Gr column.

An enormous number of the repetitive patterns 110 can be set depending on at which cycle parallax pixels and no-parallax pixels are allocated to how many colors of pixels in the arrangement of the color filter 102. By gathering outputs of no-parallax pixels, no-parallax captured image data can be generated similar to a normal captured image. Accordingly, a high resolution 2D image can be output by relatively increasing the percentage of no-parallax pixels. Because the percentage of parallax pixels becomes relatively low in this case, the image quality as a 3D image consisting of a plurality of parallax images is lowered. On the contrary, the image quality as a 3D image is improved by increasing the percentage of parallax pixels, but because no-parallax pixels are relatively decreased, a low resolution 2D image is output.

In such a trade-off relation, the repetitive patterns 110 having various features is set by determining which pixels are to be parallax pixels or alternatively to be no-parallax pixels. FIG. 7 shows various cases in which two types of parallax pixels are allocated to the Bayer arrangement. The parallax pixels in this case are assumed to be a parallax Lt pixel whose opening 104 is decentered leftward, and a parallax Rt pixel whose opening 104 is decentered rightward. That is, parallax images from two viewpoints output by such parallax pixels realize a so-called stereoscopic view.

Descriptions about features of the repetitive patterns are as shown in the figure. For example, when many no-parallax pixels are allocated, a high resolution 2D image data results, and when no-parallax pixels are evenly allocated to all of RGB, a higher quality 2D image data with less color drift results. On the other hand, when many parallax pixels are allocated, a high resolution 3D image data results, and when parallax pixels are allocated evenly to all of RGB, high quality color image data which represents a 3D image but achieves good color reproducibility results.

Figure 8:
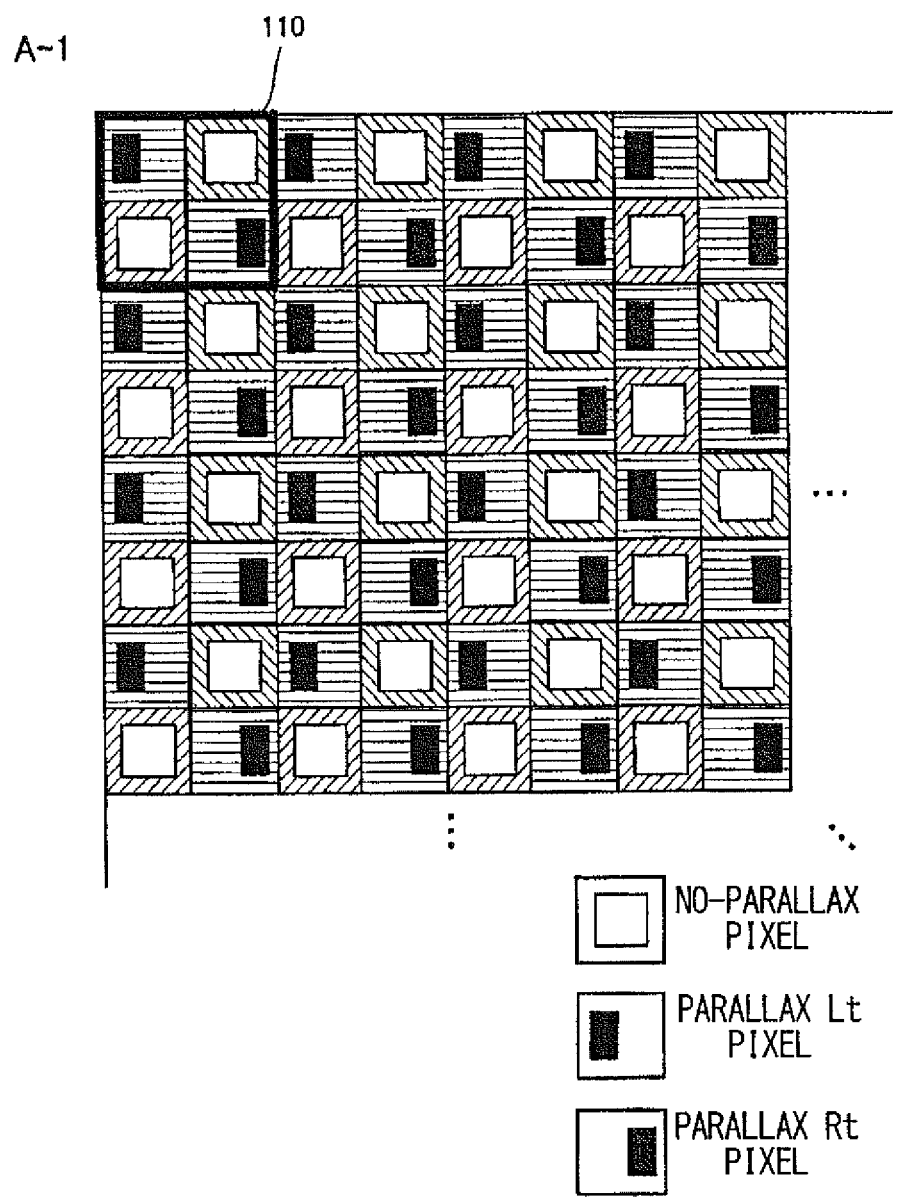
FIG. 8 illustrates one example of the various cases.

Several cases are described below. FIG. 8 illustrates one example of the various cases. The example in FIG. 8 corresponds to a repetitive pattern A-1 in FIG. 7.

In the example of FIG. 8, the repetitive pattern 110 includes four pixels like the Bayer arrangement. The R pixel and the B pixel are no-parallax pixels, the Gb pixel is allocated to the parallax Lt pixel, and the Or pixel is allocated to the parallax Rt pixel. In this case, the openings 104 are defined such that the parallax Lt pixel and the parallax Rt pixel included in the single repetitive pattern 110 receive luminous fluxes radiated from a single micro region when a subject is present at a focus position.

In the example of FIG. 8, it is possible to expect to obtain a high contrast parallax image because the Gb pixel and the Or pixel that are green pixels with high luminous sensitivity are used as parallax pixels.

Also, because the Gb pixel and the Gr pixel that are similarly green pixels are used as parallax pixels, conversion computation on outputs from these two pixels into no-parallax outputs can be easily performed, and high quality 2D image data can be generated together with outputs of the R pixel and the B pixel that are no-parallax pixels. Note that conversion computation is described later.

Figure 9:
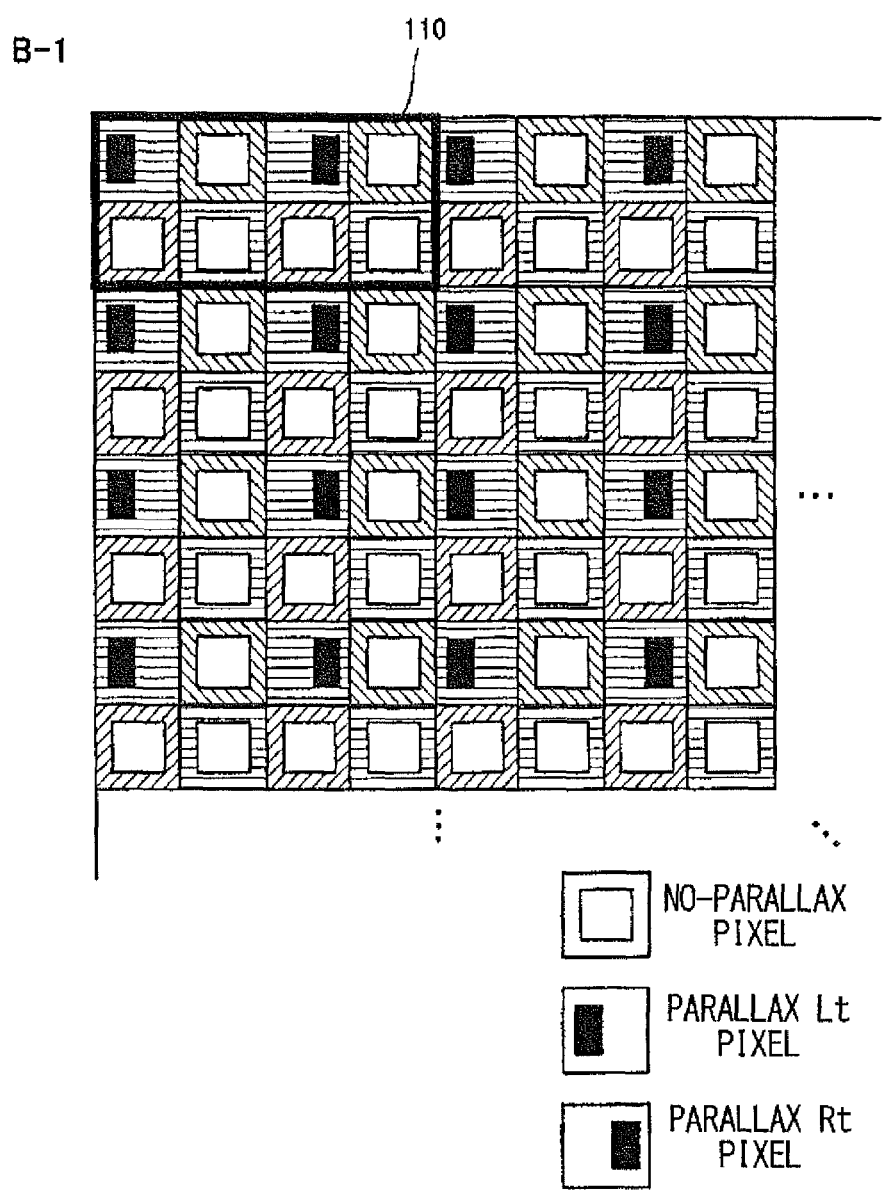
FIG. 9 illustrates another example of the various cases.

FIG. 9 illustrates another example of the various cases. The example in FIG. 9 corresponds to a repetitive pattern B-1 in FIG. 7.

In the example of FIG. 9, the repetitive pattern 110 includes eight pixels that are formed with two horizontally arranged sets of four pixels in the Bayer arrangement. Among the eight pixels, the parallax Lt pixel is allocated to the Gb pixel on the left side, and the parallax Rt pixel is allocated to the Gb pixel on the right side. In such an arrangement, a higher quality of a 2D image can be expected, as compared with the example of FIG. 8, because the Or pixel is used as a no-parallax pixel.

Figure 10:
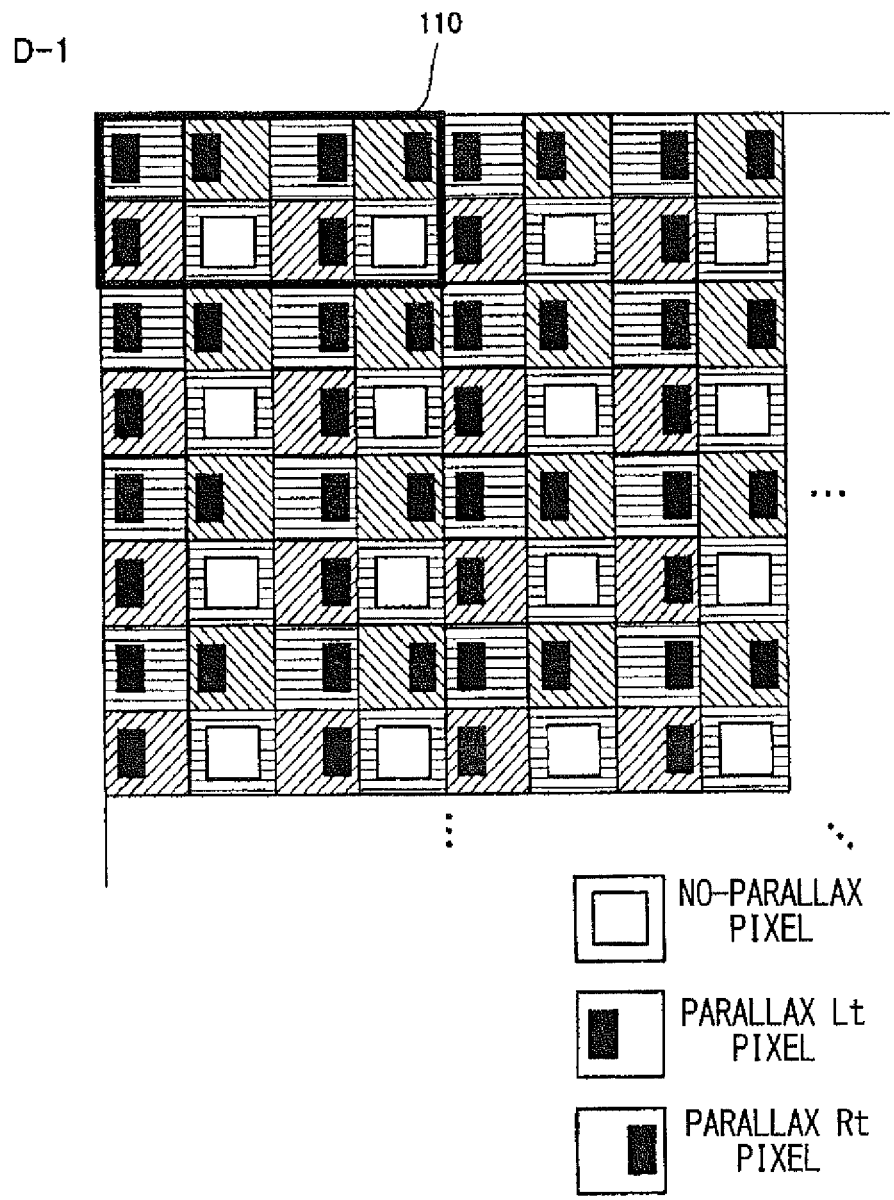
FIG. 10 illustrates another example of the various cases.

FIG. 10 illustrates still another example of the various cases. The example in FIG. 10 corresponds to a repetitive pattern D-1 in FIG. 7.

In the example of FIG. 10, the repetitive pattern 110 includes eight pixels that are formed with two horizontally arranged sets of four pixels in the Bayer arrangement. Among the eight pixels, the parallax Lt pixel is allocated to the Gb pixel on the left side, and the parallax Rt pixel is allocated to the Gb pixel on the right side. Furthermore, the parallax Lt pixel is allocated to the R pixel on the left side, and the parallax Rt pixel is allocated to the R pixel on the right side. Furthermore, the parallax Lt pixel is allocated to the B pixel on the left side, and the parallax Rt pixel is allocated to the B pixel on the right side. The no-parallax pixels are allocated to the two Or pixels.

The parallax Lt pixel and the parallax Rt pixel allocated to the two Gb pixels receive luminous fluxes radiated from a single micro region when a subject is present at a focus position. Also, the parallax Lt pixel and the parallax Rt pixel allocated to the two R pixels receive luminous fluxes radiated from a single micro region that is different from that for the Gb pixel, and the parallax Lt pixel and the parallax Rt pixel allocated to the two B pixels receive luminous fluxes radiated from a single micro region that is different from those for the Gb pixel and the R pixel. Accordingly, the resolution of a 3D image in the vertical direction is tripled as compared with the example of FIG. 9. In addition, because three color, RGB, outputs can be obtained, the 3D image has high quality as a color image.

Note that although parallax image of two perspectives are obtained by using two types of parallax pixels as described above, various numbers of the types of parallax pixels can naturally be employed according to the number of parallax images that are desired to be output. Even if the number of viewpoints increases, various repetitive patterns 110 can be formed. Accordingly, the repetitive pattern 110 can be selected according to specifications, purposes, etc.

Although in the above-described example, the color filter arrangement employed is the Bayer arrangement, another color filter arrangement may be employed without any problems. At this time, each of parallax pixels that constitute a group of photoelectric conversion elements may comprise the aperture mask 103 that has the opening 104 that faces a mutually different partial region.

Accordingly, the image sensor 100 may have: the photoelectric converter elements 108 that perform photoelectric conversion of incident light into electrical signals, and are arranged two-dimensionally; the aperture masks 103 that are provided in a one-to-one correspondence with at least a part of the photoelectric converter elements 108; and the color filters 102 that are provided in a one-to-one correspondence with at least a part of the photoelectric converter elements 108, wherein the openings 104 of the aperture masks 103 that are provided corresponding to at least two (or three or more) of the n adjacent photoelectric converter elements 108 (n is an integer equal to or larger than three) may be included in one pattern of color filter patterns constituted with at least three types of the color filters 102 that allow passage of mutually different wavelength ranges, and be positioned to allow passage of luminous fluxes from mutually different partial regions within a cross-sectional region of the incident light; and groups of photoelectric conversion elements each comprised of the n photoelectric converter elements 108 may be arranged periodically.

Figure 11:
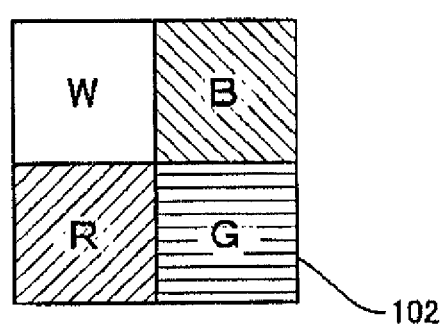
FIG. 11 illustrates another color filter arrangement.

FIG. 11 illustrates another color filter arrangement. As illustrated, in the other color filter arrangement, the Gr pixel in the Bayer arrangement illustrated in FIG. 6 is kept as the G pixel to which a green filter is allocated, but the Gb pixel is changed to a W pixel to which a color filter is not allocated. Note that an uncolored transparent filter may be arranged in the W pixel so as to allow passage of the almost entire wavelength range of visible light as described above, By employing such a color filter arrangement including the W pixel, although the accuracy of color information output by the image sensor is lowered to some extent, highly accurate luminance information can be obtained because the amount of light received by the W pixel is large as compared with the amount of light received by a color filter. A monochrome image can be formed by gathering outputs of the W pixels.

In a case of the color filter arrangement including the W pixels, there are more examples of the repetitive pattern 110 of parallax pixels and no-parallax pixels. For example, even if an image is captured in a comparatively dark environment, the contrast of a subject image is high if the image is output from the W pixels, as compared with an image output from color pixels. Therefore, by allocating parallax pixels to the W pixels, a highly accurate computation result can be expected in a matching process that is performed among a plurality of parallax images Accordingly, in addition to the effects on the resolution of a 2D image and the image quality of a parallax image, considering advantages and disadvantages about other information to be extracted, the repetitive pattern 110 of parallax pixels and no-parallax pixels is set.

Figure 12:
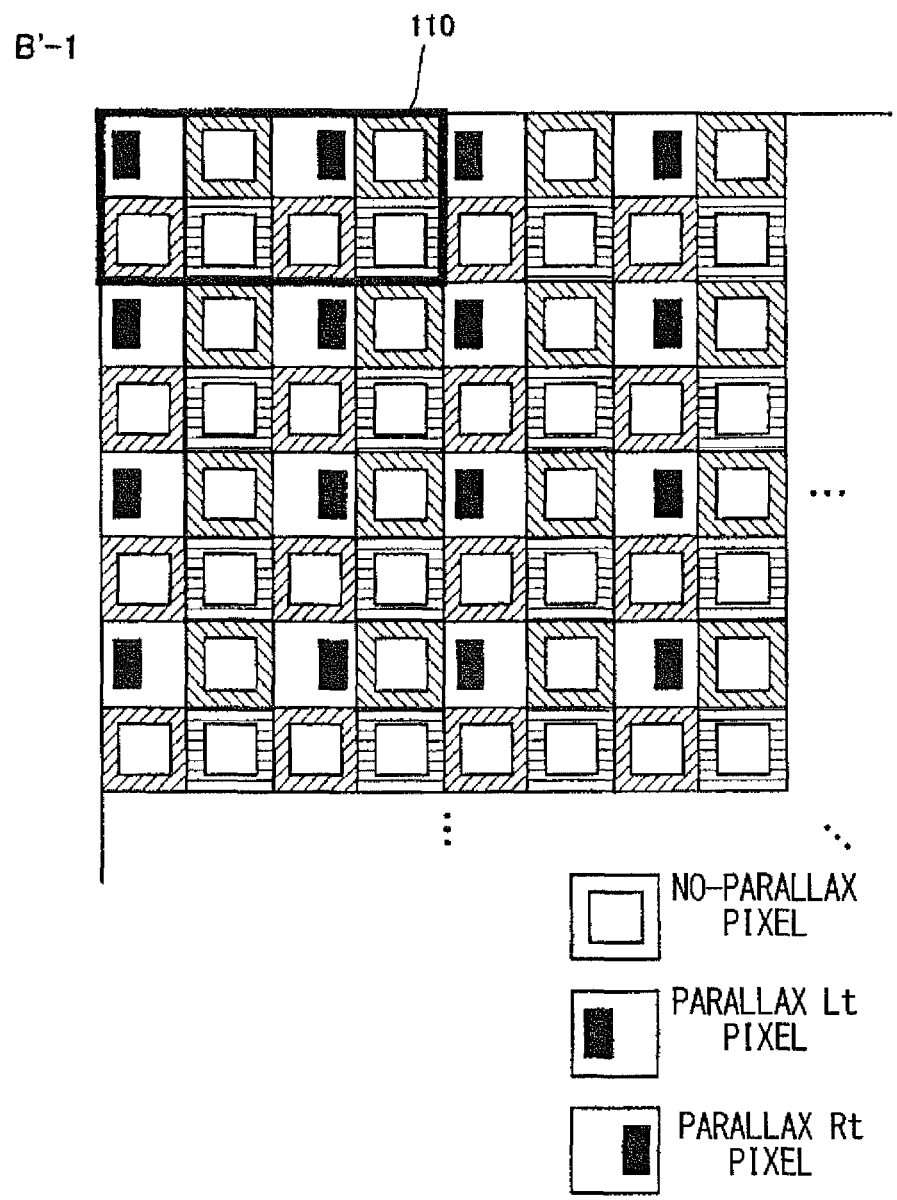
FIG. 12 illustrates one example of an arrangement of W pixels and parallax pixels.

FIG. 12 illustrates one example of an arrangement of W pixels and parallax pixels in a case where the other color filter arrangement in FIG. 11 is employed. Because the example of FIG. 12 is similar to the repetitive pattern B-1 of FIG. 7 in the Bayer arrangement, it is referred to here as B'-1. In the example of FIG. 12, the repetitive pattern 110 includes eight pixels that are formed with two horizontally arranged sets of four pixels in the other color filter arrangement. Among the eight pixels, the parallax Lt pixel is allocated to the W pixel on the left side, and the parallax Rt pixel is allocated to the W pixel on the right side. In such an arrangement, the image sensor 100 can output a parallax image as an monochrome image, and output a 2D image as a color image.

In this case, the image sensor 100 may have: the photoelectric converter elements 108 that perform photoelectric conversion of incident light into electrical signals, and are arranged two-dimensionally; the aperture masks 103 that are provided in a one-to-one correspondence with at least a part of the photoelectric converter elements 108; and the color filters 102 that are provided in a one-to-one correspondence with at least a part of the photoelectric converter elements 108, wherein the openings 104 of the aperture masks 103 that are provided corresponding to at least two of the n adjacent photoelectric converter elements 108 (n is an integer equal to or larger than four) may not be included in one pattern of color filter patterns constituted with at least three types of the color filters 102 that allow passage of mutually different wavelength ranges, and be positioned to allow passage of luminous fluxes from mutually different partial regions within a cross-sectional region of the incident light; and groups of photoelectric conversion elements each comprised of the n photoelectric converter elements 108 may be arranged periodically.

Thus, each pixel that constitutes the image sensor 100 is characterized by various combinations of a parallax pixel and a no-parallax pixel regarding the opening 104, and the R pixel, the G pixel, the B pixel and the W pixel regarding the color filter 102. Accordingly, simply putting outputs of the image sensor 100 side by side in accordance with its pixel arrangement does not produce image data that represents a particular image. That is, only by gathering outputs of pixels of the imaging sensor 100 that belong to a group of pixels that are characterized in an identical manner separately from outputs of another group, image data that represents a single image that conforms to the characteristics is formed. For example, as described already by referring to FIG. 5, by gathering outputs of parallax pixels having the same types of openings, respectively, a plurality of pieces of parallax image data having parallax with respect to one another can be obtained. In this manner, image data that is formed by gathering outputs of a group of pixels that are characterized in an identical manner separately from outputs of another group is referred to as plane data.

Figure 13:
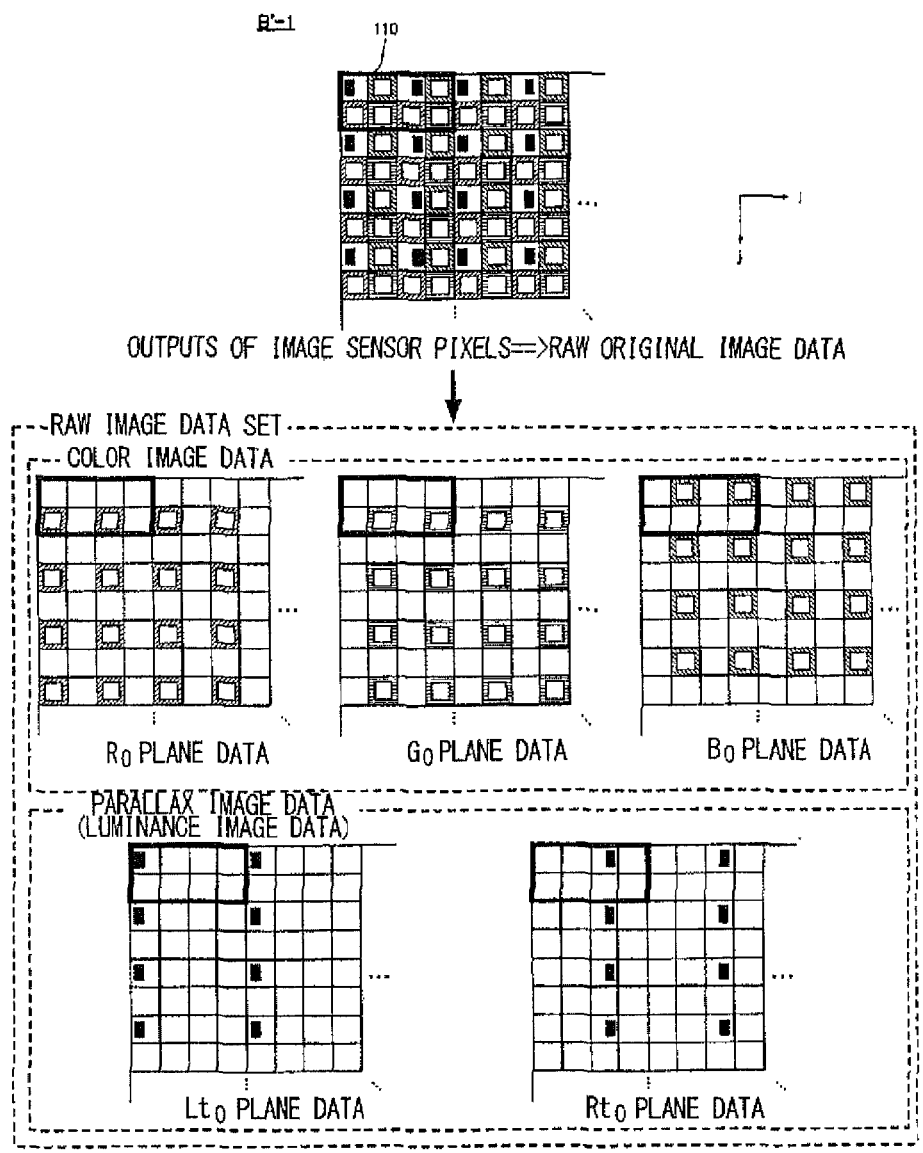
FIG. 13 illustrates a plane separation process.

The image processor 205 receives RAW original image data in which output values are put side by side in the order of the pixel arrangement of the image sensor 100, and performs a plane separation process for separating the RAW original image data into a plurality of pieces of plane data. FIG. 13 illustrates a plane separation process, taking the repetitive pattern of B'-1 described by referring to FIG. 12 as an example. Note that, as illustrated, an i-axis and a j-axis are defined rightward and downward, respectively, relative to the pixel arrangement of the image sensor 100. Also, the leftmost and uppermost coordinate is (1, 1), and the rightmost and lowermost coordinate is $(i_0, j_0)$. Although in FIG. 13, pixels are illustrated such that their types can be understood in accordance with the example of FIG. 12, output values corresponding to respective pixels are lined up in actual plane data.

As illustrated schematically in the upper portion of FIG. 13, in the row i=1 of the RAW original image data, output values of parallax Lt pixels, no-parallax B pixels, parallax Rt pixels, and no-parallax B pixels are lined up repeatedly in this order from (1, 1) to $(i_0, 1)$. Also, in the row i=2, from (1, 2) to $(i_0, 2)$, output values of no-parallax R pixels, and no-parallax G pixels (Gr pixels) are lined up repeatedly in this order. In the RAW original image data, output values like these in the row direction are lined up alternately and repeatedly also in the column direction.

The image processor 205 separates the RAW original image data into pieces of plane data. Each piece corresponds to a group of pixels that are characterized in an identical manner and include parallax Lt pixels, parallax Rt pixels, no-parallax R pixels, no-parallax G pixels, or no-parallax B pixels. In the repetitive pattern B'-1, the RGB color pixels are no-parallax pixels, and the parallax pixel is a W pixel. The image processor 205 generates $R_0$ plane data, $G_0$ plane data, and $B_0$ plane data by separating only no-parallax R pixels, no-parallax G pixels, and no-parallax B pixels, respectively, from the RAW original image data, and manages these pieces of plane data collectively as color image data.

Similarly, the image processor 205 generates $Lt_0$ plane data and $Rt_0$ plane data by separating only parallax Lt pixels and parallax Rt pixel, respectively, from the RAW original image data, and manages these pieces of plane data collectively as parallax image data. Here, because it can be said that the parallax image data does not include color information, but represents luminance information of a subject image, it can be handled as luminance image data. In the present embodiment, an output value of each plane belonging to color image data is referred to as a pixel value, and an output value of each plane belonging to luminance image data is referred to as a luminance value. Also, the image processor 205 manages, as a RAW image data set, the color image data and the parallax image data as a group of plane data generated from a single piece of RAW original image data.

In each piece of the plane data at this point, as illustrated, output values exist only at pixel positions at which output values exist in the RAW original image data. For example, in the $R_0$ plane data, output values (pixel values) exist for two pixels in a single repetitive pattern 110, and other six pixels are present as vacant lattices. Similarly, in the $Lt_0$ plane data, an output value (luminance value) exists for one pixel in a single repetitive pattern, and other seven pixels are present as vacant lattices. The image processor 205 performs an interpolation process to fill vacant lattices of each piece of plane data.

Figure 14:
FIG. 14 illustrates a plane data interpolation process.

FIG. 14 illustrates a plane data interpolation process. Here, an interpolation process is performed on the $R_0$ plane data including vacant lattices to generate the Rn plane data not including vacant lattices.

As an interpolation process, the image processor 205 uses pixel values of pixels in the proximity of vacant lattices to generate pixel values of the vacant lattices. For example, if there are pixel values of pixels that are adjacent to a target vacant lattice, the average value of the pixel values is used as a pixel value of the vacant lattice. Also, when non-adjacent pixels are to be used, an averaging process is performed by adding weight according to the distance from the vacant lattice.

Figure 15:
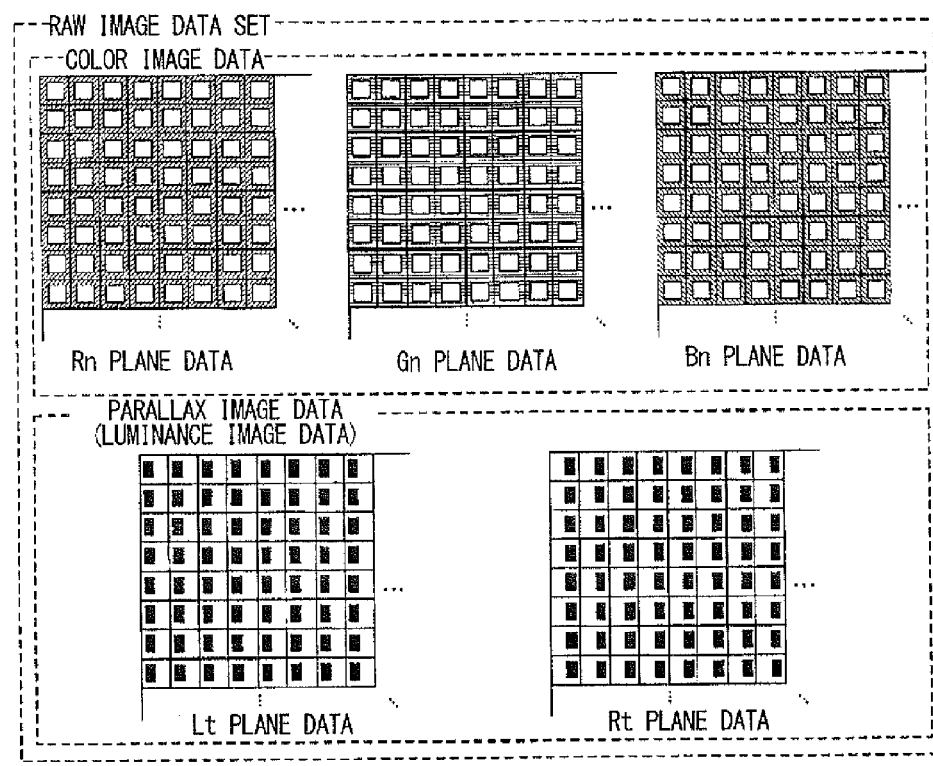
FIG. 15 illustrates the data structure of a RAW image data set.

By performing an interpolation process in this manner, vacant lattices can be removed from each piece of plane data. FIG. 15 illustrates the data structure of a RAW image data set after performing an interpolation process.

As illustrated, color image data that constitutes the RAW image data set includes Rn plane data, Gn plane data, and Bn plane data not including vacant lattices. These pieces of image data correspond to image data obtained by extracting only red color components, green color components, and blue color components, respectively, from a subject image.

Similarly, parallax image data (luminance image data) that constitutes the RAW image data set include Lt plane data and Rt plane data not including vacant lattices. These pieces of image data correspond to image data obtained by extracting luminance components of a left-side viewpoint and a right-side viewpoint, respectively, from the subject image.

In the present embodiment, the image processor 205 uses these five pieces of plane data to generate left-side viewpoint color image data and right-side viewpoint color image data. (in a second embodiment described later, color image data whose disparity is arbitrarily adjusted while keeping a blur amount by introducing a stereoscopic adjustment parameter is generated.) Before describing specific processing, the principle of generation is first described.

Figure 16:
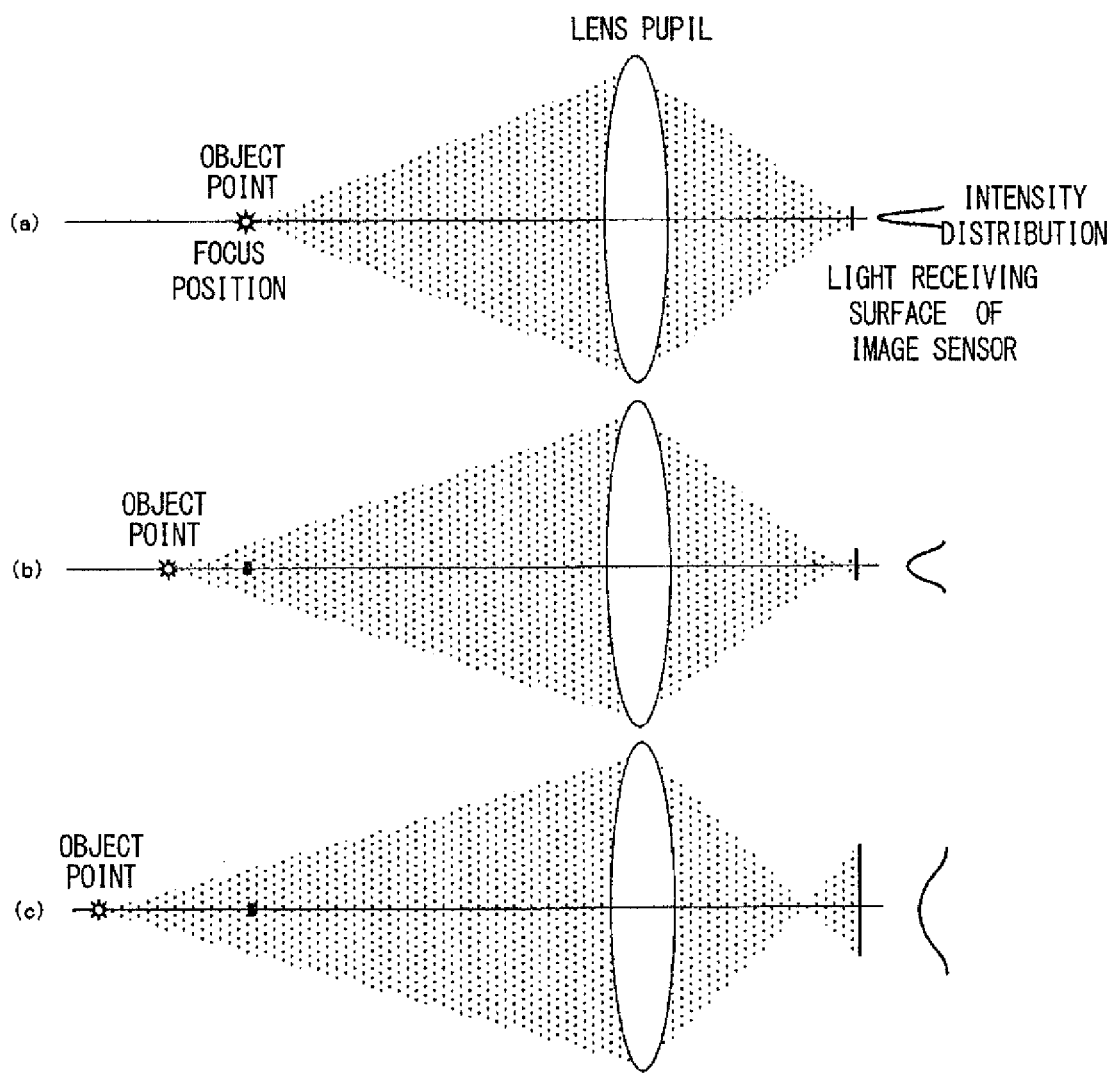
FIG. 16 illustrates the concept of defocusing.

FIG. 16 illustrates the concept of defocusing. As shown in FIG. 16 (*a*), when an object point, which is a subject, is at a focus position, the subject luminous flux that passes through a lens pupil and reaches the light receiving surface of an image sensor exhibits a steep optical intensity distribution having the pixel of the corresponding image point at the center. In other words, if a no-parallax pixel that receives the entire effective luminous flux passing through the lens pupil is arranged in the vicinity of the image point, the pixel corresponding to the image point has the highest output value, and the surrounding pixels have radically lowered output values.

On the other hand, as shown in FIG. 16 (*b*), when the object point is off the focus position, the subject luminous flux exhibits a less steep optical intensity distribution at the light receiving surface of the image sensor, when compared with the case where the object point is at the focus position. Stated differently, such a distribution is observed that the pixel of the corresponding image point has a lowered output value, and more surrounding pixels have output values.

Also, when the object point is further off the focus position as shown in FIG. 16 (*c*), the subject luminous flux exhibits a further less steep optical intensity distribution at the light receiving surface of the image sensor. Stated differently, such a distribution is observed that the pixel of the corresponding image point has a further lowered output value, and further more surrounding pixels have output values.

Next, the concept of defocusing when a parallax Lt pixel and a parallax Rt pixel receive light is described.

Figure 17:
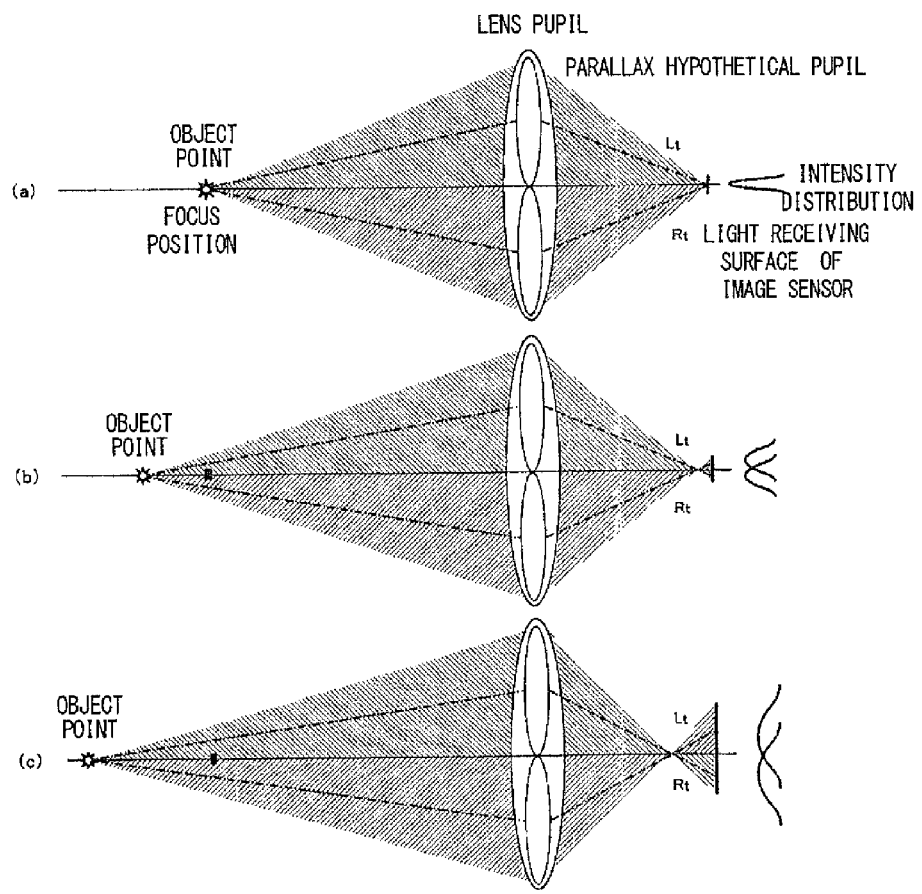
FIG. 17 illustrates the concept of parallax pixel defocusing.

FIG. 17 illustrates the concept of parallax pixel defocusing. A parallax Lt pixel and a parallax Rt pixel receive subject luminous fluxes from two parallax hypothetical pupils that are set symmetrically with respect to the optical axis as the partial regions of a lens pupil.

When an object point, which is a subject, is at a focus position as shown in FIG. 17 (*a*), both of the subject luminous fluxes passing through the respective parallax hypothetical pupils exhibit a steep optical intensity distribution having the pixel of the corresponding image point at the center. If the parallax Lt pixel is arranged in the vicinity of the image point, the pixel corresponding to the image point has the highest output value, and the surrounding pixels have radically lowered output values. If the parallax Rt pixel is arranged in the vicinity of the image point, the pixel corresponding to the image point also has the highest output value, and the surrounding pixels also have radically lowered output values. Thus, irrespective of which of the parallax hypothetical pupils the subject luminous flux passes through, such a distribution is observed that the pixel corresponding to the image point has the highest output value, and the surrounding pixels have radically lowered output values, and the respective distributions match with each other.

On the other hand, if the object point is off the focus position as shown in FIG. 17 (*b*), the peak of the optical intensity distribution exhibited by the parallax Lt pixel appears at a position shifted in one direction from the pixel corresponding to the image point and has a lowered output value, when compared with the case where the object point is at the focus position. Furthermore, more pixels have output values. The peak of the optical intensity distribution exhibited by the parallax Rt pixel appears at a position shifted, from the pixel corresponding to the image point, in the opposite direction by the same distance to the peak of the optical intensity distribution exhibited by the parallax Lt pixel and has a lowered output value in a similar manner. Likewise, more pixels have output values. Thus, the identical optical intensity distributions that are less steep than the case where the object point is at the focus position are spaced away by the same distance from the pixel corresponding to the image point. Also, if the object point is further off the focus position as shown in FIG. 17 (*c*), the identical optical intensity distributions that are further less steep than the state of FIG. 17 (*b*) are further spaced away. That is, the more the object point is offset from the focus position, the larger the blur amount and the disparity. In other words, the blur amount and the disparity change in conjunction with defocusing. That is, the blur amount and the disparity have a one-to-one relation.

Figure 18:
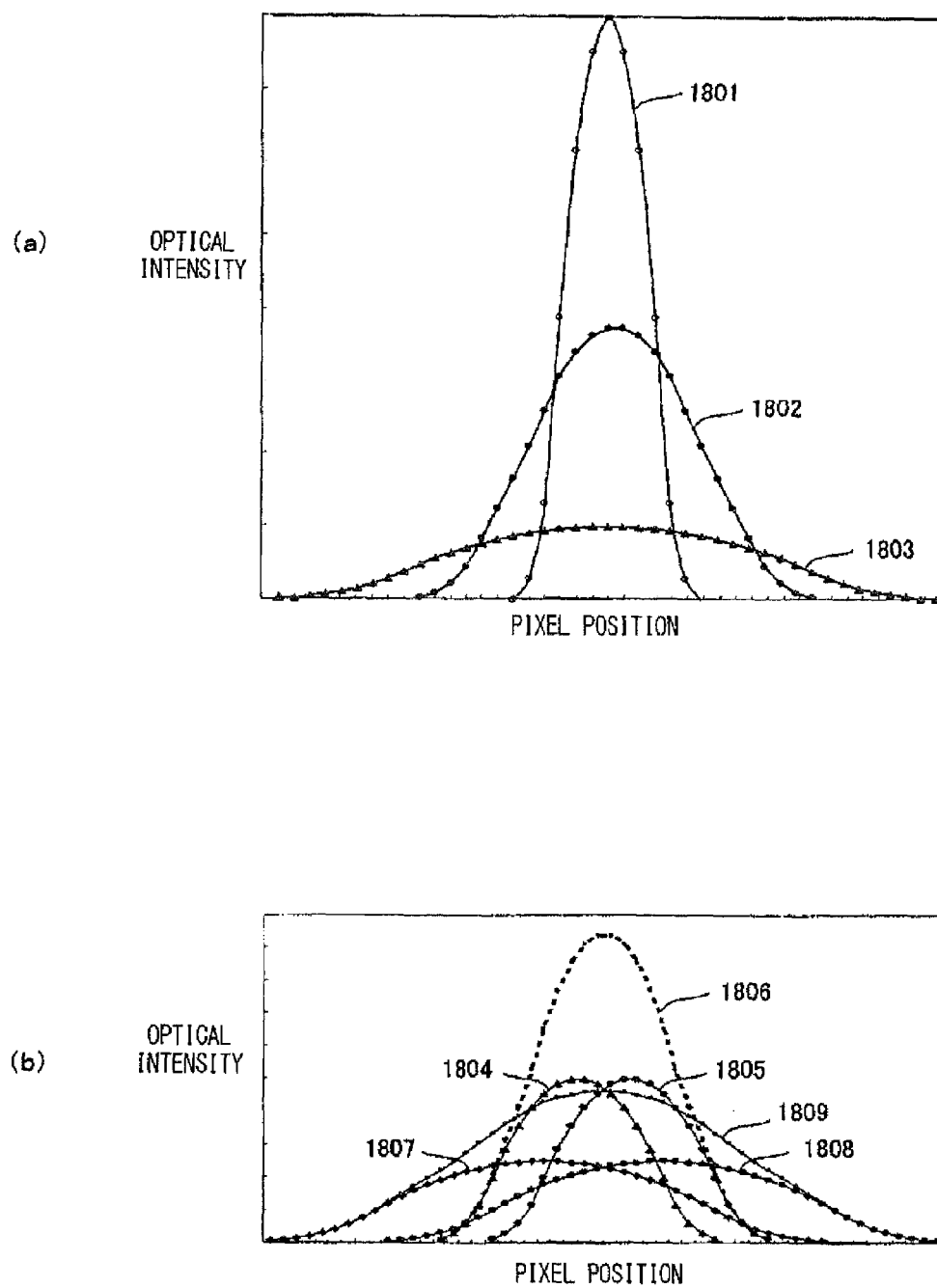
FIG. 18 illustrates optical intensity distributions of no-parallax pixels and parallax pixels.

The change in optical intensity distribution illustrated in FIG. 16 and the change hi optical intensity distribution illustrated in FIG. 17 are respectively represented by graphs in FIG. 18. FIG. 18 shows the optical intensity distributions exhibited by no-parallax and parallax pixels. In addition, the vertical axis represents the output value of each pixel, which is substantially in proportion to the optical intensity and thus represented as the optical intensity in FIG. 18.

FIG. 18 (*a*) is a graph showing the change in optical intensity distribution illustrated in FIG. 16. A distribution curve 1801 represents the optical intensity distribution corresponding to FIG. 16 (*a*) and the steepest case. A distribution curve 1802 represents the optical intensity distribution corresponding to FIG. 16 (b), and a distribution curve 1803 represents the optical intensity distribution corresponding to FIG. 16 (c). When the distribution curves 1802 and 1803 are compared with the distribution curve 1801, it can be seen that the peak value gradually drops and the distribution broadens.

FIG. 18 (b) is a graph showing the change in optical intensity distribution illustrated in FIG. 17. Distribution curves 1804 and 1805 respectively represent the optical intensity distributions of the parallax Lt and Rt pixels shown in FIG. 17 (b). As seen from FIG. 18 (b), these distributions are line-symmetrically shaped with respect to the center position. A composite distribution curve 1806 resulting from adding these distributions together is similarly shaped to the distribution curve 1802 corresponding to the case of FIG. 16 (b), which shows a similar defocused state to FIG. 17 (b).

Distribution curves 1807 and 1808 respectively represent the optical intensity distributions of the parallax Lt and Rt pixels shown in FIG. 17 (c). As seen from FIG. 18 (b), these distributions are also line-symmetrically shaped with respect to the center position. A composite distribution curve 1809 resulting from adding these distributions together is similarly shaped to the distribution curve 1803 corresponding to the case of FIG. 16 (c), which shows a similar defocused state to FIG. 17 (c).

In the present embodiment, left-side viewpoint color image data and right-side viewpoint color image data are generated from five pieces of plane data that constitute a RAW image data set by using properties of such optical intensity distributions. The left-side viewpoint color image data is constituted with three pieces of color parallax plane data that are RLt plane data, GLt plane data, and BLt plane data that are red plane data, green plane data, and blue plane data, respectively, corresponding to the left-side viewpoint. Similarly, the right-side viewpoint color image data is constituted with three pieces of color parallax plane data that are RRt plane data, GRt plane data, and BRt plane data that are red plane data, green plane data, and blue plane data, respectively, corresponding to the right-side viewpoint.

Figure 19:
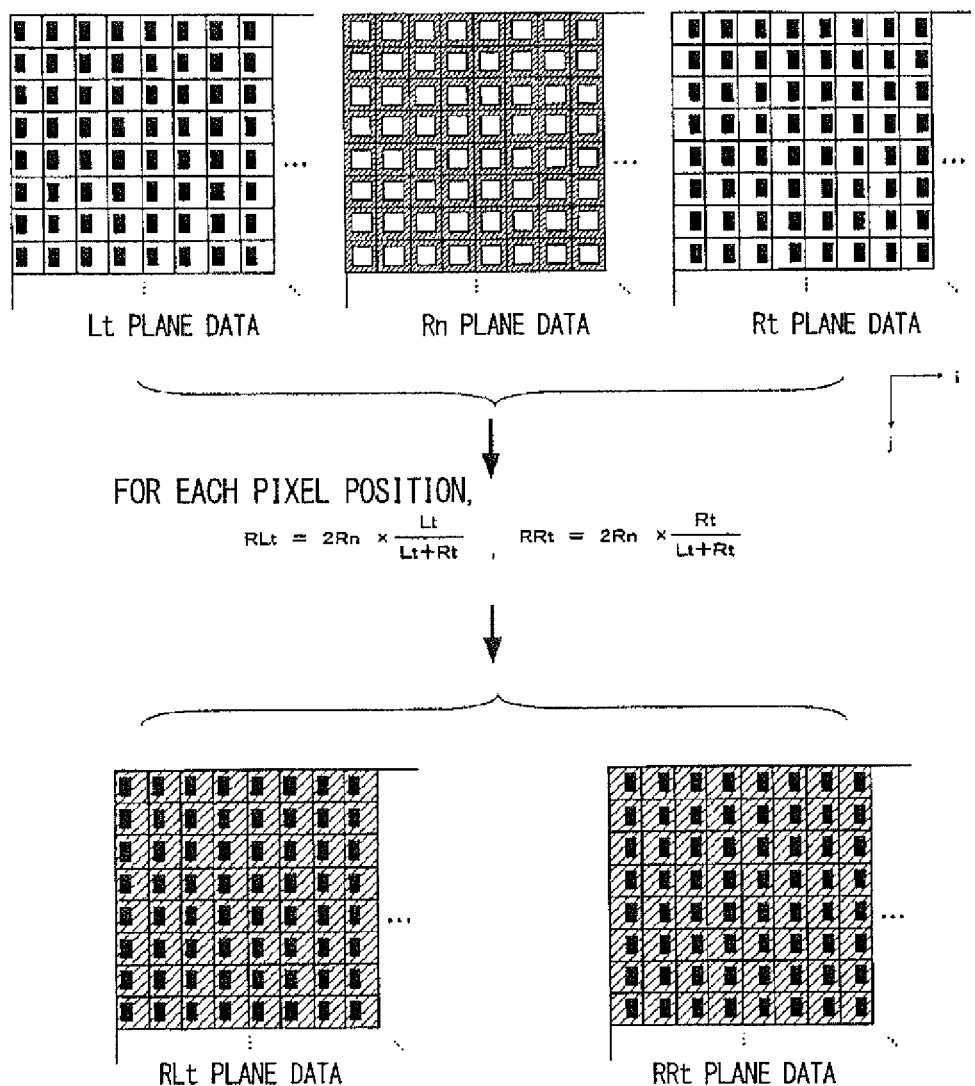
FIG. 19 illustrates a color parallax plane data generation process.

FIG. 19 illustrates a color parallax plane data generation process. In particular, a process of generating the RLt plane data and the RRt plane data that correspond to a red parallax plane of color parallax planes is illustrated.

The red parallax plane is generated by using a pixel value of the Rn plane data and luminance values of the Lt plane data and the Rt plane data that are described by referring to FIG. 15. Specifically, for example when a pixel value $RLt_{mn}$ at a target pixel position $(i_m, j_n)$ of the RLt plane data is calculated, first, the pixel value extracting unit 231 of the image processor 205 extracts a pixel value $Rn_{mn}$ from the same pixel position $(i_m, j_n)$ of the Rn plane data. Next, the luminance value extracting unit 232 of the image processor 205 extracts a luminance value $Lt_{mn}$ from the same pixel position $(i_m, j_n)$ of the Lt plane data, and a luminance value $Rt_{mn}$ from the same pixel position $(i_m, j_n)$ of the Rt plane data. The calculating unit 233 of the image processor 205 distributes the pixel value $Rn_{mn}$ at the ratio of the luminance values $Lt_{mn}$, $Rt_{mn}$ to calculate the pixel value $RLt_{mn}$. Specifically, the following expression (1) is used for calculation.

$$RLt_{mn}=2Rn_{mn}\times Lt_{mn}/(Lt_{mn}+Rt_{mn}) \tag{1}$$

Similarly, when calculating a pixel value $RRt_{mn}$ at the target pixel position $(i_m, j_n)$ of the RRt plane data, the calculating unit 233 distributes the pixel value $Rn_{mn}$ extracted by the pixel value extracting unit 231 at the ratio of the luminance value Lt and the luminance value $Rt_{mn}$ extracted by the luminance value extracting unit 232 for calculation. Specifically, the following expression (2) is used for calculation.

$$RRt_{mn}=2Rn_{mn}\times Rt_{mn}/(Lt_{mn}+Rt_{mn}) \tag{2}$$

The image processor 205 sequentially performs such processing starting from (1, 1) that is the leftmost and uppermost pixel to $(i_0, j_0)$ that is the rightmost and lowermost coordinate.

After completion of the process of generating the RLt plane data and the RRt plane data that correspond to the red parallax plane, next, a process of generating the GLt plane data and the GRt plane data that correspond to the green parallax plane is performed. Specifically, similar processing is performed by extracting a pixel value $Gn_{mn}$ from the same pixel position $(i_m, j_n)$ of the Gn plane data, instead of extracting the pixel value $Rn_{mn}$ from the same pixel position $(i_m, j_n)$ of the Rn plane data as described above. Furthermore, after completion of the process of generating the GLt plane data and the GRt plane data that correspond to the green parallax plane, next, a process of generating the BLt plane data and the BRt plane data that correspond to the blue parallax plane is performed. Specifically, similar processing is performed by extracting a pixel value $Bn_{mn}$ from the same pixel position $(i_m, j_n)$ of the Bn plane data, instead of extracting the pixel value $Rn_{mn}$ from the same pixel position $(i_m, j_n)$ of the Rn plane data as described above.

By the above-described processing, the left-side viewpoint color image data (RLt plane data, GLt plane data, and BLt plane data), and the right-side viewpoint color image data (RRt plane data, GRt plane data, and BRt plane data) are generated. That is, by relatively simple processing, the left-side viewpoint and right-side viewpoint color image data can be obtained as hypothetical outputs of the parallax Lt pixels and the parallax Rt pixels that are actually not present as pixels of the image sensor 100 and also have color filters of any of RGB. Accordingly, by reproducing these pieces of image data with a reproduction apparatus that supports a 3D image, a user can view a 3D video as a color image. In particular, because the processing is simple, image data can be generated at a high speed, and motion images can be also supported.

It was described above that when parallax pixels are evenly allocated to pixels of any of RGB on the actual image sensor 100, a high quality color image data that is a 3D image but has good color reproducibility can be obtained. But actually it can be said that, even when such pixels are not provided, by performing the above-described processing, correspondingly high quality 3D color image data can be obtained. Also, because parallax pixels do not have to be allocated to RGB pixel as actual pixels, other plane data can be allowed to have high quality by a corresponding degree.

Figure 20:
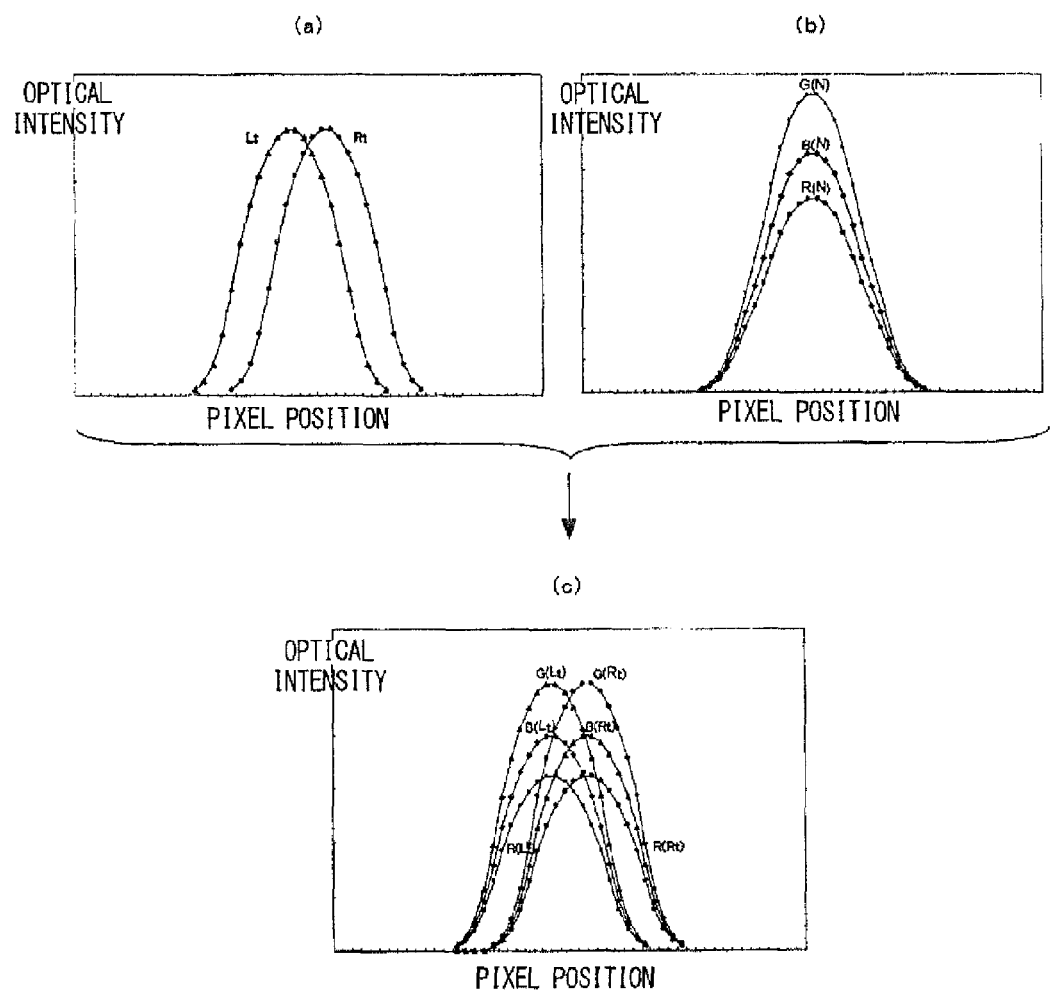
FIG. 20 illustrates changes in optical intensity distributions.

Next, the above-described processing is described in terms of optical intensity distributions. FIG. 20 illustrates changes in optical intensity distributions. FIG. 20 (a) is a graph showing output values of a parallax Lt pixel and output values of a parallax Rt pixel that are W pixels when a subject luminous flux from an object point that is present at a position that is off a focus position by a certain amount is received. These output values are luminance values not including color information. Also, because as described above, output values of a pixel are proportional to an optical intensity, the graph can be said to represent an optical intensity distribution.

FIG. 20 (b) is a graph showing output values of an R pixel, a G pixel, and a B pixel that are no-parallax pixels when a subject luminous flux from the object point in FIG. 20 (a) is received. These output values are pixel values including color information. Also, this graph can be said to represent an optical intensity distribution of each color.

By performing the above-described processing for the respective corresponding pixels, an optical intensity distribution represented by the graph of FIG. 20 (c) is obtained. As can be known from FIG. 20 (c), the distribution is as if output values from the actual RLt pixel, RRt pixel, GLt pixel, GRt pixel, BLt pixel, and BRt pixel are arranged.

Figure 21:
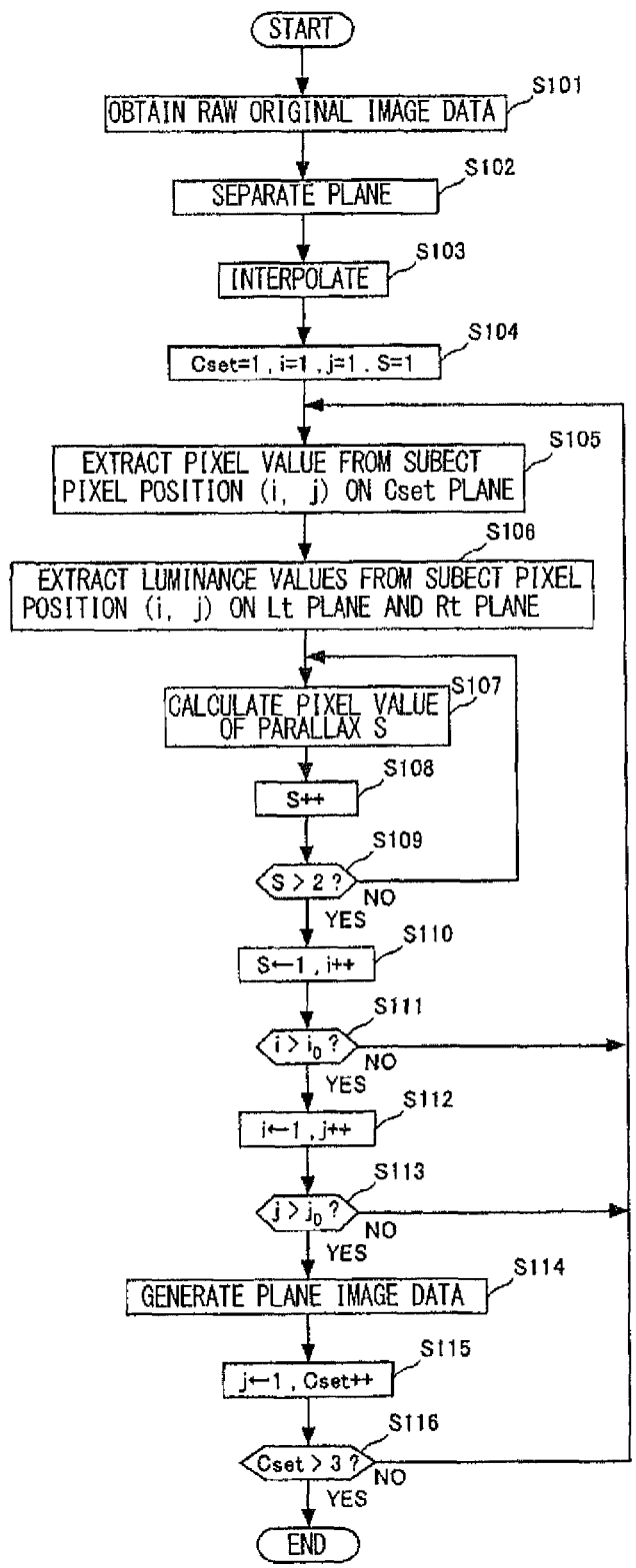
FIG. 21 is a processing flow up until generation of parallax color image data.

Here, a processing flow up until generation of parallax color image data is described. FIG. 21 is a processing flow up until generation of parallax color image data. The flow may be initiated in conjunction with an image-capturing operation, or may be initiated by reading out target image data from the memory card 220.

At Step S101, the image processor 205 obtains RAW original image data. At Step S102, as described by referring to FIG. 13, the RAW original image data is separated into $R_0$ plane data, $G_0$ plane data, and $B_0$ plane data as color image data, and $Lt_0$ plane data and $Rt_0$ plane data as parallax image data. At Step S103, the image processor 205 performs an interpolation process for interpolating vacant lattices that are present in each separated piece of plane data. Specifically, as described by referring to FIG. 14, output values of vacant lattices are calculated by an averaging process or the like by using output values of pixels in the proximity.

At Step S104, the image processor 205 initializes each variable. Specifically, first, 1 is assigned to a color variable Cset. 1=red, 2=green, and 3=blue, for the color variable Cset. Also, 1 is assigned to i and j that are coordinate variables. Furthermore, 1 is assigned to a parallax variable S. 1=left and 2=right, for the parallax variable S.

At Step S105, the pixel value extracting unit 231 of the image processor 205 extracts a pixel value from a target pixel position (i, j) in a Cset plane. For example, when Cset=1, and the target pixel position is (1, 1), the pixel value to be extracted is $Rn_{11}$. Furthermore, at Step S106, the luminance value extracting unit 232 of the image processor 205 extracts luminance values from the target pixel position (i, j) of Lt plane data and Rt plane data. For example, when the target pixel position is (1, 1), the luminance value to be extracted is $Lt_{11}$ and $Rt_{11}$.

At Step S107, the calculating unit 233 of the image processor 205 calculates a pixel value of the target pixel position (i, j) corresponding to the parallax variable S. For example, when Cset=1, S=1, and the target pixel position is (1, 1), $RLt_{11}$ is calculated. Specifically, for example, the above-described expression (1) is used for calculation.

At Step S108, the image processor 205 increments the parallax variable S. At Step S109, it is judged whether the parallax variable S has exceeded two. If not exceeded, the process returns to Step S107.

If exceeded, the process proceeds with Step S110.

At Step S110, the image processor 205 assigns 1 to the parallax variable S, and increments the coordinate variable i. At Step S111, it is judged whether the coordinate variable i has exceeded $i_0$). If not exceeded, the process returns to Step S105. If exceeded, the process proceeds with Step S112.

At Step S112, the image processor 205 assigns 1 to the coordinate variable i, and increments the coordinate variable j. At Step S113, it is judged whether the coordinate variable j has exceeded $j_0$. If not exceeded, the process returns to Step S105. If exceeded, the process proceeds with Step S114.

Because when the process reaches Step S114, pixel values of all the left and right pixels of Cset are provided, the image processor 205 arranges these pixel values to generate plane image data. For example, when Cset=1, RLt plane data and RRt plane data are generated.

The process proceeds with Step S115, and the image processor 205 assigns 1 to the coordinate variable j, and increments the color variable Cset. At Step S116, it is judged whether the color variable Cset has exceeded 3. If not exceeded, the process returns to Step S105. If exceeded, it is determined that all of the left-side viewpoint color image data (RLt plane data, GLt plane data, and BLt plane data) and the right-side viewpoint color image data (RRt plane data, GRt plane data, and BRt plane data) are provided, and thus the series of processing ends.

Figure 22:
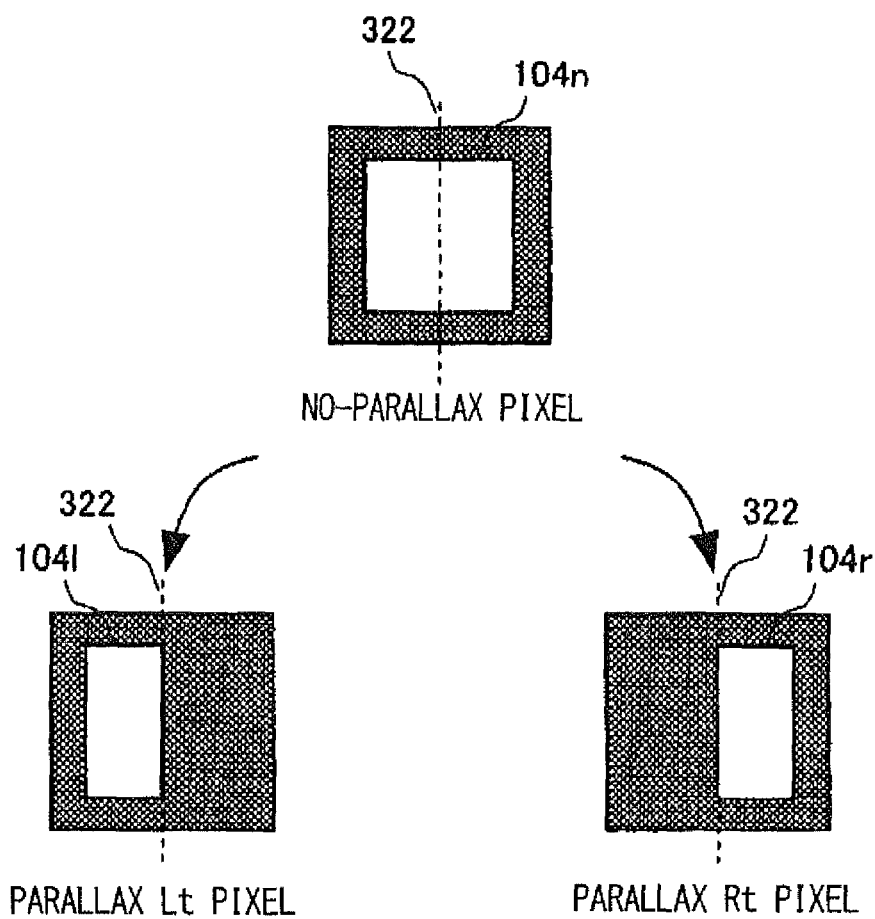
FIG. 22 illustrates preferred opening shapes.

Next, preferred opening shapes of the opening 104 are described. FIG. 22 illustrates preferred opening shapes.

An opening 1041 of a parallax Lt pixel, and an opening 104r of a parallax Rt pixel preferably include the center of the corresponding photoelectric converter element 108 and are displaced in the mutually opposite directions. Specifically, the openings 1041, 104r preferably have shapes that contact a hypothetical center line 322 that goes along with the center (the center of a pixel) of the photoelectric converter element 108, or alternatively, shapes that straddle the center line 322.

In particular, as illustrated, the shape of the opening 1041 and the shape of the opening 104r preferably have shapes that are identical with shapes that are obtained by dividing a shape of an opening 104n of a no-parallax pixel along the center line 322. In other words, the shape of the opening 104n is preferably equal to a shape that is obtained by putting the shape of the opening 1041 and the shape of the opening 104r next to each other. When the respective shapes of the opening 104n, 1041, and 104r satisfy such a relation, values that are closer to output values of actual parallax color pixels (RLt pixel, RRt pixel, GLt pixel, GRt pixel, BLt pixel, and BRt pixel) can be calculated, when arithmetic expressions based on the above-described expressions (1) and (2) are used.

Figure 23:
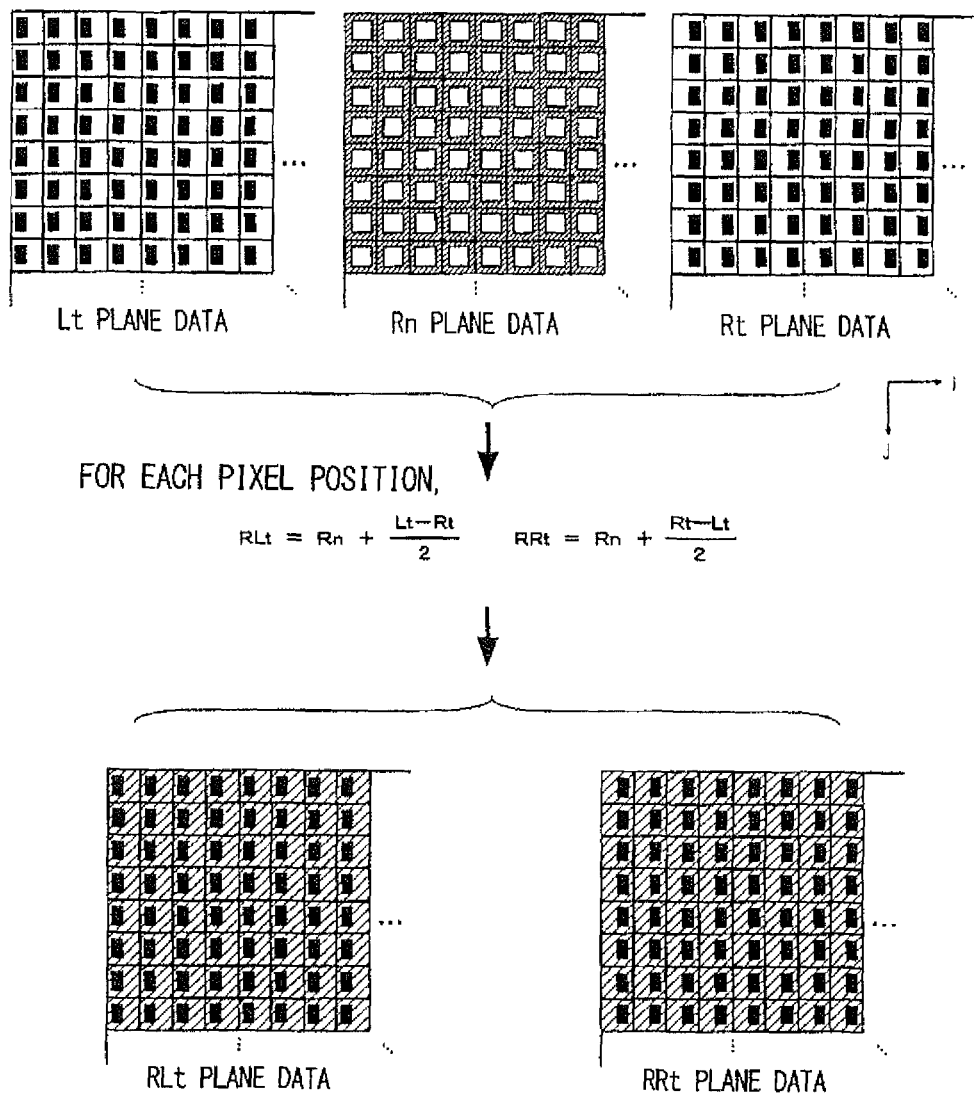
FIG. 23 illustrates a color parallax plane data generation process.

Next, processing that is different from the processing described by referring to FIG. 19 and FIG. 20 is described. FIG. 23 illustrates a color parallax plane data generation process. In particular, a process of generating the RLt plane data and the RRt plane data that correspond to a red parallax plane of color parallax planes is illustrated.

The red parallax plane is generated by using a pixel value of the Rn plane data and luminance values of the Lt plane data and the Rt plane data that are described by referring to FIG. 15. Specifically, for example when a pixel value $RLt_{mn}$ at a target pixel position ($i_m$, $j_n$) of the RLt plane data is calculated, first, the pixel value extracting unit 231 of the image processor 205 extracts a pixel value $Rn_{mn}$ from the same pixel position ($i_m$, $j_n$) of the Rn plane data. Next, the luminance value extracting unit 232 of the image processor 205 extracts a luminance value $Lt_{mn}$ from the same pixel position ($i_m$, $j_n$) of the Lt plane data, and a luminance value $Rt_{mn}$ from the same pixel position ($i_m$, $j_n$) of the Rt plane data. The calculating unit 233 of the image processor 205 calculates the pixel value $RLt_{mn}$ such that the difference between the pixel value $RLt_{mn}$ desired to be calculated and the extracted pixel value $Rn_{mn}$ remains correlated with the difference between the extracted luminance values $Lt_{mn}$, $Rt_{mn}$. Specifically, the following expression (3) is used for calculation.

$$RLt_{mn} - Rn_{mn} = (Lt_{mn} - Rt_{mn})/2 \qquad (3)$$

Similarly, when calculating a pixel value $RRt_{mn}$ at the target pixel position ($i_m$, $j_n$) of the RRt plane data, the calculating unit 233 calculates the pixel value $RRt_{mn}$ such that the difference between the pixel value $RRt_{mn}$ desired to be calculated and the extracted pixel value $Rn_{mn}$ remains correlated with the difference between the extracted luminance values $Lt_{mn}$, $Rt_{mn}$. Specifically, the following expression (4) is used for calculation.

$$RRt_{mn} - Rn_{mn} = (Rt_{mn} - Lt_{mn})/2 \qquad (4)$$

The image processor 205 sequentially performs such processing starting from (1, 1) that is the leftmost and uppermost pixel to $(i_0, j_0)$ that is the rightmost and lowermost coordinate.

In the case of the repetitive pattern B'-1, a parallax Lt pixel of B'-1 has the opening 104 that is decentered leftward relative to the no-parallax pixel, and a parallax Rt pixel of the B'-1 has the opening 104 that is decentered rightward relative to the no-parallax pixel by a decentering amount that is the same with that for the parallax Lt pixel. Accordingly, the difference between the pixel value $RLt_{mn}$ desired to be calculated and the extracted pixel value $Rn_{mn}$ is correlated with the proportionality coefficient of ½ with respect to the different between the extracted luminance values $Lt_{mn}$, $Rt_{mn}$, as shown in the above-described expression (3). That is, the correlation of the difference between the extracted luminance values $Lt_{mn}$, $Rt_{mn}$ with respect to the difference between the pixel value $RLt_{mn}$ desired to be calculated and the extracted pixel value $Rn_{mn}$ is mainly defined by the decentering amount of the respective openings of the parallax Lt pixel and the parallax Rt pixel. Also, parameters such as the sizes of openings, the relative relation with openings of no-parallax pixels, etc., may be taken into consideration. In any case, the pixel value $RLt_{mn}$ is formulated and calculated such that a defined correlation is satisfied. Although the proportionality coefficient of ½ is defined as the correlation in the example of the above-described expression (3), the correlation may be adjusted as appropriate for example by adding a constant as a correction term, other than changing the proportionality coefficient. Note that the above-described relation applies similarly even when pixel values desired to be calculated are pixel value $RRt_{mn}$, $GLt_{mn}$, $GRt_{mn}$, $BLt_{mn}$, $BRt_{mn}$.

After completion of the process of generating the RLt plane data and the RRt plane data that correspond to the red parallax plane, next, a process of generating the GLt plane data and the GRt plane data that correspond to the green parallax plane is performed. Specifically, similar processing is performed by extracting a pixel value $Gn_{mn}$ from the same pixel position $(i_m, j_n)$ of the Gn plane data, instead of extracting the pixel value $Rn_{mn}$ from the same pixel position $(i_m, j_n)$ of the Rn plane data as described above. Furthermore, after completion of the process of generating the GLt plane data and the GRt plane data that correspond to the green parallax plane, next, a process of generating the BLt plane data and the BRt plane data that correspond to the blue parallax plane is performed. Specifically, similar processing is performed by extracting a pixel value from the same pixel position $(i_m, j_n)$ of the Bn plane data, instead of extracting the pixel value $Rn_{mn}$ from the same pixel position $(i_m, j_n)$ of the Rn plane data as described above.

By the above-described processing, the left-side viewpoint color image data (RLt plane data, GLt plane data, and BLt plane data), and the right-side viewpoint color image data (RRt plane data, GRt plane data, and BRt plane data) are generated. That is, by relatively simple processing, the left-side viewpoint and right-side viewpoint color image data can be obtained as hypothetical outputs of the parallax Lt pixels and the parallax Rt pixels that are actually not present as pixels of the image sensor 100 and also have color filters of any of RGB. Accordingly, by reproducing these pieces of image data with a reproduction apparatus that supports a 3D image, a user can view a 3D video as a color image. In particular, because the processing is simple, image data can be generated at a high speed, and motion images can be also supported. Furthermore, computation of the sum and the difference can be easily implemented in a circuit such as ASIC.

It was described above that when parallax pixels are evenly allocated to pixels of any of RGB on the actual image sensor 100, a high quality color image data that is a 3D image but has good color reproducibility can be obtained. But actually it can be said that, even when such pixels are not provided, by performing the above-described processing, correspondingly high quality 3D color image data can be obtained. Also, because parallax pixels do not have to be allocated to RGB pixel as actual pixels, other plane data can be allowed to have high quality by a corresponding degree.

Figure 24:
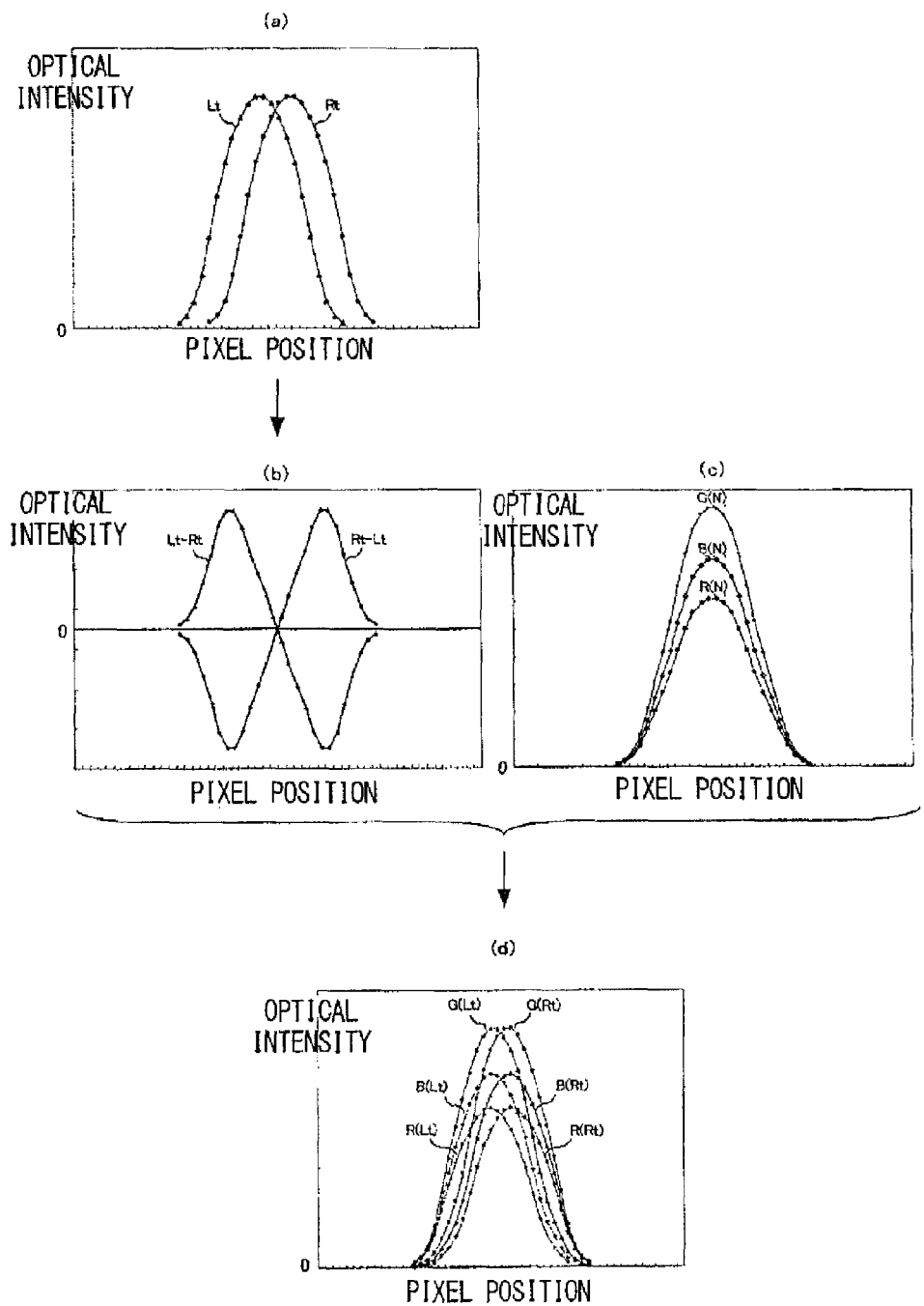
FIG. 24 illustrates changes in optical intensity distributions.

Next, the above-described processing is described in terms of optical intensity distributions. FIG. 24 illustrates changes in optical intensity distributions. FIG. 24 (a) is a graph showing output values of a parallax Lt pixel and output values of a parallax Rt pixel that are W pixels when a subject luminous flux from an object point that is present at a position that is off a focus position by a certain amount is received. These output values are luminance values not including color information. Also, because as described above, output values of a pixel are proportional to an optical intensity, the graph can be said to represent an optical intensity distribution.

FIG. 24 (b) is a graph showing values obtained by subtracting output value of the parallax Rt pixel from output values of the parallax Lt pixel, and values obtained by output values of the parallax Lt pixel from output values of the parallax Rt pixel in FIG. 24 (a).

FIG. 24 (c) is a graph showing output values of an R pixel, a G pixel, and a B pixel that are no-parallax pixels when a subject luminous flux from the object point in FIG. 24 (a) is received. These output values are pixel values including color information. Also, this graph can be said to represent an optical intensity distribution of each color.

By performing the above-described processing for the respective corresponding pixels, an optical intensity distribution represented by the graph of FIG. 24 (d) is obtained. As can be known from FIG. 24 (d), the distribution is as if output values from the actual RLt pixel, RRt pixel, GLt pixel, GRt pixel, BLt pixel, and BRt pixel are arranged.

The description above described an example in which the image sensor 100 employs the repetitive pattern B'-1. That is, in the example described above, parallax pixels are W pixels, and six pieces of plane data of left-side viewpoint color image data and right-side viewpoint color image data are generated by utilizing parallax image data as luminance image data not including color information. However, as described above, an enormous number of the repetitive patterns can be set depending on at which cycle parallax pixels and no-parallax pixels are allocated to how many colors of pixels in the arrangement of the color filter. In a case of the image sensor 100 in which parallax pixels are allocated to a color filter of a particular color, the above-described processing is slightly changed to provide six pieces of plane data of left-side viewpoint color image data and right-side viewpoint color image data. The specific procedure is described below.

Figure 25:
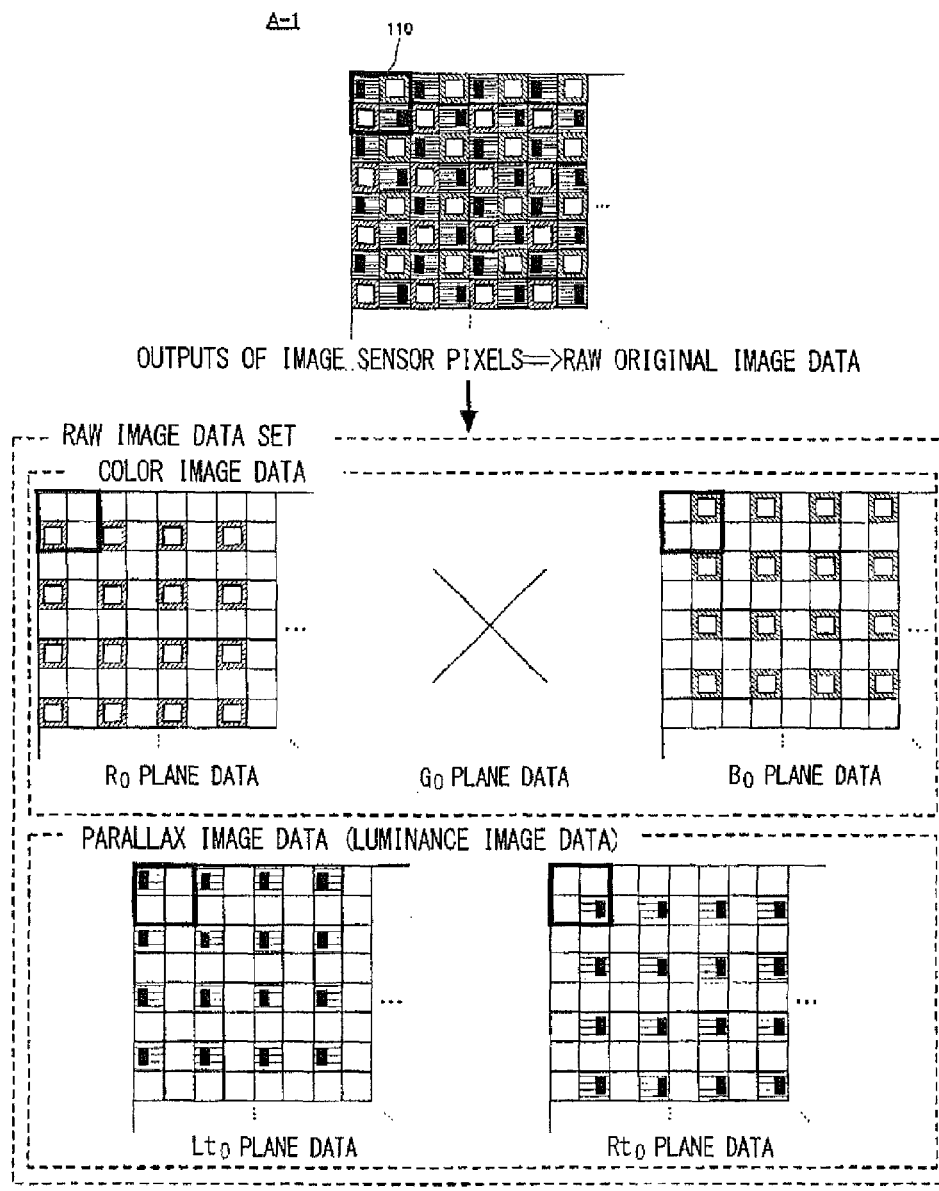
FIG. 25 illustrates a plane separation process in the image sensor 100 that employs another repetitive pattern.

FIG. 25 illustrates a plane separation process in the image sensor 100 that employs another repetitive pattern. In the example of FIG. 25, the image sensor 100 employs the above-described repetitive pattern A-1. In the repetitive pattern A-1, a Gb pixel and a Gr pixel in the Bayer arrangement are a parallax Lt pixel and a parallax Rt pixel, respectively.

From RAW original image data output from such an image sensor 100, $R_0$ plane data and $B_0$ plane data are separated as color image data, but $G_0$ plane data cannot be separated. Also, $Lt_0$ plane data and $Rt_0$ plane data separated as parallax image data have green color information. In other words, parallax image data can be said to be luminance image data that has captured a green wavelength component of a subject luminous flux. Accordingly, each output value from these pieces of plane data can be handled as a luminance value. On the other hand, these pieces of plane data can be said to be green color image data having parallax information. Accordingly, each output value can also be handled as a pixel value.

Figure 26:
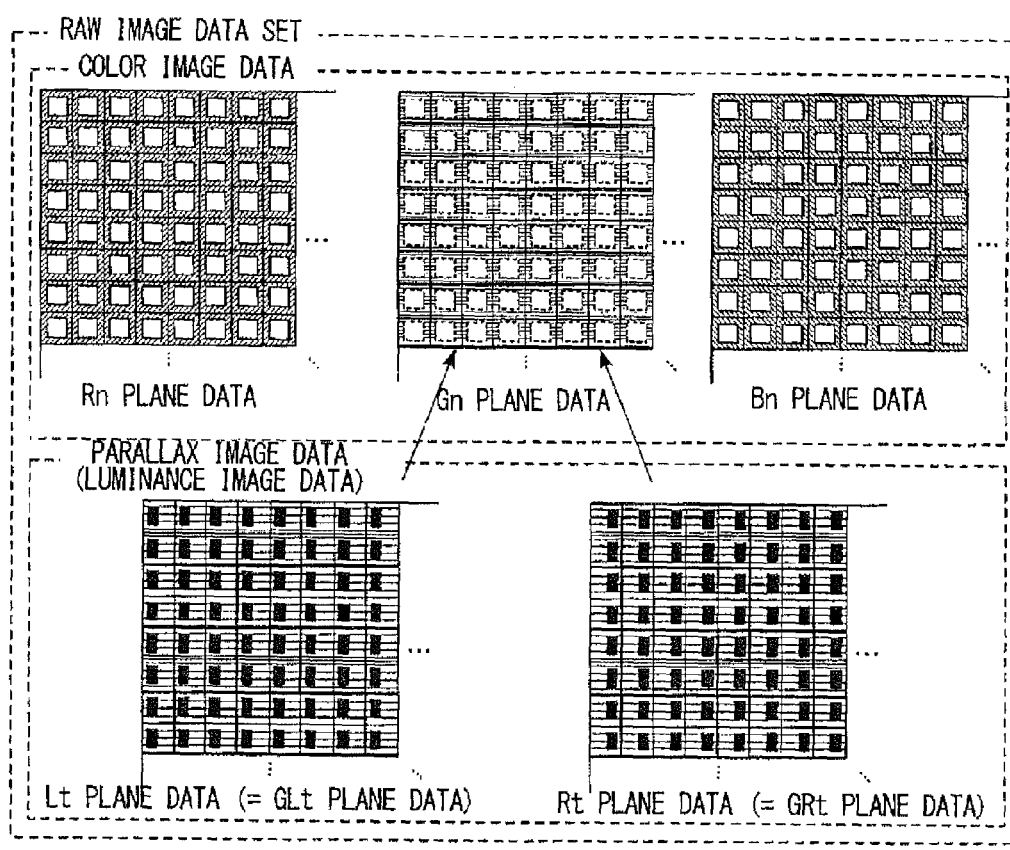
FIG. 26 illustrates the data structure of a RAW image data set in the image sensor 100 that employ another repetitive pattern.

The above-described interpolation process is performed on the separated pieces of plane data to fill vacant lattices that are present in the respective pieces of plane data. FIG. 26 illustrates the data structure of RAW image data set after the interpolation process.

The interpolation process for generating Rn plane data, Bn plane data, Lt plane data, and Rt plane data is similar to the above-described example. The Lt plane data generated here is GLt plane data belonging to left-side viewpoint color image data itself. Similarly, the Rt plane data generated here is GRt plane data belonging to right-side viewpoint color image data itself. Accordingly, the image processor 205 can calculate the average value of corresponding pixels of the GLt plane data and the GRt plane data to generate Gn plane data.

Processing of generating the RLt plane data and the RRt plane data by using parallax image data on the Rn plane data, and processing of generating the BLt plane data and the BRt plane data by using parallax image data on the Bn plane data is similar to the above-described example.

Color image data planes for repetitive patterns other than those described above can be generated from a separated piece of color image data on which an interpolation process has been performed and luminance image data. For example, when RLt plane data exists as a separated piece of color image data on which an interpolation process has been performed, and Lt plane data and Rt plane data exist as luminance image data, Rn plane data can be generated according to the following expression (4) which is a modified version of the expression (1).

$$Rn_{mn}=RLt_{mn}\times(Lt_{mn}+Rt_{mn})/(2\times Lt_{mn}) \quad (4)$$

Also, because $RRt_{mn}$ can be calculated by assigning $Rn_{mn}$ calculated according to the expression (4) to the expression (2), the RRt plane data can be generated.

Alternatively, Rn plane data can be generated according to the following expression (5) that is a modified version of the expression (3).

$$Rn_{mn}=RLt_{mn}-(Lt_{mn}-Rt_{mn})/2 \quad (5)$$

Also, because $RRt_{mn}$ can be calculated by assigning $Rn_{mn}$ calculated according to the expression (3) to the expression (5), the RRt plane data can be generated.

Here, a no-parallax image generated from no-parallax pixels can be regarded as an image seen from a position right in front of a subject that corresponds to the above-described left-side viewpoint and right-side viewpoint image. That is, these images can be regarded as images from mutually different viewpoints. Accordingly, it can be said that when luminance image data and color image data from at least any of viewpoints exists, color image data from another viewpoint, including a no-parallax image, can be generated.

Also, in the description above, three colors, red, green, and blue, were used as primary colors that constitute colors of a subject image. However, primary colors may be four or more colors including emerald green. Also, three primary colors of complementary colors, which is a combination of yellow, magenta, and cyan may be employed in place of red, green, and blue.

In the description above, for example the pixel value extracting unit 231, the luminance value extracting unit 232, and the calculating unit 233 included in the image processor 205 are described as performing their own processing as functions of each component that constitutes the digital camera 10. Also, a control program that causes the controller 201 and the image processor 205 to perform operations causes each piece of hardware that constitutes the digital camera 10 to function as a component that causes the above-described processing to be executed. Also, the processing of generating color image data may not be performed by the digital camera 10, but may be performed by equipment such as an external personal computer. In this case, the equipment such as an external personal computer functions as an image processing apparatus. The image processing apparatus for example obtains RAW original image data to generate color image data. The image processing apparatus also performs the above-described plane separation process and plane data interpolation process when it obtains RAW original image data. Also, the image processing apparatus may obtain plane data on which an interpolation process has been performed on the side of the image-capturing apparatus.

Next, another example (Example 2) that is different from the above-described example (Example 1) is described. In Example 1, a left-viewpoint color image and a right-viewpoint color image are generated in the following manner. In a case of a left-viewpoint color image, it is generated by applying color plane information of normal images Rn, Gn, Bn to a left-viewpoint luminance image Lt such that the ratio between the left-viewpoint luminance image Lt and an image that is obtained by arithmetically averaging the left-viewpoint luminance image Lt and a right-viewpoint luminance image Rt is kept constant. In Example 2, an expression for keeping the ratio constant not relative to the arithmetic average but to the geometric average is presented. The expressions (1) and (2) are replaced with the following arithmetic expressions.

Generation of Left-Viewpoint Color Image $$RLt=Rn\times Lt/\sqrt{(Lt*Rt)}$$

$$GLt=Gn\times Lt/\sqrt{(Lt*Rt)}$$

$$BLt=Bn\times Lt/\sqrt{(Lt*Rt)}$$

Generation of Right-Viewpoint Color Image $$RRt=Rn\times Rt/\sqrt{(Lt*Rt)}$$

$$GRt=Gn\times Rt/\sqrt{(Lt*Rt)}$$

$$BRt=Bn\times Rt/\sqrt{(Lt*Rt)}$$

Because with the above-descried expressions, a left-viewpoint color image and a right-viewpoint color image are generated adaptively to a right-viewpoint luminance image and a left-viewpoint luminance image such that the ratio relative to the geometric average of the left-viewpoint luminance image Lt and the right-viewpoint luminance image Rt is kept constant, images from respective viewpoints having blur characteristics that are different from those of images obtained when the arithmetic average is used is generated. This is because while the arithmetic average increases a blur width, the geometric average does not.

When the above-described expressions are rewritten, the following relations are satisfied.

Generation of Left-Viewpoint Color Image $RLt/Rn=\sqrt{(Lt/Rt)}$ $GLt/Gn=\sqrt{(Lt/Rt)}$ $BLt/Bn=\sqrt{(Lt/Rt)}$ Generation of Right-Viewpoint Color Image $RRt/Rn=\sqrt{(Rt/Lt)}$ $GRt/Gn=\sqrt{(Rt/Lt)}$ $BRt/Bn=\sqrt{(Rt/Lt)}$ That is, a pixel value of a left-viewpoint color image to be obtained is obtained such that the ratio between the pixel value of the left-viewpoint color image and a pixel value of a no-parallax image is correlated with the ratio between a luminance value of a left-viewpoint luminance image and a luminance value of a right-viewpoint luminance image. Also, a pixel value of a right-viewpoint color image to be obtained is obtained such that the ratio between the pixel value of the right-viewpoint color image and a pixel value of a no-parallax image is correlated with the ratio between a luminance value of a right-viewpoint luminance image and a luminance value of a left-viewpoint luminance image.

Next, Example 3 is shown. The expressions shown in Example 2 can be equivalently expressed as logarithms as follows.

Generation of Left-Viewpoint Color Image $\log(RLt)=\log(Rn)+\log(Lt)-[\log(Lt)+\log(Rt)]/2$ $\log(GLt)=\log(Gn)+\log(Lt)-[\log(Lt)+\log(Rt)]/2$ $\log(BLt)=\log(Bn)+\log(Lt)-[\log(Lt)+\log(Rt)]/2$ Generation of Right-Viewpoint Color Image $\log(RRt)=\log(Rn)+\log(Rt)-[\log(Lt)+\log(Rt)]/2$ $\log(GRt)=\log(Gn)+\log(Rt)-[\log(Lt)+\log(Rt)]/2$ $\log(BRt)=\log(Bn)+\log(Rt)-[\log(Lt)+\log(Rt)]/2$ When shifting to an image processing space with gradation characteristics having logarithmic gradation, an arithmetic expression for keeping the ratio constant in an image processing space with linear gradation can generate color images of respective left and right viewpoints by parallax modulation for keeping the difference constant in the logarithmic gradation space. Not being limited to logarithmic gradation, by generalizing this idea to perform computation for keeping the difference constant in the gamma space having gradation characteristics represented by powers such as a square root and a cubic root or any gradation characteristics, an effect of adding parallax modulation can be similarly obtained.

Flowchart
1) Color-Parallax Multiplexed Mosaic Image Data Input
2) Shift to Gamma Space by Gradation Conversion
3) Generation of Color and Parallax Images
4) Shift to Original Color Space by Reverse Gradation Conversion
5) Conversion to Output Color Space Processing Procedure
1) Color-Parallax Multiplexed Mosaic Image Data Input A single-plate mosaic image in which a Bayer arrangement type G pixel is pupil-split into right parallax and left parallax, and colors and parallax are multiplexed is input. This is represented by M[i,j]. Each pixel value is data having linear gradation which is proportional to an exposure amount.

2) Shift to Gamma Space by Gradation Conversion

Gradation conversion is performed on the mosaic image to shift to the gamma space.

$M[i,j] \rightarrow M^\Gamma[i,j]$

Actually, nonlinear conversion $y=f(x)$ is performed such that an output pixel value y is obtained for a pixel value x. Examples of characteristics of nonlinear conversion include the following various characteristics. Note that an input signal is x, an output signal is y, and the gradation of the input signal and the gradation of the output signal are both defined in the range of [0,1].

Input/output characteristics define the gradation curve (gamma curve) such that it passes $(x, y)=(0, 0)$ and $(1, 1)$. Assuming that the maximum value of the actual input gradation X is Xmax, and the maximum value of the actual output gradation Y is Ymax, $x=X/Xmax$ and $y=Y/Ymax$, and the gradation conversion is performed according to:

$$Y = Y_{max} \cdot f\left(\frac{X}{X_{max}}\right)$$

Examples of gradation characteristics include the following characteristics.

a) Cubic Root Gradation Characteristics $y=1.16x^{1/3}-0.16$ if $x>0.008856$ $y=1.16 \times 7.781x$ otherwise b) Offset Square Root Gradation Characteristics The offset value $\epsilon$ is a positive constant. Please see U.S. Pat. No. 7,957,588.

c) Logarithmic Characteristics $$y = \frac{\log(kx+1)}{\log(k+1)}$$

The coefficient k is a positive constant.

d) Linear Characteristics $y=x$

3) Generation of Color and Parallax Images

As in Example 1, color images $Rn^\Gamma$, $Gn^\Gamma$, $Bn^\Gamma$, a left-viewpoint luminance image $Lt^\Gamma$, and a right-viewpoint luminance image Re are generated in the gamma space. Thereafter, parallax modulation is performed according to the following expressions to generate a left-viewpoint color image and a right-viewpoint color image. Note that a value in the gamma space is expressed schematically with the exponent $^\Gamma$.

Generation of Left-Viewpoint Color Image $$RLt^\Gamma = Rn^\Gamma + Lt^\Gamma - (Lt^\Gamma + Rt^\Gamma)/2$$

$$GLt^\Gamma = Gn^\Gamma + Lt^\Gamma - (Lt^\Gamma + Rt^\Gamma)/2$$

$$BLt^\Gamma = Bn^\Gamma + Lt^\Gamma - (Lt^\Gamma + Rt^\Gamma)/2$$

Generation of Right-Viewpoint Color Image $$RLt^\Gamma = Rn^\Gamma + Rt^\Gamma - (Lt^\Gamma + Rt^\Gamma)/2$$

$$GRt^\Gamma = Gn^\Gamma + Rt^\Gamma - (Lt^\Gamma + Rt^\Gamma)/2$$

$$BRt^\Gamma + Bn^\Gamma + Rt^\Gamma - (Lt^\Gamma + Rt^\Gamma)/2$$

When the above-described expressions are rewritten, the following relations are satisfied.

Generation of Left-Viewpoint Color Image $$RLt^\Gamma - Rn^\Gamma = (Lt^\Gamma - Rt^\Gamma)/2$$

$$GLt^\Gamma - Gn^\Gamma = (Lt^\Gamma - Rt^\Gamma)/2$$

$$BLt^\Gamma - Bn^\Gamma = (Lt^\Gamma - Rt^\Gamma)/2$$

Generation of Right-Viewpoint Color Image $$RRt^\Gamma - Rn^\Gamma = (Rt^\Gamma - Lt^\Gamma)/2$$

$$GRt^\Gamma - Gn^\Gamma = (Rt^\Gamma - Lt^\Gamma)/2$$

$$BRt^\Gamma - Bn^\Gamma = (Rt^\Gamma - Lt^\Gamma)/2$$

That is, a pixel value of a left-viewpoint color image to be obtained is obtained such that the difference between the pixel value of the left-viewpoint color image and a pixel value of a no-parallax image is correlated with the difference between a luminance value of a left-viewpoint luminance image and a luminance value of a right-viewpoint luminance image. Also, a pixel value of a right-viewpoint color image to be obtained is obtained such that the difference between the pixel value of the right-viewpoint color image and a pixel value of a no-parallax image is correlated with the difference between a luminance value of a right-viewpoint luminance image and a luminance value of a left-viewpoint luminance image.

4) Shift to Original Color Space by Reverse Gradation Conversion

Reverse gradation conversion from the gamma space to the linear gradation space is performed to return to the original color space. The conversion is performed on necessary color image data. A left-viewpoint color image and a right-viewpoint color image are formed.

Left-Viewpoint Color Image $$RLt^\Gamma[i,j] \to RLt[i,j] \quad GLt^\Gamma[i,j] \to GLt[i,j]$$
$$BLt^\Gamma[i,j] \to BLt[i,j]$$

Right-Viewpoint Color Image $$RRt^\Gamma[i,j] \to RRt[i,j] \; GRt^\Gamma[i,j] \to GRt[i,j] \; BRt^\Gamma[i,j] \to BRt[i,j]$$

5) Conversion to Output Color Space

On the formed left-viewpoint color image and right-viewpoint color image, color conversion and output gradation conversion are performed to generate respective output color images. For example, conversion into the sRGB color space is performed.

Note that although the mosaic image having parallax has the primary color Bayer arrangement in the example, a right parallax complementary color image and a left parallax complementary color image can be generated similarly according to the same principle even when the color filters are replaced with complementary color filters.

Next, a second embodiment is described. The second embodiment is the same with the first embodiment in terms of the hardware structure of the digital camera 10, the structure of the image sensor 100, the principles for obtaining parallax images, etc. Specifically, the first embodiment and the second embodiment are the same up to the above-described description related to FIG. 18. Accordingly, such a description is omitted, and the second embodiment is described below as a continuation of the description up to FIG. 18. Note that the description below is not limited to differences from the first embodiment, but includes matters that are shared between the first embodiment and the second embodiment for making it easy to understand the description.

Figure 27:
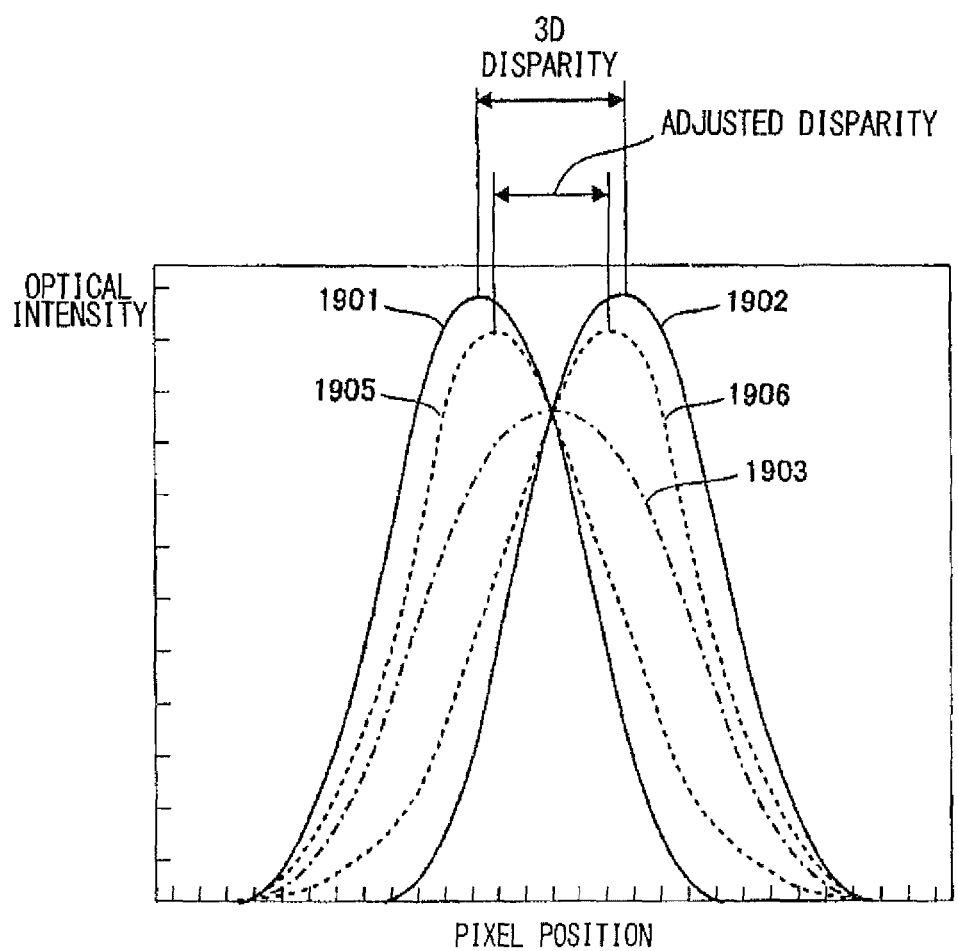
FIG. 27 illustrates optical intensity distributions for illustrating the concept of an adjusted disparity.

In the present embodiment, by using a luminance value of a parallax Lt pixel and a luminance value of a parallax Rt pixel which are actually obtained as output values of the image sensor 100, on which an interpolation process of vacant lattices has been performed, and which represent such an optical intensity distribution, a hypothetical optical intensity distribution is generated. At this time, while the blur amount that is expressed by the broadening of the optical intensity distribution is almost maintained, the disparity that is expressed as intervals between peaks is adjusted. That is, in the present embodiment, the image processor 205 generates an image that has a disparity which has been adjusted to be in-between a 2D image generated from no-parallax pixels and a 3D image generated from parallax pixels, while keeping the blur amount of the image is kept almost as it is. FIG. 27 illustrates optical intensity distributions for illustrating the concept of an adjusted disparity.

An Lt distribution curve 1901 and an Rt distribution curve 1902 that are indicated with solid lines in FIG. 27 are distribution curves that are farmed by plotting actual luminance values of Lt plane data and Rt plane data. For example, they correspond to distribution curves 1804, 1805 in FIG. 18 (b). The distance between the peaks of the Lt distribution curve 1901 and the Rt distribution curve 1902 represents the 3D disparity, and a larger distance indicates a more significant stereoscopic effect at the time of image reproduction.

A 2D distribution curve 1903 that is formed by adding the Lt distribution curve 1901 and the Rt distribution curve 1902 at the ratio of 50:50 has a convex shape without leftward or rightward bias. The 2D distribution curve 1903 corresponds to a shape that is formed by making the height of the composite distribution curve 1806 in FIG. 18 (b) half. That is, the 2D distribution curve 1903 shows a shape that is similar to a distribution curve formed by plotting luminance values of no-parallax pixels. That is, an image based on this luminance distribution is a 2D image with zero disparity.

An adjusted Lt distribution curve 1905 is a curve that is formed by adding the Lt distribution curve 1901 and the Rt distribution curve 1902 at the ratio of 80:20. The peak of the adjusted Lt distribution curve 1905 is displaced toward the center as compared with the peak of the Lt distribution curve 1901 by the amount that corresponds to an added component of the Rt distribution curve 1902. Similarly, the adjusted Rt distribution curve 1906 is a curve obtained by adding the Lt distribution curve 1901 and the Rt distribution curve 1902 at the ratio of 20:80. The peak of the adjusted Rt distribution curve 1906 is displaced toward the center as compared with the peak of the Rt distribution curve 1902 by the amount that corresponds to an added component of the Lt distribution curve 1901.

Accordingly, the adjusted disparity represented by the distance between the respective peaks of the adjusted Lt distribution curve 1905 and the adjusted Rt distribution curve 1906 is smaller than the 3D disparity. Accordingly, the stereoscopic effect at the time of image reproduction is mitigated. On the other hand, because the broadening of the adjusted Lt distribution curve 1905 and the adjusted Rt distribution curve 1906 is similar to the broadening of the 2D distribution curve 1903, it can be said that the blur amount thereof is equal to the blur amount of a 2D image.

That is, the adjusted disparity can be controlled by at what percentages the Lt distribution curve 1901 and the Rt distribution curve 1902 are added. By applying this adjusted luminance distribution to each plane of color image data generated from no-parallax pixels, left-side viewpoint color image data and right-side viewpoint color image data that provide a stereoscopic effect that is different from that of parallax image data generated from parallax pixels can be generated.

In the present embodiment, left-side viewpoint color image data and right-side viewpoint color image data are generated from five pieces of plane data that constitute a RAW image data set. The left-side viewpoint color image data is constituted with three pieces of color parallax plane data that are $RLt_c$ plane data, $GLt_c$ plane data, and $BLt_c$ plane data that are red plane data, green plane data, and blue plane data, respectively, corresponding to the left-side viewpoint. Similarly, the right-side viewpoint color image data is constituted with three pieces of color parallax plane data that are $RRt_c$ plane data, $GRt_c$ plane data, and $BRt_c$ plane data that are red plane data, green plane data, and blue plane data, respectively, corresponding to the right-side viewpoint.

Figure 28:
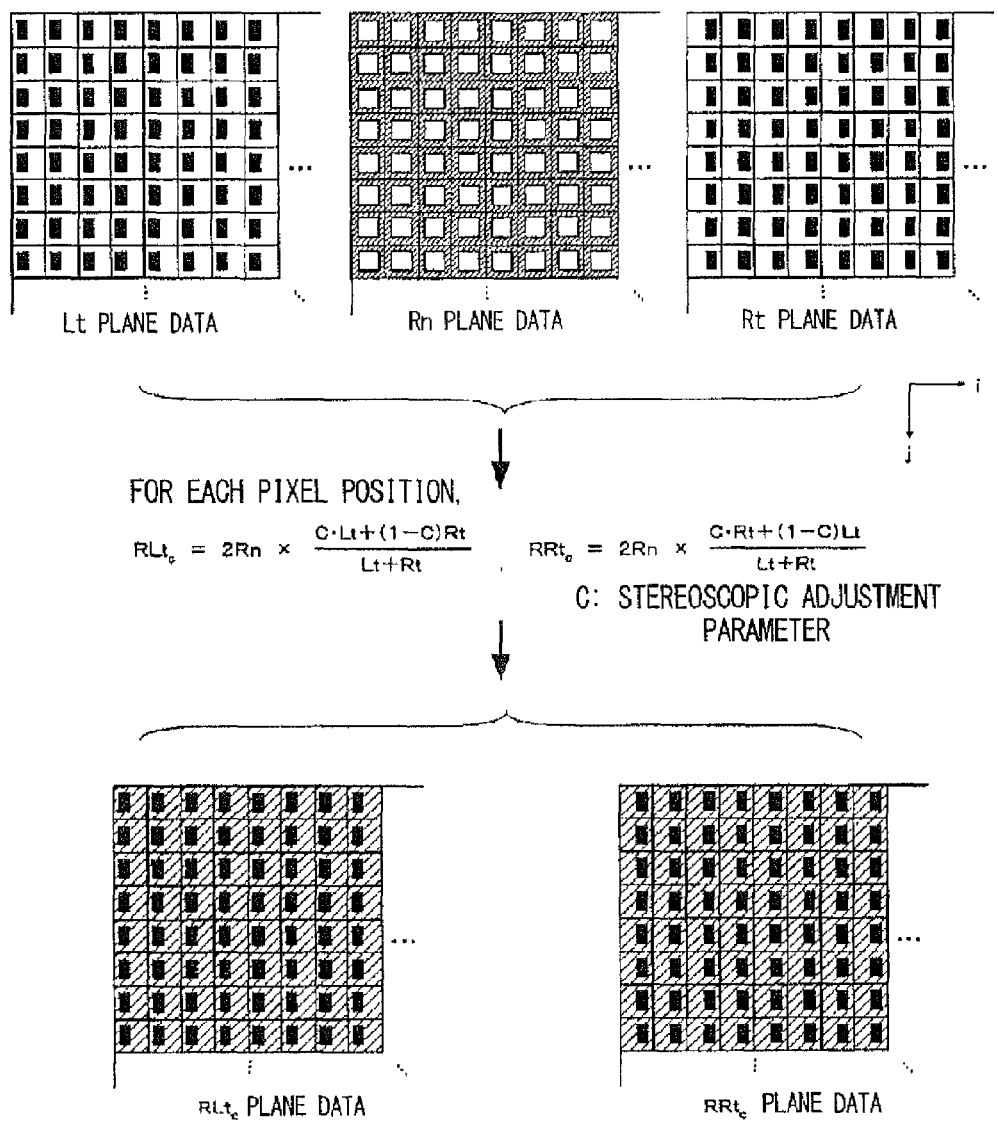
FIG. 28 illustrates a color parallax plane data generation process.

FIG. 28 illustrates a color parallax plane data generation process. In particular, a process of generating the $RLt_c$ plane data and the $RRt_c$ plane data that correspond to a red parallax plane of color parallax planes is illustrated.

The red parallax plane is generated by using a pixel value of the Rn plane data and luminance values of the Lt plane data and the Rt plane data that are described by referring to FIG. 15. Specifically, for example when a pixel value $RLt_{mn}$ at a target pixel position $(i_m, j_n)$ of the $RLt_c$ plane data is calculated, first, the pixel value extracting unit 231 of the image processor 205 extracts a pixel value $Rn_{mn}$ from the same pixel position $(i_m, j_n)$ of the Rn plane data. Next, the luminance value extracting unit 232 of the image processor 205 extracts a luminance value $Lt_{mn}$ from the same pixel position $(i_m, j_n)$ of the Lt plane data, and a luminance value $Rt_{mn}$ from the same pixel position $(i_m, j_n)$ of the Rt plane data. The calculating unit 233 of the image processor 205 calculates the pixel value $RLt_{mn}$ by multiplying the pixel value $Rn_{mn}$ with a value obtained by distributing the luminance values $Lt_{mn}, Rt_{mn}$ according to a stereoscopic adjustment parameter C. Specifically, the following expression (1) is used for calculation. Note that the stereoscopic adjustment parameter C is set in advance within the range of 0.5<C<1.

$$RLt_{mn}=2Rn_{mn}\times\{C\cdot Lt_{mn}+(1-C)\cdot Rt_{mn}\}/(Lt_{mn}+Rt_{mn}) \quad (1)$$

Similarly, when calculating a pixel value $RRt_{mn}$ at the target pixel position $(i_m, j_n)$ of the $RRt_c$ plane data, the calculating unit 233 performs the calculation by multiplying the pixel value $Rn_{mn}$ extracted by the pixel value extracting unit 231 with a value obtained by distributing the luminance value $Lt_{mn}$ and the luminance value $Rt_{mn}$ extracted by the luminance value extracting unit 232 according to the stereoscopic adjustment parameter C. Specifically, the following expression (2) is used for calculation.

$$RRt_{mn}=2Rn_{mn}\times\{C\cdot Rt_{mn}+(1-C)\cdot Lt_{mn}\}/(Lt_{mn}+Rt_{mn}) \quad (2)$$

The image processor 205 sequentially performs such processing starting from (1, 1) that is the leftmost and uppermost pixel to $(i_0, j_0)$ that is the rightmost and lowermost coordinate.

After completion of the process of generating the $RLt_c$ plane data and the $RRt_c$ plane data that correspond to the red parallax plane, next, a process of generating the $GLt_c$ plane data and the $GRt_c$ plane data that correspond to the green parallax plane is performed. Specifically, similar processing is performed by extracting a pixel value $Gn_{mn}$ from the same pixel position $(i_m, j_n)$ of the Gn plane data, instead of extracting the pixel value $Rn_{mn}$ from the same pixel position $(i_m, j_n)$ of the Rn plane data as described above. Furthermore, after completion of the process of generating the $GLt_c$ plane data and the $GRt_c$ plane data that correspond to the green parallax plane, next, a process of generating the $BLt_c$ plane data and the $BRt_c$ plane data that correspond to the blue parallax plane is performed. Specifically, similar processing is performed by extracting a pixel value $Bn_{mn}$ from the same pixel position $(i_m, j_n)$ of the Bn plane data, instead of extracting the pixel value $Rn_{mn}$ from the same pixel position $(i_m, j_n)$ of the Rn plane data as described above.

By the above-described processing, the left-side viewpoint color image data ($RLt_c$ plane data, $GLt_c$ plane data, and $BLt_c$ plane data), and the right-side viewpoint color image data ($RRt_c$ plane data, $GRt_c$ plane data, and $BRt_c$ plane data) are generated. That is, by relatively simple processing, the left-side viewpoint and right-side viewpoint color image data can be obtained as hypothetical outputs from pixels that are actually not present as pixels of the image sensor 100.

In addition, because the stereoscopic adjustment parameter C can be changed within the range of 0.5<C<1, the magnitude of the disparity can be adjusted while keeping the blur amount of a 2D color image based on no-parallax pixels. Accordingly, by reproducing these pieces of image data with a reproduction apparatus that supports a 3D image, a user can view a 3D video that exhibits an appropriately adjusted stereoscopic effect as a color image. In particular, because the processing is simple, image data can be generated at a high speed, and motion images can be also supported.

It was described above that when parallax pixels are evenly allocated to pixels of any of RGB on the actual image sensor 100, a high quality color image data that is a 3D image but has good color reproducibility can be obtained. But actually it can be said that, even when such pixels are not provided, by performing the above-described processing, correspondingly high quality 3D color image data can be obtained. Also, because parallax pixels do not have to be allocated to RGB pixel as actual pixels, other plane data can be allowed to have high quality by a corresponding degree.

Figure 29:
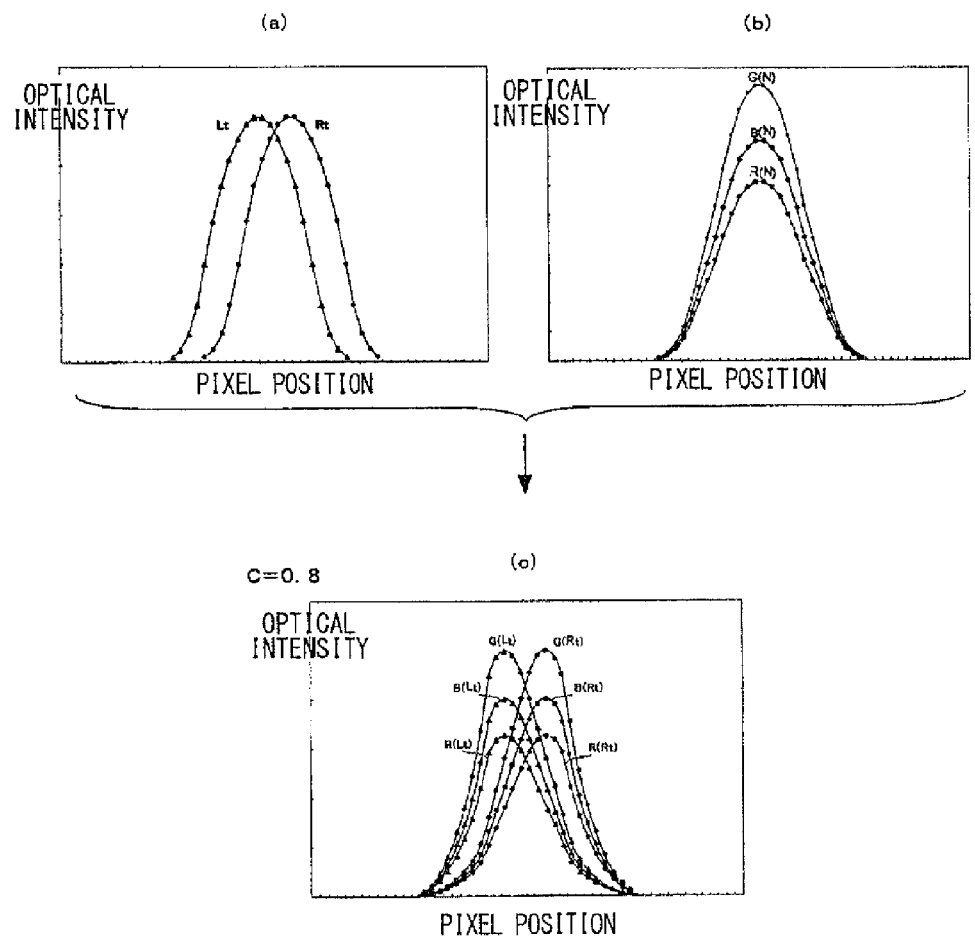
FIG. 29 illustrates changes in RGB optical intensity distributions.

Next, the above-described processing is described in terms of optical intensity distributions and colors. FIG. 29 illustrates changes in RGB optical intensity distributions. FIG. 29 (*a*) is a graph showing output values of a parallax Lt pixel and output values of a parallax Rt pixel that are W pixels when a subject luminous flux from an object point that is present at a position that is off a focus position by a certain amount is received. These output values are luminance values not including color information. Also, because as described above, output values of a pixel are proportional to an optical intensity, the graph can be said to represent an optical intensity distribution.

FIG. 29 (*b*) is a graph showing output values of an R pixel, a G pixel, and a B pixel that are no-parallax pixels when a subject luminous flux from the object point in FIG. 29 (*a*) is received. These output values are pixel values including color information. Also, this graph can be said to represent an optical intensity distribution of each color.

By performing the above-described processing for the respective corresponding pixels with C=0.8, an optical intensity distribution represented by the graph of FIG. 29 (c) is obtained. As can be known from FIG. 29 (c), the distribution according to the respective RGB pixel values can be obtained.

Figure 30:
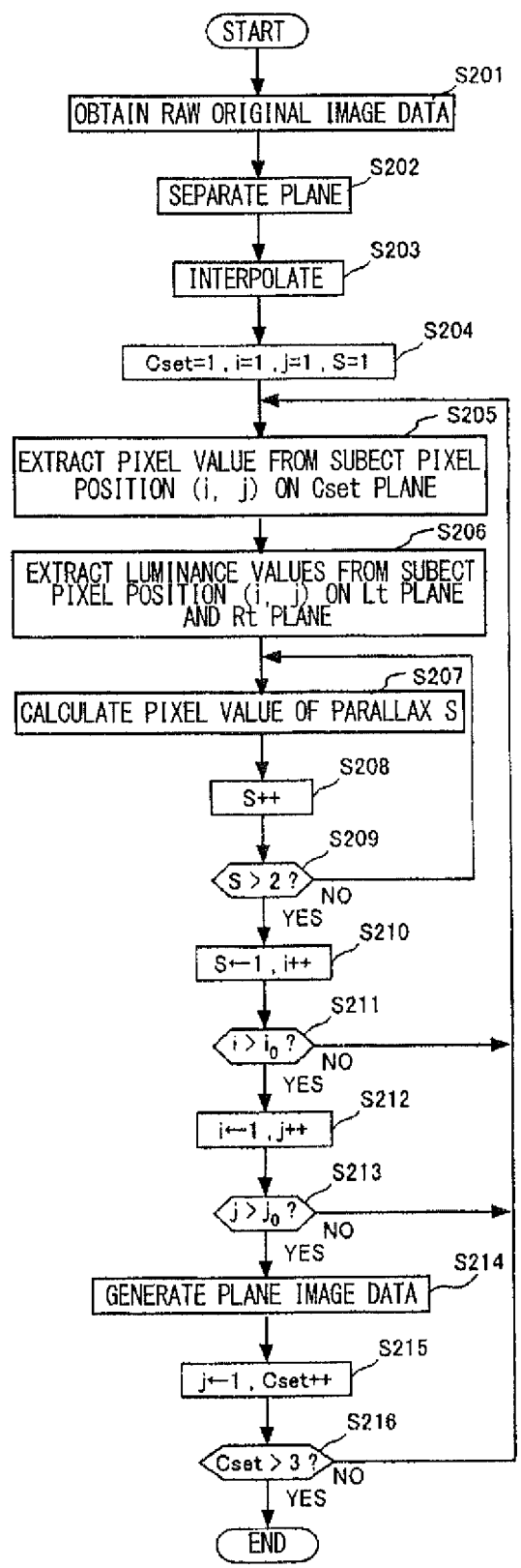
FIG. 30 is a processing flow up until generation of parallax color image data.

Next, a processing flow up until generation of parallax color image data is described. FIG. 30 is a processing flow up until generation of parallax color image data. The flow may be initiated in conjunction with an image-capturing operation, or may be initiated by reading out target image data from the memory card 220.

At Step S201, the image processor 205 obtains RAW original image data. At Step S202, as described by referring to FIG. 13, the RAW original image data is separated into $R_0$ plane data, $G_0$ plane data, and $B_0$ plane data as color image data, and $Lt_0$ plane data and $Rt_0$ plane data as parallax image data. At Step S203, the image processor 205 performs an interpolation process for interpolating vacant lattices that are present in each separated piece of plane data. Specifically, as described by referring to FIG. 14, output values of vacant lattices are calculated by an averaging process or the like by using output values of pixels in the proximity.

At Step S204, the image processor 205 initializes each variable. Specifically, first, 1 is assigned to a color variable Cset. 1=red, 2=green, and 3=blue, for the color variable Cset. Also, 1 is assigned to i and j that are coordinate variables. Furthermore, 1 is assigned to a parallax variable S. 1=left and 2=right, for the parallax variable S.

At Step S205, the pixel value extracting unit 231 of the image processor 205 extracts a pixel value from a target pixel position (i, j) in a Cset plane. For example, when Cset=1, and the target pixel position is (1, 1), the pixel value to be extracted is $Rn_{11}$. Furthermore, at Step S206, the luminance value extracting unit 232 of the image processor 205 extracts luminance values from the target pixel position (i, j) of Lt plane data and Rt plane data. For example, when the target pixel position is (1, 1), the luminance value to be extracted is $Lt_{11}$ and $Rt_{11}$.

At Step S207, the calculating unit 233 of the image processor 205 calculates a pixel value of the target pixel position (i, j) corresponding to the parallax variable S. For example, when Cset=1, S=1, and the target pixel position is (1, 1), $Rt_{11}$ is calculated. Specifically, for example, the above-described expression (1) is used for calculation. Note that the stereoscopic adjustment parameter C is set in advance within the range of 0.5<C<1. Specifically, for example, the controller 201 sets the stereoscopic adjustment parameter C upon receiving an instruction from a user via the operating unit 208.

At Step S208, the image processor 205 increments the parallax variable S. At Step S209, it is judged whether the parallax variable S has exceeded two. If not exceeded, the process returns to Step S207.

If exceeded, the process proceeds with Step S210.

At Step S210, the image processor 205 assigns 1 to the parallax variable S, and increments the coordinate variable i. At Step S211, it is judged whether the coordinate variable i has exceeded $i_0$. If not exceeded, the process returns to Step S205. If exceeded, the process proceeds with Step S212.

At Step S212, the image processor 205 assigns 1 to the coordinate variable i, and increments the coordinate variable j. At Step S213, it is judged whether the coordinate variable j has exceeded $j_0$. If not exceeded, the process returns to Step S205. If exceeded, the process proceeds with Step S214.

Because when the process reaches Step S214, pixel values of all the left and right pixels of Cset are provided, the image processor 205 arranges these pixel values to generate plane image data. For example, when Cset=1, $RLt_c$ plane data and $RRt_c$ plane data are generated.

The process proceeds with Step S215, and the image processor 205 assigns 1 to the coordinate variable j, and increments the color variable Cset. At Step S216, it is judged whether the color variable Cset has exceeded 3. If not exceeded, the process returns to Step S205. If exceeded, it is determined that all of the left-side viewpoint color image data ($RLt_c$ plane data, $GLt_c$ plane data, and $BLt_c$ plane data) and the right-side viewpoint color image data ($RRt_c$ plane data, $GRt_c$ plane data, and $BRt_c$ plane data) are provided, and thus the series of processing ends.

Figure 31:
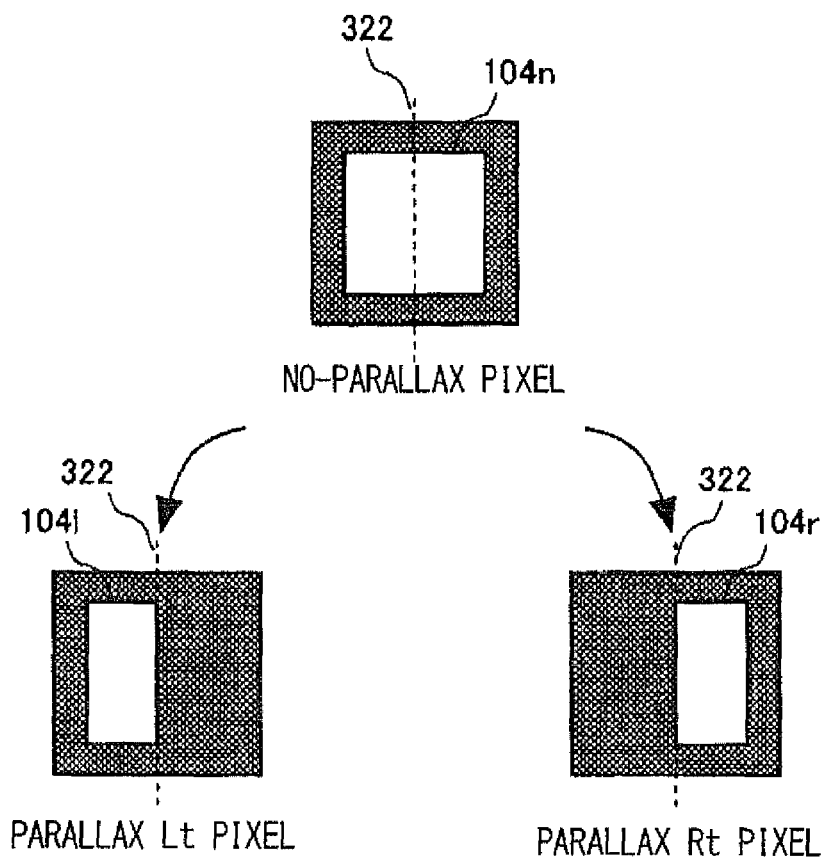
FIG. 31 illustrates preferred opening shapes.

Next, preferred opening shapes of the opening 104 are described. FIG. 31 illustrates preferred opening shapes.

An opening 104l of a parallax Lt pixel, and an opening 104r of a parallax Rt pixel preferably include the center of the corresponding photoelectric converter element 108 and are displaced in the mutually opposite directions. Specifically, the openings 104l, 104r preferably have shapes that contact a hypothetical center line 322 that goes along with the center (the center of a pixel) of the photoelectric converter element 108, or alternatively, shapes that straddle the center line 322.

In particular, as illustrated, the shape of the opening 104l and the shape of the opening 104r preferably have shapes that are identical with shapes that are obtained by dividing a shape of an opening 104n of a no-parallax pixel along the center line 322. In other words, the shape of the opening 104n is preferably equal to a shape that is obtained by putting the shape of the opening 104l and the shape of the opening 104r next to each other.

Figure 32:
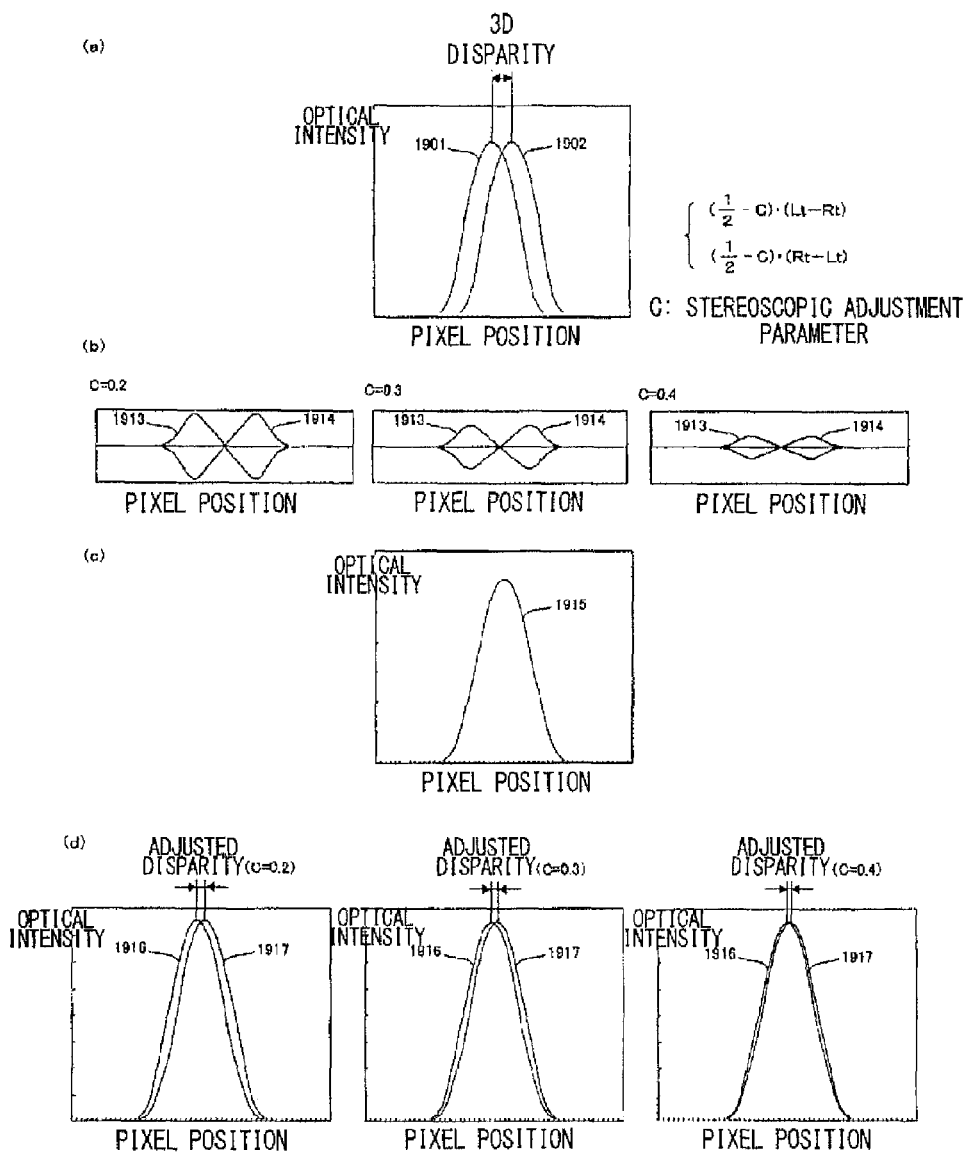
FIG. 32 illustrates optical intensity distributions for illustrating the concept of an adjusted disparity.

Next, concepts and processing that are different from the concept and processing described by referring to FIGS. 27 to 29 are described. FIG. 32 illustrates optical intensity distributions for illustrating another concept of an adjusted disparity.

An Lt distribution curve 1901 and an Rt distribution curve 1902 that are indicated in FIG. 32 (a) are distribution curves that are formed by plotting actual luminance values of Lt plane data and Rt plane data. Specifically, they are curves obtained by plotting luminance values in correspondence with pixel positions in a parallax direction, paying attention to a pixel arrangement in the parallax direction. These curves correspond, for example, to the distribution curves 1804, 1805 in FIG. 18 (b). The distance between the peaks of the Lt distribution curve 1901 and the Rt distribution curve 1902 represents the 3D disparity, and a larger distance indicates a more significant stereoscopic effect at the time of image reproduction.

Two modulation curves are generated by plotting values calculated by using the following two expressions about pixel positions of the Lt distribution curve 1901 and the Rt distribution curve 1902, respectively.

Lt modulation curve ... $(\frac{1}{2}-C)(Lt-Rt)$

Rt modulation curve ... $(\frac{1}{2}-C)(Rt-Lt)$

Note that C is a stereoscopic adjustment parameter, and is a real number within the range of 0<C<0.5.

FIG. 32 (b) illustrates cases in which different values are used for the stereoscopic adjustment parameter C. The figure on the left shows a distribution when C=0.2, and the Lt modulation curve 1913 and the Rt modulation curve 1914 are symmetrical about the optical intensity. Similarly, the figure in the center shows a distribution when C=0.3, and the figure on the right shows a distribution when C=0.4.

FIG. 32 (c) shows a distribution curve 1915 obtained by plotting pixel values of plane data of color image data on which stereoscopic modulation is to be performed. Specifically, they are curves obtained by plotting pixel values in correspondence with pixel positions in a parallax direction, paying attention to a pixel arrangement in the parallax direction. Also, this distribution curve can be said to represent an optical intensity distribution.

FIG. 32 (d) shows an adjusted Lt distribution curve 1916 and an adjusted Rt distribution curve 1917. Specifically, the adjusted Lt distribution curve 1916 is generated by adding the Lt modulation curve 1913 to the distribution curve 1915. Also, the adjusted Rt distribution curve 1917 is generated by adding the Rt modulation curve 1914 to the distribution curve 1915. The figures on the left, in the center, and on the right show distributions when C is 0.2, 0.3, and 0.4, respectively. The distance between the peaks of the adjusted Lt distribution curve 1916 and the adjusted Rt distribution curve 1917 represents an adjusted disparity, For example, the change amounts of the Lt modulation curve 1913 and the Rt modulation curve 1914 when C=0.4 are smaller than those when C=0.2. Due to such a relation, the adjusted disparity when C=0.4 is smaller than that when C=0.2. In addition, when the stereoscopic adjustment parameter C meets the condition 0<C<0.5, the adjusted disparity is smaller than the 3D disparity. Accordingly, the stereoscopic effect at the time of image reproduction is mitigated. On the other hand, because the broadening of the adjusted Lt distribution curve 1916 and the adjusted Rt distribution curve 1917 is similar to the broadening of the distribution curve 1915, it can be said that the blur amount thereof is equal to the blur amount of a 2D image.

That is, the adjusted disparity can be controlled by at what percentage the difference between the Lt distribution curve 1901 and the Rt distribution curve 1902 is correlated. By performing such computation, left-side viewpoint color image data and right-side viewpoint color image data that provide a stereoscopic effect that is different from that of parallax image data generated from parallax pixels can be generated.

Note that various visual effects can be provided, such as obtaining an adjusted disparity that emphasizes parallax more than the original 3D disparity by changing the value of the stereoscopic adjustment parameter C within the range of C<0, or realizing pseudoscopic vision in which parallax directions are reversed by changing the value of the stereoscopic adjustment parameter C within the range of 0.5<C.

In the present embodiment, left-side viewpoint color image data and right-side viewpoint color image data are generated from five pieces of plane data that constitute a RAW image data set. The left-side viewpoint color image data is constituted with three pieces of color parallax plane data that are $RLt_c$ plane data, $GLt_c$ plane data, and $BLt_c$ plane data that are red plane data, green plane data, and blue plane data, respectively, corresponding to the left-side viewpoint. Similarly, the right-side viewpoint color image data is constituted with three pieces of color parallax plane data that are $RRt_c$ plane data, $GRt_c$ plane data, and $BRt_c$ plane data that are red plane data, green plane data, and blue plane data, respectively, corresponding to the right-side viewpoint.

Figure 33:
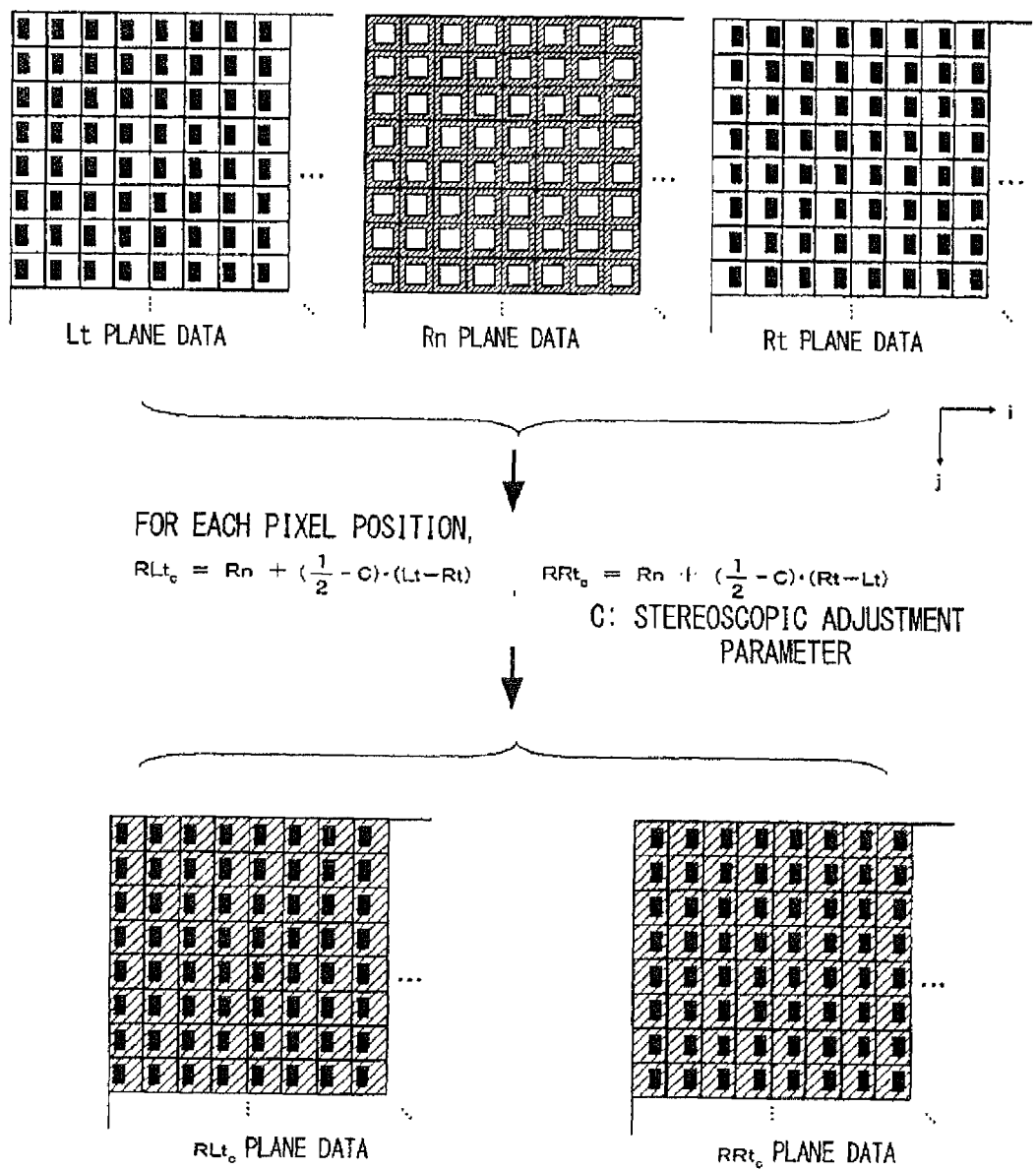
FIG. 33 illustrates a color parallax plane data generation process.

FIG. 33 illustrates a color parallax plane data generation process. In particular, a process of generating the $RLt_c$ plane data and the $RRt_c$ plane data that correspond to a red parallax plane of color parallax planes is illustrated.

The red parallax plane is generated by using a pixel value of the Rn plane data and luminance values of the Lt plane data and the Rt plane data that are described by referring to FIG. 15. Specifically, for example when a pixel value $RLt_{mn}$ at a target pixel position $(i_m, j_n)$ of the $RLt_c$ plane data is calculated, first, the pixel value extracting unit 231 of the image processor 205 extracts a pixel value $Rn_{mn}$ from the same pixel position $(i_m, j_n)$ of the Rn plane data. Next, the luminance value extracting unit 232 of the image processor 205 extracts a luminance value $Lt_{mn}$ from the same pixel position $(i_m, j_n)$ of the Lt plane data, and a luminance value $Rt$, from the same pixel position $(i_m, j_n)$ of the Rt plane data. The calculating unit 233 of the image processor 205 calculates the pixel value $RLt_{mn}$ such that the difference between the pixel value $RLt_{mn}$ that is desired to be calculated and the extracted pixel value $Rn_{mn}$ is kept correlated with a value obtained by multiplying the difference between the extracted luminance values $Lt_{mn}$, $Rt_{mn}$ with the term about the stereoscopic adjustment parameter C. Specifically, the following expression (3) is used for calculation. Note that the stereoscopic adjustment parameter C is set in advance within the range of 0<C<0.5.

$$RLt_{mn} - Rn_{mn} = (\tfrac{1}{2} - C)(Lt_{mn} - Rt_{mn}) \tag{3}$$

Similarly, when calculating a pixel value $RRt_{mn}$ at the target pixel position $(i_m, j_n)$ of the RRt plane data, the calculating unit 233 calculates the pixel value $RRt_{mn}$ such that the difference between the pixel value $RRt_{mn}$ that is desired to be calculated and the extracted pixel value $Rn_{mn}$ is kept correlated with a value obtained by multiplying the difference between the extracted luminance values $Lt_{mn}$, $Rt_{mn}$ with the term about the stereoscopic adjustment parameter C. Specifically, the following expression (4) is used for calculation. Note that, the stereoscopic adjustment parameter here is the same with C in the expression (3).

$$RRt_{mn} - Rn_{mn} = (\tfrac{1}{2} - C)(Rt_{mn} - Lt_{mn}) \tag{4}$$

The image processor 205 sequentially performs such processing starting from (1, 1) that is the leftmost and uppermost pixel to $(i_0, j_0)$ that is the rightmost and lowermost coordinate. Note that in the examples of the above-described expressions (3) and (4), the term about the stereoscopic adjustment parameter C is defined as $(\tfrac{1}{2} - C)$, the correlation between the pixel value $RRt_{mn}$ that is desired to be calculated and the extracted pixel value $Rn_{mn}$, and the difference between the extracted luminance values $Lt_{mn}$, $Rt_{mn}$ may be changed as appropriate. Taking into consideration parameters such as the eccentricity or size of openings of parallax pixels, the relative relation with openings of no-parallax pixels, etc., the correlation may be adjusted as appropriate by changing the proportionality coefficient or adding a constant as a correction term. Note that the above-described relation applies even when the pixel value that is desired to be calculated is the pixel values $RRt_{mn}$, $GLt_{mn}$, $GRt_{mn}$, $BLt_{mn}$, $BRt_{mn}$.

After completion of the process of generating the $RLt_c$ plane data and the $RRt_c$ plane data that correspond to the red parallax plane, next, a process of generating the $GLt_c$ plane data and the $GRt_c$ plane data that correspond to the green parallax plane is performed. Specifically, similar processing is performed by extracting a pixel value $Gn_{mn}$ from the same pixel position $(i_m, j_n)$ of the Gn plane data, instead of extracting the pixel value $Rn_{mn}$ from the same pixel position $(i_m, j_n)$ of the Rn plane data as described above. Furthermore, after completion of the process of generating the $GLt_c$ plane data and the $GRt_c$ plane data that correspond to the green parallax plane, next, a process of generating the $BLt_c$ plane data and the BRt$_c$ plane data that correspond to the blue parallax plane is performed. Specifically, similar processing is performed by extracting a pixel value Bn$_{mn}$ from the same pixel position (i$_m$, j$_n$) of the Bn plane data, instead of extracting the pixel value Rn$_{mn}$ from the same pixel position (i$_m$, j$_n$) of the Rn plane data as described above.

By the above-described processing, the left-side viewpoint color image data (RLt$_c$ plane data, GLt$_c$ plane data, and BLt$_c$ plane data), and the right-side viewpoint color image data (RRt$_c$ plane data, GRt$_c$ plane data, and BRt$_c$ plane data) are generated. That is, by relatively simple processing, the left-side viewpoint and right-side viewpoint color image data can be obtained as hypothetical outputs from pixels that are actually not present as pixels of the image sensor 100.

In addition, because the stereoscopic adjustment parameter C can be changed, the magnitude of the disparity can be adjusted while keeping the blur amount of a 2D color image based on no-parallax pixels. Accordingly, by reproducing these pieces of image data with a reproduction apparatus that supports a 3D image, a user can view a 3D video that exhibits an appropriately adjusted stereoscopic effect as a color image. In particular, because the processing is simple, image data can be generated at a high speed, and motion images can be also supported. Note that the generated left-side viewpoint color image data may be stored in association with the left-side viewpoint parallax image data from which it is derived, such as Lt plane data, and the generated right-side viewpoint color image data may be stored in association with right-side viewpoint parallax image data from which it is derived, such as Rt plane data. In this manner, by storing generated image data in association with image data from which it is derived, management and the like at the time of image reproduction can be easily performed. The association includes, for example, describing file names as associated image data, in respective header information. In this case, the image processor 205 plays a role of an adding unit to add associated information.

It was described above that when parallax pixels are evenly allocated to pixels of any of RGB on the actual image sensor 100, a high quality color image data that is a 3D image but has good color reproducibility can be obtained. But actually it can be said that, even when such pixels are not provided, by performing the above-described processing, correspondingly high quality 3D color image data can be obtained. Also, because parallax pixels do not have to be allocated to RGB pixel as actual pixels, other plane data can be allowed to have high quality by a corresponding degree.

Figure 34:
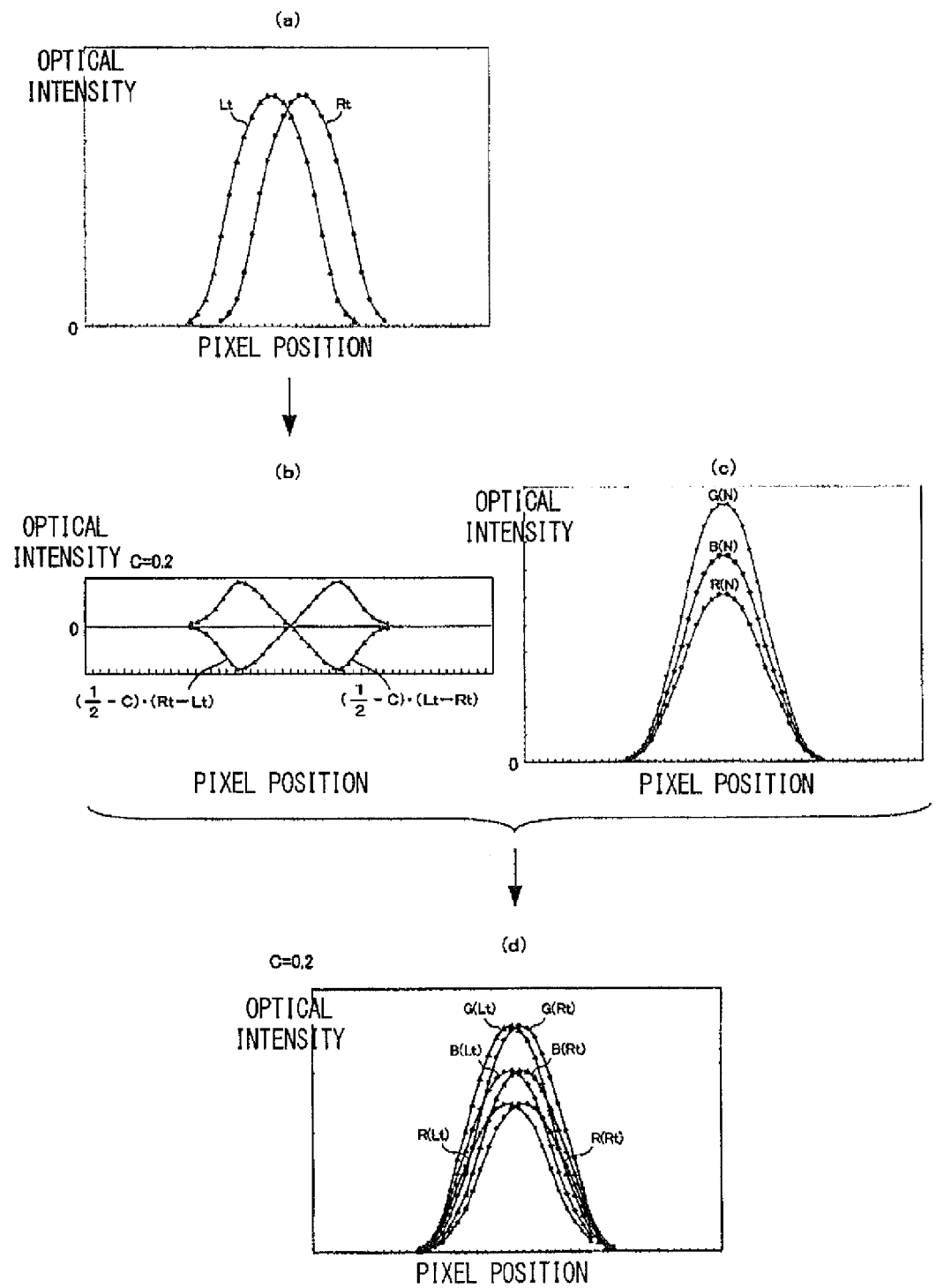
FIG. 34 illustrates changes in RGB optical intensity distributions.

Next, the above-described processing is described in terms of optical intensity distributions. FIG. 34 illustrates changes in optical intensity distributions. FIG. 34 (a) is a graph showing output values of a parallax Lt pixel and output values of a parallax Rt pixel that are W pixels when a subject luminous flux from an object point that is present at a position that is off a focus position by a certain amount is received. These output values are luminance values not including color information. Also, because as described above, output values of a pixel are proportional to an optical intensity, the graph can be said to represent an optical intensity distribution.

FIG. 34 (b) is a graph generated by plotting values obtained by multiplying, with (½−C): values obtained by subtracting output values of the parallax Rt pixels from output values of the parallax Lt pixels in FIG. 34 (a); and values obtained by subtracting the output values of the parallax Lt pixels from the output values of the parallax Rt pixels. In the example of FIG. 34 (b), the stereoscopic adjustment parameter C is set to 0.2. These curves correspond to the Lt modulation curve 1913 and the Rt modulation curve 1914 in FIG. 32 (b).

FIG. 34 (c) is a graph showing output values of an R pixel, a G pixel, and a B pixel that are no-parallax pixels when a subject luminous flux from the object point in FIG. 17 (a) is received. These output values are pixel values including color information. Also, this graph can be said to represent an optical intensity distribution of each color.

By performing the above-described processing for the respective corresponding pixels, an optical intensity distribution represented by the graph of FIG. 34 (d) is obtained. As can be known from FIG. 34, the distribution is as if output values from the actual RLt pixel, RRt pixel, GLt pixel, GRt pixel, BLt pixel, and BRt pixel are arranged. Note that the processing flow up until generation of parallax color image data is similar to the processing in FIG. 30. In this case, at Step S107, the stereoscopic adjustment parameter C is set in advance within the range of 0<C<0.5.

The description above described an example in which the image sensor 100 employs the repetitive pattern B'-1. That is, in the example described above, parallax pixels are W pixels, and six pieces of plane data of left-side viewpoint color image data and right-side viewpoint color image data are generated by utilizing parallax image data as luminance image data not including color information. However, as described above, an enormous number of the repetitive patterns can be set depending on at which cycle parallax pixels and no-parallax pixels are allocated to how many colors of pixels in the arrangement of the color filter. In a case of the image sensor 100 in which parallax pixels are allocated to a color filter of a particular color, the above-described processing is slightly changed to provide six pieces of plane data of left-side viewpoint color image data and right-side viewpoint color image data. The specific procedure is described below.

Figure 35:
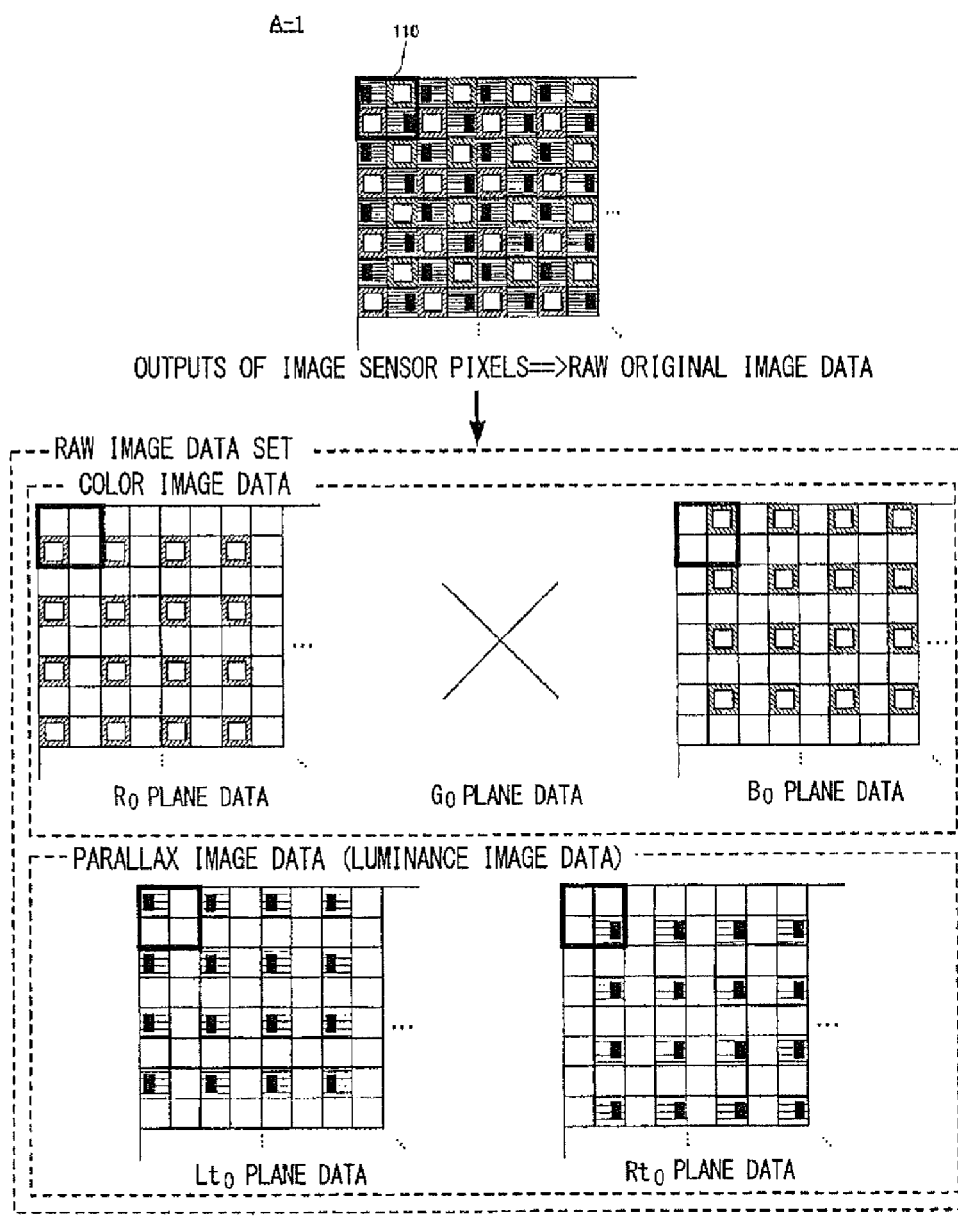
FIG. 35 illustrates a plane separation process in the image sensor 100 that employs another repetitive pattern.

FIG. 35 illustrates a plane separation process in an image sensor 100 that employs another repetitive pattern. In the example of FIG. 35, the image sensor 100 employs the above-described repetitive pattern A-1. In the repetitive pattern A-1, a Gb pixel and a Gr pixel in the Bayer arrangement are a parallax Lt pixel and a parallax Rt pixel, respectively.

From RAW original image data output from such an image sensor 100, R$_0$ plane data and B$_0$ plane data are separated as color image data, but G$_0$ plane data cannot be separated. Also, Lt$_0$ plane data and Rt$_0$ plane data separated as parallax image data have green color information. In other words, parallax image data can be said to be luminance image data that has captured a green wavelength component of a subject luminous flux. Accordingly, each output value from these pieces of plane data can be handled as a luminance value.

Figure 36:
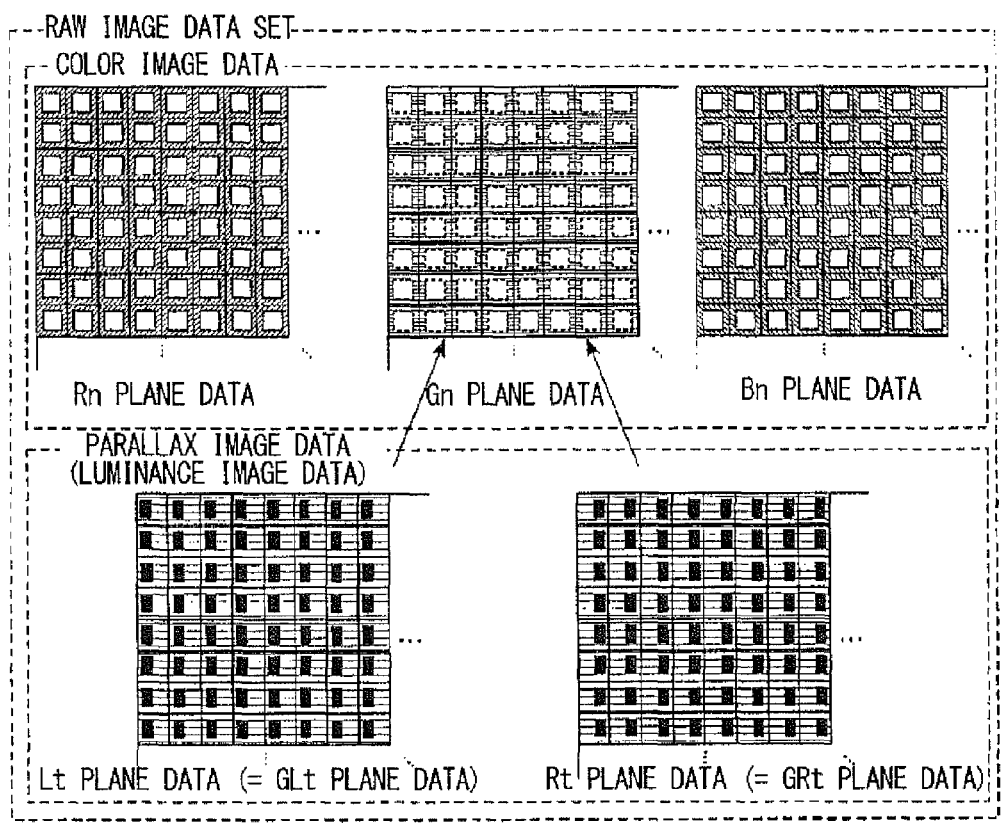
FIG. 36 illustrates the data structure of a RAW image data set in the image sensor 100 that employs another repetitive pattern.

The above-described interpolation process is performed on the separated pieces of plane data to fill vacant lattices that are present in the respective pieces of plane data. FIG. 36 illustrates the data structure of RAW image data set after the interpolation process.

The interpolation process for generating Rn plane data, Bn plane data, Lt plane data, and Rt plane data is similar to the above-described example. Also, the image processor 205 calculates the average value for each corresponding pixel of GLt plane data and GRt plane data to generate Gn plane data.

Processing of generating RLt$_c$ plane data and RRt$_c$ plane data by using parallax image data on Rn plane data, processing of generating GLt$_c$ plane data and GRt$_c$ plane data by using parallax image data on Gn plane data, and processing of generating $BLt_c$ plane data and $BRt_c$ plane data by using parallax image data on Bn plane data are similar to the above-described example.

Also, in the description above, three colors, red, green, and blue, were used as primary colors that constitute colors of a subject image. However, primary colors may be four or more colors including emerald green. Also, three primary colors of complementary colors, which is a combination of yellow, magenta, and cyan may be employed in place of red, green, and blue.

In the above-described expressions (1) and (2), the range of the stereoscopic adjustment parameter C is set to 0.5<C<1. When C=1, left-side viewpoint and right-side viewpoint color image data can be generated as hypothetical output of a parallax Lt pixel and a parallax Rt pixel that do not actually exist as pixels of the image sensor 100, and also has a color filter of any of RGB. Also, when C=0.5, 2D color image data can be generated as in the example of the Gn plane data in FIG. 36. Also, when C=0, parallax image data in which the luminance distribution is reversed horizontally is generated. Also, when other values are used, other types of special parallax image data, such as pseudoscopic data, can be obtained.

Also, in the processing in the flow of FIG. 30, the consistently same value is used as a value of the stereoscopic adjustment parameter C. However, the value of C may be changed for each region, for example in accordance with a feature of a subject image. Specifically, C is changed according to the target pixel position (i, j). C may be changed according to an instruction that is received in advance from a user about a divided region, or an appropriate value may be set for each region based on a facial recognition technique and the like. Because the value of C is variable, a single image including regions that present mutually different stereoscopic effects can be obtained.

In the above-described example, a pair of left-side viewpoint color image data and right-side viewpoint color image data is generated. That is, if the stereoscopic adjustment parameter C is set within the range of 0.5<C<1 when applying the expression (1), the expression (2) is the same as the expression (1) except that C and (1−C) are replaced with each other. In this case, color image data generated based on the expression (1) is managed as left-side viewpoint color image data in association for example with Lt plane data, and color image data generated based on the expression (2) is managed as right-side viewpoint color image data in association for example with Rt plane data. At this time, the image processor 205 plays a role of an adding unit to perform association.

Also, in the above-described expressions (3) and (4), the range of the stereoscopic adjustment parameter C is set to 0.5<C<1. However, similar to the fact that various types of image data can be obtained by changing the value of the stereoscopic adjustment parameter C in the above-described expressions (1) and (2), various types of image data can be obtain by changing the stereoscopic adjustment parameter C of the expressions (3) and (4).

Also, when applying the expressions (3) and (4) to the flow of FIG. 30, the value of stereoscopic adjustment parameter C may not be the consistently same value, but may be changed for each region for example in accordance with a feature of a subject image.

In the above-described example, a pair of left-side viewpoint color image data and right-side viewpoint color image data is generated. That is, if the stereoscopic adjustment parameter C is set within the range of 0.5<C<1 when applying the expression (3), the expression (4) is the same as the expression (3) except that C and (1−C) are replaced with each other. In this case, color image data generated based on the expression (3) is managed as left-side viewpoint color image data in association for example with Lt plane data, and color image data generated based on the expression (4) is managed as right-side viewpoint color image data in association for example with Rt plane data. At this time, the image processor 205 plays a role of an adding unit to perform association.

In the description above, for example the pixel value extracting unit 231, the luminance value extracting unit 232, and the calculating unit 233 included in the image processor 205 are described as performing their own processing as functions of each component that constitutes the digital camera 10. Also, a control program that causes the controller 201 and the image processor 205 to perform operations causes each piece of hardware that constitutes the digital camera 10 to function as a component that causes the above-described processing to be executed. Also, the processing of generating color image data may not be performed by the digital camera 10, but may be performed by equipment such as an external personal computer. In this case, the equipment such as an external personal computer functions as an image processing apparatus. The image processing apparatus for example obtains RAW original image data to generate color image data. The image processing apparatus also performs the above-described plane separation process and plane data interpolation process when it obtains RAW original image data. Also, the image processing apparatus may obtain plane data on which an interpolation process has been performed on the side of the image-capturing apparatus.

Next, another example (Example 2) that is different from the above-described example (Example 1) is described. In Example 1, a left-viewpoint color image and a right-viewpoint color image are generated in the following manner. In a case of a left-viewpoint color image, it is generated by applying color plane information of normal images Rn, Gn, Bn while placing emphasis on the left-viewpoint luminance image such that the ratio between the mixed image and the arithmetically averaged image of the left-viewpoint luminance image Lt and the right-viewpoint luminance image Rt is kept constant. In Example 2, another expression is presented. The expressions (1) and (2) are replaced with the following arithmetic expressions.

Generation of Left-Viewpoint Color Image $$RLt = Rn \times (Lt^{(1-d)} * Rt^d)/\sqrt{(Lt*Rt)}$$

$$GLt = Gn \times (Lt^{(1-d)} * Rt^d)/\sqrt{(Lt*Rt)}$$

$$BLt = Bn \times (Lt^{(1-d)} * Rt^d)/\sqrt{(Lt*Rt)}$$

Generation of Right-Viewpoint Color Image $$RRt = Rn \times (Rt^{(1-d)} * Lt^d)/\sqrt{(Lt*Rt)}$$

$$GRt = Gn \times (Rt^{(1-d)} * Lt^d)/\sqrt{(Lt*Rt)}$$

$$BRt = Bn \times (Rt^{(1-d)} * Lt^d)/\sqrt{(Lt*Rt)}$$

Note that a stereoscopic adjustment parameter d is a value within the range of $0 \leq d \leq 0.5$.

When d=0 in the above-descried expressions, a left-viewpoint color image and a right-viewpoint color image are generated adaptively to a right-viewpoint luminance image and a left-viewpoint luminance image such that the ratio relative to the geometric average of the left-viewpoint luminance image Lt and the right-viewpoint luminance image Rt is kept constant. When d=0.5, the images become the same as a no-parallax image.

When the above-described expressions are rewritten, the following relations are satisfied.

Generation of Left-Viewpoint Color Image $$RLt/Rn=(Lt/Rt)^{(0.5-d)}$$

$$GLt/Gn=(Lt/Rt)^{(0.5-d)}$$

$$BLt/Bn=(Lt/Rt)^{(0.5-d)}$$

Generation of Right-Viewpoint Color Image $$RRt/Rn=(Rt/Lt)^{(0.5-d)}$$

$$GRt/Gn=(Rt/Lt)^{(0.5-d)}$$

$$BRt/Bn=(Rt/Lt)^{(0.5-d)}$$

That is, a pixel value of a left-viewpoint color image to be obtained is obtained such that the ratio between the pixel value of the left-viewpoint color image and a pixel value of a no-parallax image is correlated with the ratio between a luminance value of a left-viewpoint luminance image and a luminance value of a right-viewpoint luminance image. Also, a pixel value of a right-viewpoint color image to be obtained is obtained such that the ratio between the pixel value of the right-viewpoint color image and a pixel value of a no-parallax image is correlated with the ratio between a luminance value of a right-viewpoint luminance image and a luminance value of a left-viewpoint luminance image.

Next, Example 3 is shown. The expressions shown in Example 2 can be equivalently expressed as logarithms as follows.

Generation of Left-Viewpoint Color Image $$\log(RLt)=\log(Rn)+(1-d)*\log(Lt)+d*\log(Rt)-[\log(Lt)+\log(Rt)]/2$$

$$\log(GLt)=\log(Gn)+(1-d)*\log(Lt)+d*\log(Rt)-[\log(Lt)+\log(Rt)]/2$$

$$\log(BLt)=\log(Bn)+(1-d)*\log(Lt)+d*\log(Rt)-[\log(Lt)+\log(Rt)]/2$$

Generation of Right-Viewpoint Color Image $$\log(RRt)=\log(Rn)+(1-d)*\log(Rt)+d*\log(Lt)-[\log(Lt)+\log(Rt)]/2$$

$$\log(GRt)=\log(Gn)+(1-d)*\log(Rt)+d*\log(Lt)-[\log(Lt)+\log(Rt)]/2$$

$$\log(BRt)=\log(Bn)+(1-d)*\log(Rt)+d*\log(Lt)-[\log(Lt)+\log(Rt)]/2$$

When shifting to an image processing space with gradation characteristics having logarithmic gradation, an arithmetic expression for keeping the ratio constant in an image processing space with linear gradation can generate color images of respective left and right viewpoints by parallax modulation for keeping the difference constant in the logarithmic gradation space. Not being limited to logarithmic gradation, by generalizing this idea to perform computation for keeping the difference constant in the gamma space having gradation characteristics represented by powers such as a square root and a cubic root or any gradation characteristics, an effect of adding parallax modulation can be similarly obtained.

Flowchart
1) Color-Parallax Multiplexed Mosaic Image Data Input
2) Shift to Gamma Space by Gradation Conversion
3) Generation of Color and Parallax Images
4) Shift to Original Color Space by Reverse Gradation Conversion
5) Conversion to Output Color Space Processing Procedure
1) Color-Parallax Multiplexed Mosaic Image Data Input A single-plate mosaic image in which a Bayer arrangement type G pixel is pupil-split into right parallax and left parallax, and colors and parallax are multiplexed is input. This is represented by M[i,j]. Each pixel value is data having linear gradation which is proportional to an exposure amount.

2) Shift to Gamma Space by Gradation Conversion

Gradation conversion is performed on the mosaic image to shift to the gamma space.

$$M[i,j] \rightarrow M^{\Gamma}[i,j]$$

Actually, nonlinear conversion y=f(x) is performed such that an output pixel value y is obtained for a pixel value x. Examples of characteristics of nonlinear conversion include the following various characteristics. Note that an input signal is x, an output signal is y, and the gradation of the input signal and the gradation of the output signal are defined in the range of [0,1].

Input/output characteristics define the gradation curve (gamma curve) such that it passes (x, y)=(0, 0) and (1, 1). Assuming that the maximum value of the actual input gradation X is Xmax, and the maximum value of actual output gradation Y is Ymax, x=X/Xmax and y=Y/Ymax, and the gradation conversion is performed according to:

$$Y = Y_{max} \cdot f\left(\frac{X}{X_{max}}\right)$$

Examples of gradation characteristics include the following characteristics.

a) Cubic Root Gradation Characteristics $$y=1.16x^{1/3}-0.16 \text{ if } x>0.008856$$

$$y=1.16\times7.781x \text{ otherwise}$$

b) Offset Square Root Gradation Characteristics

The offset value e is a positive constant. Please see U.S. Pat. No. 7,957,588.

c) Logarithmic Characteristics $$y = \frac{\log(kx+1)}{\log(k+1)}$$

The coefficient k is a positive constant.

d) Linear Characteristics $$y=x$$

3) Generation of Color and Parallax Images

As in Example 1, no-parallax color images $Rn^{\Gamma}$, $Gn^{\Gamma}$, $Bn^{\Gamma}$, a left-viewpoint luminance image $Lt^{\Gamma}$, and a right-viewpoint luminance image $Rt^{\Gamma}$ are generated in the gamma space. Thereafter, parallax modulation is performed according to the following expressions to generate a left-viewpoint color image and a right-viewpoint color image. Note that a value in the gamma space is expressed schematically with the exponent $^{\Gamma}$.

Generation of Left-Viewpoint Color Image $$RLt^\Gamma = Rn^\Gamma + (1-d)*Lt^\Gamma + d*Rt^\Gamma - (Lt^\Gamma + Rt^\Gamma)/2$$

$$GLt^\Gamma = Gn^\Gamma + (1-d)*Lt^\Gamma + d*Rt^\Gamma - (Lt^\Gamma + Rt^\Gamma)/2$$

$$BLt^\Gamma = Bn^\Gamma + (1-d)*Lt^\Gamma + d*Rt^\Gamma - (Lt^\Gamma + Rt^\Gamma)/2$$

Generation of Right-Viewpoint Color Image $$RRt^\Gamma = Rn^\Gamma + (1-d)*Rt^\Gamma + d*Lt^\Gamma - (Lt^\Gamma + Rt^\Gamma)/2$$

$$GRt^\Gamma = Gn^\Gamma + (1-d)*Rt^\Gamma + d*Lt^\Gamma - (Lt^\Gamma + Rt^\Gamma)/2$$

$$BRt^\Gamma = Bn^\Gamma + (1-d)*Rt^\Gamma + d*Lt^\Gamma - (Lt^\Gamma + Rt^\Gamma)/2$$

Note that a stereoscopic adjustment parameter d is a value within the range of $0 \leq d \leq 0.5$.

When the above-described expressions are rewritten, the following relations are satisfied.

Generation of Left-Viewpoint Color Image $$RLt^\Gamma - Rn^\Gamma = (0.5-d)*(Lt^\Gamma - Rt^\Gamma)$$

$$GLt^\Gamma - Gn^\Gamma = (0.5-d)*(Lt^\Gamma - Rt^\Gamma)$$

$$BLt^\Gamma - Bn^\Gamma = (0.5-d)*(Lt^\Gamma - Rt^\Gamma)$$

Generation of Right-Viewpoint Color Image $$RRt^\Gamma - Rn^\Gamma = (0.5-d)*(Rt^\Gamma - Lt^\Gamma)$$

$$GRt^\Gamma - Gn^\Gamma = (0.5-d)*(Rt^\Gamma - Lt^\Gamma)$$

$$BRt^\Gamma - Bn^\Gamma = (0.5-d)*(Rt^\Gamma - Lt^\Gamma)$$

That is, a pixel value of a left-viewpoint color image to be obtained is obtained such that the difference between the pixel value of the left-viewpoint color image and a pixel value of a no-parallax image is correlated with the difference between a luminance value of a left-viewpoint luminance image and a luminance value of a right-viewpoint luminance image. Also, a pixel value of a right-viewpoint color image to be obtained is obtained such that the difference between the pixel value of the right-viewpoint color image and a pixel value of a no-parallax image is correlated with the difference between a luminance value of a right-viewpoint luminance image and a luminance value of a left-viewpoint luminance image.

4) Shift to Original Color Space by Reverse Gradation Conversion

Reverse gradation conversion from the gamma space to the linear gradation space is performed to return to the original color space. The conversion is performed on necessary color image data. A left-viewpoint color image and a right-viewpoint color image are formed.

Left-Viewpoint Color Image $$RLt^\Gamma[i,j] \to RLt[i,j] \quad GLt^\Gamma[i,j] \to GLt[i,j] \quad BLt^\Gamma[i,j] \to BLt[i,j]$$

Right-Viewpoint Color Image $$RRt^\Gamma[i,j] \to RRt[i,j] \quad GRt^\Gamma[i,j] \to GRt[i,j] \quad BRt^\Gamma[i,j] \to BRt[i,j]$$

5) Conversion to Output Color Space

On the formed left-viewpoint color image and right-viewpoint color image, color conversion and output gradation conversion are performed to generate respective output color images. For example, conversion into the sRGB color space is performed.

Note that although the mosaic image having parallax has the primary color Bayer arrangement in the example, a right parallax complementary color image and a left parallax complementary color image can be generated similarly according to the same principle even when the color filters are replaced with complementary color filters.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image processing apparatus comprising:
a pixel value extracting unit that extracts a first pixel value at a target pixel position from image data having the first pixel value, the first pixel value corresponding to a first viewpoint that is one of a plurality of viewpoints to capture a subject image;
a luminance value extracting unit that extracts a second luminance value and a third luminance value at the target pixel position from luminance image data having the second luminance value and the third luminance value, the second luminance value and the third luminance value corresponding to a second viewpoint and a third viewpoint that are different from the first viewpoint; and
a calculating unit that calculates at least any of a second pixel value of the second viewpoint and a third pixel value of the third viewpoint such that (i) a ratio between the second pixel value and the first pixel value extracted by the pixel value extracting unit or a ratio between the third pixel value and the first pixel value remains correlated with (ii) a ratio defined by the second luminance value and the third luminance value.

2. The image processing apparatus according to claim 1, wherein the calculating unit calculates at least any of the second pixel value and the third pixel value according to calculation formulae:

$$P_{C2} = 2P_{C1} \times P_{B2}/(P_{B2} + P_{B3})$$

$$P_{C3} = 2P_{C1} \times P_{B3}/(P_{B2} + P_{B3})$$

($P_{C2}$: second pixel value, $P_{C3}$: third pixel value, $P_{C1}$: first pixel value, $P_{B2}$: second luminance value, $P_{B3}$: third luminance value).

3. The image processing apparatus according to claim 1, wherein the calculating unit calculates at least any of the second pixel value and the third pixel value according to calculation formulae:

$$P_{C2} = P_{C1} \times P_{B2}/\sqrt{(P_{B2} \times P_{B3})}$$

$$P_{C3} = P_{C1} \times P_{B3}/\sqrt{(P_{B2} \times P_{B3})}$$

($P_{C2}$: second pixel value, $P_{C3}$: third pixel value, $P_{C1}$: first pixel value, $P_{B2}$: second luminance value, $P_{B3}$: third luminance value).

4. The image processing apparatus according to claim 1, wherein the first pixel value extracted by the pixel value extracting unit, and each of the second luminance value and the third luminance value extracted by the luminance value extracting unit are linear gradation values that are proportional to a received light amount.

5. An image processing apparatus comprising:
- a pixel value extracting unit that extracts a first pixel value at a target pixel position from image data having the first pixel value, the first pixel value corresponding to a first viewpoint that is one of a plurality of viewpoints to capture a subject image;
- a luminance value extracting unit that extracts a second luminance value and a third luminance value at the target pixel position from luminance image data having the second luminance value and the third luminance value, the second luminance value and the third luminance value corresponding to a second viewpoint and a third viewpoint that are different from the first viewpoint; and
- a calculating unit that calculates at least any of a second pixel value of the second viewpoint and a third pixel value of the third viewpoint such that (i) a difference between the second pixel value and the first pixel value extracted by the pixel value extracting unit or a difference between the third pixel value and the first pixel value remains correlated with (ii) a difference between the second luminance value and the third luminance value.

6. The image processing apparatus according to claim 5, wherein the calculating unit calculates at least any of the second pixel value and the third pixel value according to:

$$P_{C2}-P_{C1}=k(P_{B2}-P_{B3})$$

$$P_{C3}-P_{C1}=k(P_{B3}-P_{B2})$$

($P_{C1}$: first pixel value, $P_{C2}$: second pixel value, $P_{C3}$: third pixel value, $P_{B2}$: second luminance value, $P_{B3}$: third luminance value, k: proportionality coefficient).

7. The image processing apparatus according to claim 5, wherein the first pixel value extracted by the pixel value extracting unit, and each of the second luminance value and the third luminance value extracted by the luminance value extracting unit are gamma-converted values.

8. A non-transitory computer-readable medium having stored thereon an image processing program that causes a computer to:
- extract a first pixel value at a target pixel position from image data having the first pixel value, the first pixel value corresponding to a first viewpoint that is one of a plurality of viewpoints to capture a subject image;
- extract a second luminance value and a third luminance value at the target pixel position from luminance image data having the second luminance value and the third luminance value, the second luminance value and the third luminance value corresponding to a second viewpoint and a third viewpoint that are different from the first viewpoint; and
- calculate at least any of a second pixel value of the second viewpoint and a third pixel value of the third viewpoint such that (i) a ratio between the second pixel value and the first pixel value extracted in the extracting of the first pixel value or a ratio between the third pixel value and the first pixel value remains correlated with (ii) a ratio defined by the second luminance value and the third luminance value.

9. The non-transitory computer-readable medium according to claim 8, wherein at least any of the second pixel value and the third pixel value are calculated according to calculation formulae:

$$P_{C2}=2P_{C1} \times P_{B2}/(P_{B2}+P_{B3})$$

$$P_{C3}=2P_{C1} \times P_{B3}/(P_{B2}+P_{B3})$$

($P_{C2}$: second pixel value, $P_{C3}$: third pixel value, $P_{C1}$: first pixel value, $P_{B2}$: second luminance value, $P_{B3}$: third luminance value).

10. The non-transitory computer-readable medium according to claim 8, wherein at least any of the second pixel value and the third pixel value are calculated according to calculation formulae:

$$P_{C2}=P_{C1} \times P_{B2}/\sqrt{(P_{B2} \times P_{B3})}$$

$$P_{C3}=P_{C1} \times P_{B3}/\sqrt{(P_{B2} \times P_{B3})}$$

($P_{C2}$: second pixel value, $P_{C3}$: third pixel value, $P_{C1}$: first pixel value, $P_{B2}$: second luminance value, $P_{B3}$: third luminance value).

11. The non-transitory computer-readable medium according to claim 8, wherein the first pixel value, and each of the second luminance value and the third luminance value are linear gradation values that are proportional to a received light amount.

12. A non-transitory computer-readable medium having stored thereon an image processing program that causes a computer to:
- extract a first pixel value at a target pixel position from image data having the first pixel value, the first pixel value corresponding to a first viewpoint that is one of a plurality of viewpoints to capture a subject image;
- extract a second luminance value and a third luminance value at the target pixel position from luminance image data having the second luminance value and the third luminance value, the second luminance value and the third luminance value corresponding to a second viewpoint and a third viewpoint that are different from the first viewpoint; and
- calculate at least any of a second pixel value of the second viewpoint and a third pixel value of the third viewpoint such that (i) a difference between the second pixel value and the first pixel value extracted in the extracting of the first pixel value or a difference between the third pixel value and the first pixel value remains correlated with (ii) a difference between the second luminance value and the third luminance value.

13. The non-transitory computer-readable medium according to claim 12, wherein at least any of the second pixel value and the third pixel value are calculated according to:

$$P_{C2}-P_{C1}=k(P_{B2}-P_{B3})$$

$$P_{C3}-P_{C1}=k(P_{B3}-P_{B2})$$

($P_{C1}$: first pixel value, $P_{C2}$: second pixel value, $P_{C3}$: third pixel value, $P_{B2}$: second luminance value, $P_{B3}$: third luminance value, k: proportionality coefficient).

14. The non-transitory computer-readable medium according to claim 12, wherein the first pixel value, and each of the second luminance value and the third luminance value are gamma-converted values.

* * * * *